(12) United States Patent
Gao et al.

(10) Patent No.: US 10,422,884 B2
(45) Date of Patent: Sep. 24, 2019

(54) METHOD AND SYSTEM FOR PERFORMING PRECISE POINT POSITIONING (PPP) AMBIGUITY RESOLUTION USING GNSS TRIPLE FREQUENCY SIGNALS

(71) Applicant: Profound Positioning Inc., Calgary (CA)

(72) Inventors: Yang Gao, Calgary (CA); Min Wang, Tustin, CA (US)

( * ) Notice: Subject to any disclaimer, the term of this patent is extended or adjusted under 35 U.S.C. 154(b) by 0 days.

(21) Appl. No.: 14/632,861

(22) Filed: Feb. 26, 2015

(65) Prior Publication Data
US 2018/0252819 A1  Sep. 6, 2018

(51) Int. Cl.
| | | |
|---|---|---|
| *G01S 19/44* | (2010.01) | |
| *G01S 19/04* | (2010.01) | |
| *G01S 19/32* | (2010.01) | |
| *G01S 5/14* | (2006.01) | |
| *G01S 19/07* | (2010.01) | |

(52) U.S. Cl.
CPC ............. *G01S 19/44* (2013.01); *G01S 5/145* (2013.01); *G01S 19/04* (2013.01); *G01S 19/32* (2013.01); *G01S 19/07* (2013.01)

(58) Field of Classification Search
None
See application file for complete search history.

(56) References Cited

U.S. PATENT DOCUMENTS

| | | | | |
|---|---|---|---|---|
| 2010/0109944 A1* | 5/2010 | Whitehead | ............. | G01C 15/00 342/357.25 |
| 2011/0267228 A1* | 11/2011 | Talbot | ..................... | G01S 19/07 342/357.27 |

OTHER PUBLICATIONS

Geng and Bock, Triple frequency GPS precise point positioning with rapid ambiguity resolution; Journal of Geodesy; (2013) 87:449-460.*

* cited by examiner

*Primary Examiner* — Vladimir Magloire
*Assistant Examiner* — Donald H B Braswell

(57) ABSTRACT

Methods and systems for performing Precise Point Positioning (PPP) ambiguity resolution using Global Navigation Satellite Systems (GNSS) triple frequency signals are described. In an embodiment, the method may include computing, using a processing device, an L1/L2 or L2/L5 wide-lane fractional bias model, in which the bias is split into one direction-independent and three direction-dependent bias components for each satellite. Additionally, the method may include resolving, using the processing device, PPP ambiguity using triple-frequency signals. The method may also include applying, using the processing device, a carrier smooth carrier function to resolve measurement noise. Resolving the PPP ambiguity may include fixing the L2/L5 wide-lane ambiguities in a geometry-free function. Additionally, resolving the PPP ambiguity may include fixing the L1/L2 wide-lane ambiguities in a geometry-based function. Similarly, resolving the PPP ambiguity may also include fixing the L1/L5 wide-lane ambiguities in a geometry-based function.

21 Claims, 47 Drawing Sheets

100

| Signal | GNSS system | Signal name in the system | Frequency (MHz) | Ratio to base frequency 10.23 MHz |
|---|---|---|---|---|
| GNSS-L1 | GPS | L1 | 1575.42 | 154 |
| | Galileo | E1 | 1575.42 | 154 |
| | BeiDou | B1 | 1561.098 | 152.6 |
| | GLONASS | L1-CDMA | 1575.42 | 154 |
| GNSS-L2 | GPS | L2 | 1227.60 | 120 |
| | Galileo | E5b | 1207.14 | 118 |
| | BeiDou | B3 | 1268.520 | 124 |
| | GLONASS | L2-CDMA | 1242.00 | 121.407624633431... |
| GNSS-L5 | GPS | L5 | 1176.45 | 115 |
| | Galileo | E5a | 1176.45 | 115 |
| | BeiDou | B2 | 1207.14 | 118 |
| | GLONASS | L5-CDMA | 1176.45 | 115 |

| Signals to form WL | WL wavelength (m) | | | |
|---|---|---|---|---|
| | GPS | Galileo | BeiDou | GLONASS |
| GNSS-L1/GNSS-L2 | 0.86 | 0.81 | 1.02 | 0.90 |
| GNSS-L1/GNSS-L5 | 0.75 | 0.75 | 0.85 | 0.75 |
| GNSS-L2/GNSS-L5 | 5.86 | 9.77 | 4.88 | 4.57 |

| Combinations | Square of the noise scale, $S_c^2$ | Magnitude of the noise scale |
|---|---|---|
| $\Phi_{IF(WL_{L1,L2}, WL_{L2,L5})}$ | $\left(\dfrac{f_1}{f_1 - f_5}\right)^2\left[\left(\dfrac{f_1}{f_1 - f_2}\right)^2 + \left(\dfrac{f_2}{f_1 - f_2}\right)^2\right] + \left(\dfrac{f_5}{f_1 - f_5}\right)^2\left[\left(\dfrac{f_2}{f_2 - f_5}\right)^2 + \left(\dfrac{f_5}{f_2 - f_5}\right)^2\right]$ | 100.60 |
| $\Phi_{IF(WL_{L1,L5}, WL_{L2,L5})}$ | $\varepsilon^2\left(\dfrac{f_1}{f_1 - f_2}\right)^2\left[\left(\dfrac{f_1}{f_1 - f_5}\right)^2 + \left(\dfrac{f_5}{f_1 - f_5}\right)^2\right] + \left(\dfrac{f_2}{f_1 - f_2}\right)^2\left[\left(\dfrac{f_2}{f_2 - f_5}\right)^2 + \left(\dfrac{f_5}{f_2 - f_5}\right)^2\right]$ | 119.43 |
| $\Phi_{IF(L1, WL_{L2,L5})}$ | $\left(\dfrac{f_1^2}{f_1^2 - f_2 \cdot f_5}\right)^2 + \left(\dfrac{f_2 \cdot f_5}{f_1^2 - f_2 \cdot f_5}\right)^2\left[\left(\dfrac{f_2}{f_2 - f_5}\right)^2 + \left(\dfrac{f_5}{f_2 - f_5}\right)^2\right]$ | 46.32 |
| $\Phi_{IF_{L1,L2}}$ | $\left(\dfrac{f_1^2}{f_1^2 - f_2^2}\right)^2 + \left(\dfrac{f_2^2}{f_1^2 - f_2^2}\right)^2$ | 2.97 |
| $\Phi_{IF_{L1,L5}}$ | $\left(\dfrac{f_1^2}{f_1^2 - f_5^2}\right)^2 + \left(\dfrac{f_5^2}{f_1^2 - f_5^2}\right)^2$ | 2.59 |
| $\Phi_{IF_{L2,L5}}$ | $\left(\dfrac{f_2^2}{f_2^2 - f_5^2}\right)^2 + \left(\dfrac{f_5^2}{f_2^2 - f_5^2}\right)^2$ | 17.33 |

FIG. 3

| Site ID | Site Name | WGS84-X | WGS84-Y | WGS84-Z | Receiver type (Ashtech) | Antenna type |
|---|---|---|---|---|---|---|
| 1 | AMC | | | | Z-XII3 | AOAD/M_T |
| 2 | AREQ | | | | UZ-12 | AOAD/M_T |
| 3 | ARTU | 1843956.613 | 3016203.242 | 5291261.886 | Z-XII3 | ASH700936D_M |
| 4 | BOGT | 1744398.980 | -6116037.325 | 512731.808 | UZ-12 | ASH701945E_M |
| 5 | BREW | -2112007.371 | -3705351.784 | 4726827.141 | UZ-12 | ASH701945C_M |
| 6 | | | | | Z-XII3 | ASH701945C_M |
| 7 | CHPI | 4164613.971 | -4162457.003 | -2445028.777 | UZ-12 | ASH701945C_M |
| 8 | CRAO | 3783897.048 | 2551404.575 | 4441264.433 | UZ-12 | ASH701945C_M |
| 9 | CRO1 | 2607771.066 | -5488076.861 | 1932767.907 | UZ-12 | ASH701945G_M |
| 10 | DGAR | 1916269.165 | 6029977.695 | -801719.702 | UZ-12 | ASH701945E_M |
| 11 | FAIR | | | | UZ-12 | ASH701945G_M |
| 12 | FALK | 2106811.376 | -3355170.714 | -4981786.345 | UZ-12 | ASH701945E_M |
| 13 | GODE | 1130773.595 | -4831253.660 | 3994200.507 | UZ-12 | AOAD/M_T |
| 14 | GOL2 | -2353614.718 | -4641385.209 | 3676976.457 | UZ-12 | AOAD/M_T |
| 15 | GOLD | -2353614.452 | -4641385.344 | 3676976.457 | Z-XII3 | AOAD/M_T |
| 16 | GUAM | -5071312.788 | 3568363.648 | 1488904.395 | UZ-12 | ASH701945B_M |
| 17 | | | | | Z-XII3 | ASH701945E_M |
| 18 | HRAO | 5085352.611 | 2668395.882 | -2768731.481 | UZ-12 | ASH701945E_M |
| 19 | IRKM | -968332.567 | 3794425.521 | 5018167.862 | Z-XII3 | AOAD/M_T |
| 20 | ISPA | -1881703.263 | -5359979.889 | -2890599.293 | UZ-12 | ASH701945E_M |
| 21 | | | | | | |
| 22 | KIRU | 2251420.783 | 862817.157 | 5885476.886 | UZ-12 | ASH701945C_M |
| 23 | KOKB | -5543838.465 | -2054586.030 | 2387810.213 | UZ-12 | ASH701945G_M |
| 24 | MAD2 | 4849202.373 | -360328.788 | 4114913.342 | Z-XII3T | AOAD/M_T |
| 25 | MADR | 4849202.370 | -360328.842 | 4114913.339 | Z-XII3 | AOAD/M_T |
| 26 | MBAR | 5482951.263 | 3260442.705 | -66519.760 | UZ-12 | ASH701945B_M |
| 27 | MCM4 | -1311703.144 | 310814.927 | -6213255.274 | UZ-12 | AOAD/M_T |
| 28 | MDO1 | -1329998.877 | -5328393.459 | 3236504.183 | UZ-12 | AOAD/M_T |
| 29 | MKEA | -5464105.334 | -2495165.982 | 2148291.427 | UZ-12 | AOAD/M_T |
| 30 | MOIN | | | | Z-XII3 | ASH701945C_M |
| 31 | NNOR | -2414151.907 | 4907778.702 | -3270644.689 | Z-XII3 | ASH701945C_M |
| 32 | NRIL | 64537.051 | 2253782.931 | 5946363.634 | UZ-12 | ASH701945B_M |
| 33 | NRL1 | 1117249.071 | -4848758.711 | 3976821.241 | Z-XII3T | ASH701945C_M |
| 34 | PERT | -2368687.469 | 4881316.802 | -3341795.464 | UZ-12 | ASH701945C_M |
| 35 | PETS | -3580828.518 | 1399698.183 | 5072185.214 | Z-XII3 | ASH701933B_M |
| 36 | PIE1 | -1640917.029 | -5014781.281 | 3575447.130 | UZ-12 | ASH701945E_M |
| 37 | PIMO | -3186293.798 | 5286624.390 | 1601158.363 | UZ-12 | ASH701945C_M |
| 38 | POL2 | 1239971.217 | 4530790.202 | 4302578.919 | UZ-12 | TPSCR.G3 |
| 39 | QUIN | -2517231.322 | -4198595.102 | 4076531.268 | UZ-12 | ASH701945E_M |
| 40 | RABT | 5255617.714 | -631745.576 | 3546322.712 | UZ-12 | TRM29659.00 |
| 41 | RIO2 | 1429907.854 | -3495354.913 | -5122698.654 | Z-XII3 | ASH700936C_M |
| 42 | SANT | 1769693.082 | -5044574.397 | -3468321.043 | UZ-12 | AOAD/M_T |
| 43 | SHAO | | | | UZ-12 | AOAD/M_T |
| 44 | SUTH | 5041274.961 | 1916054.315 | -3397075.901 | UZ-12 | ASH701945G_M |
| Site ID | Site Name | WGS84-X | WGS84-Y | WGS84-Z | Receiver type | Antenna type |

| Site ID | Site Name | Closest reference site ID | Closest reference site name | Distance to the closest server reference site (m) |
|---|---|---|---|---|
| 1 | AMC2 | 36 | PIE1 | 901,817.495 |
| 2 | AREQ | 42 | SANT | 2837,483.382 |
| 11 | FAIR | 13 | GODE | 2482,005.638 |
| 30 | MOBN | 10 | DGAR | 1202,728.651 |
| 43 | SHAO | 49 | YAKT | 1680,038.546 |
| 45 | TIDB | 34 | PERT | 3050,284.839 |

| Parameters | Configuration |
| --- | --- |
| Sampling rate | 1 Hz |
| Code noise std. | ±0.3 m |
| Phase noise std. | ± (0.5% * wavelength) |
| Orbit error | 0 |
| Satellite clock | 0 |
| Receiver clock | Random walk process with spectral density of $10^5$ m2/s |
| Tropospheric | Hopfield model and Chao mapping function |
| Ionospheric | Klobuchar model |
| True integer ambiguity | PRN*10 |
| Receiver hardware bias | 0 |
| Satellite hardware bias | 0 |

FIG. 30

METHOD AND SYSTEM FOR PERFORMING PRECISE POINT POSITIONING (PPP) AMBIGUITY RESOLUTION USING GNSS TRIPLE FREQUENCY SIGNALS

CROSS-REFERENCE TO RELATED APPLICATIONS

This application claims priority to U.S. Provisional Patent Application Ser. No. 61/945,019 filed on Feb. 26, 2014, which is entitled "a method and system for performing Precise Point Positioning (PPP) ambiguity resolution using GNSS triple frequency signals," the entirety of which is incorporated herein by reference.

FIELD

This disclosure relates generally to Global Navigation Satellite Systems (GNSS), and more specifically, to a method and system for performing Precise Point Positioning (PPP) ambiguity resolution using GNSS triple frequency signals.

BACKGROUND

The era of Global Navigation Satellite System (GNSS) triple-frequency signals is approaching. Not only is this due to the modernization of United States (U.S.) Global Positioning System (GPS) and Russian GLObal NAvigation Satellite System (GLONASS), but also due to the emergence of other GNSS constellations including Galileo and BeiDou. Even with different frequency plans, each of the four GNSS systems may provide signals at more than three frequencies: L1/L2/L5 from GPS, L1-CDMA/L2-CDMA/L3-CDMA/L5-CDMA from GLONASS, E1/E5a/E5b/E6 from Galileo, and B1/B2/B3 from BeiDou.

Triple-frequency signals for different GNSS systems are generalized as GNSS-L1, GNSS-L2 and GNSS-L5, as listed in FIG. 1. As depicted, GPS L1, Galileo E1, BeiDou B1 and GLONASS L1-CDMA are represented as GNSS-L1. Similarly, GPS L2, Galileo E5b, BeiDou B3 and GLONASS L2-CDMA are represented as GNSS-L2. Additionally, GPS L5, Galileo E5a, BeiDou B2 and GLONASS L5-CDMA are represented as GNSS-L5. Three types of wide-lane (WL) combinations can be formed as shown in FIG. 2, with the maximum wavelength of 4.57-9.77 m using GNSS-L2 and GNSS-L5, and the minimum wavelength of 0.75-0.85 m using GNSS-L1 and GNSS-L5.

GNSS systems typically include three major components: earth-orbit satellites, ground control and tracking stations, and GNSS receivers. GNSS receivers have been used in various applications, including automobile navigation, emergency and location based services, tracking systems (e.g., for vehicles, persons, pets, or freight), marine navigations (e.g., for boats and ships), aircraft autopilot systems, real-time mapping, machine guidance at construction sites, mining, precision agriculture, land surveying, and deformation monitoring. Depending on the application, positioning accuracy requirements for the GNSS receivers may differ. For example, meter level accuracy is desirable for consumer grade receivers used for recreational and navigational purposes, while sub-meter level accuracy is desirable for mapping grade receivers for Geographical Information System (GIS) feature collection. Centimeter level accuracy is desirable for survey grade receivers. Currently there are two major GNSS precise positioning techniques used to achieve centimeter level accuracy: Real-Time Kinematic (RTK) and Precise Point Positioning (PPP).

As an alternative GNSS precise positioning technique to RTK, PPP is defined as the state-space solution to process pseudo-range and carrier-phase measurements from a single GNSS receiver by utilizing satellite constellation precise orbits and clock offsets determined by separate means. There are three key factors for PPP: precise orbit and clock, precise error source modeling, and the use of carrier phase measurements. PPP differs from RTK from several perspectives. Firstly, PPP eliminates the spatial operation limit because it has no regional base station requirement. The determination of precise GNSS orbit and clock to support PPP requires a global reference network, but its baseline length is normally hundreds to thousands of kilometers, which differs from RTK. Secondly, error source modeling of PPP is typically more complex than RTK. RTK uses the regional base station information to generate a double-difference, in which a majority of the error sources may be eliminated. Because local base stations are typically not available, the error sources affecting GNSS navigation accuracy in PPP have to be considered, such as atmospheric effects, relativistic effects, site displacements, antenna phase center corrections, and phase wind-up effects. Thirdly, PPP is a global positioning approach because its determined position solutions are referred to a global reference frame, and the corrections to support PPP (e.g., precise orbit and clock) are globally valid. However RTK provides local position solutions relative to the local base stations especially when the base coordinates are not precisely determined. Therefore PPP may provide better long-term repeatability and consistency than RTK. PPP has several advantages over RTK, but PPP requires a long time to converge the float ambiguity in order to ensure the centimeter level positioning accuracy, so this largely limits its adoption to real-time.

In Wang and Rothacher (2013), an ambiguity resolution method for triple-frequency geometry-free with an ionosphere-free combination for long baseline RTK was tested with real data. The data was not applicable to PPP because there was no consideration of the fractional biases for PPP ambiguities. Therefore, the triple-frequency GF IF linear combination methods discussed by Wang and Rothacher are insufficient for resolving PPP ambiguity in real world conditions.

In Li et al. (2013), consideration of PPP ambiguity resolution with GNSS triple-frequency measurement was discussed. After fixing the L2/L5 Extra Wide-Lane (EWL) and L1/L2 WL ambiguities, the new formed ionosphere-free measurement with L2/L5 WL and L1/L2 WL carriers was applied to improve the dual-frequency NL ambiguity resolution. However, Li's final PPP fixed solution still fully relies on the dual-frequency carrier phase and NL ambiguity resolution with ~10 cm wavelength, which is not achievable reliably within a short period of time and is not satisfactory for industry grade GNSS product development. Therefore, Li does not show how to resolve PPP ambiguity using triple-frequency methods.

In Geng and Bock (2013), the PPP ambiguity resolution approach for GPS triple-frequencies was investigated independently, but based on their result the ambiguity fixing also needed several minutes, which failed to compete with RTK. For example, Geng summarizes that when multipath effects become stronger, the performance of triple-frequency PPP ambiguity resolution is deteriorated considerably, and the correct ambiguity resolution is at 78% of all epochs. The consideration of the ambiguity fractional bias (i.e., UPD) follows the conventional approach, in which the fractional bias is modeled as one value for each satellite. The conventional approach does not handle high measurement noise issues at triple-frequency ionosphere-free carrier phases. Therefore, the methods discussed by Geng and Bock are also insufficient for resolving PPP ambiguity in real world conditions.

In Shen and Gao (2002), a smoothing technique was applied to improve the PPP float solution performance. However Shen and Gao apply a smoothing technique only for the code measurement. Accordingly, the prior art still fails to provide a robust triple-carrier ambiguity resolution method for PPP that is capable of rapid ambiguity resolution in a variety of noise conditions.

SUMMARY

Methods and systems for performing Precise Point Positioning (PPP) ambiguity resolution using Global Navigation Satellite Systems (GNSS) triple frequency signals are described. In an embodiment, the method may include computing, using a processing device, an L1/L2 or L2/L5 wide-lane fractional bias model, in which the bias is split into one direction-independent and three direction-dependent bias components for each satellite. Additionally, the method may include resolving, using the processing device, PPP ambiguity using triple-frequency signals. The method may also include applying, using the processing device, a carrier smooth carrier function to resolve measurement noise. In one embodiment, resolving the PPP ambiguity may include fixing the L2/L5 wide-lane ambiguities in a geometry-free function. Additionally, resolving the PPP ambiguity may include fixing the L1/L2 wide-lane ambiguities in a geometry-based function. Similarly, resolving the PPP ambiguity may also include fixing the L1/L5 wide-lane ambiguities in a geometry-based function.

In an embodiment, the method may include determining the L2/L5 wide-lane fractional bias product using Melbourne Wubenna combination. In addition, computing the L1/L2 or L1/L5 wide-lane fractional bias model may include determining a L1/L2 or L1/L5 wide-lane fractional bias product, in which the L1/L2 or L1/L5 wide-lane fractional bias is split into one direction-independent and three directional-dependent components for each satellite. Furthermore, the carrier smooth carrier function may include smoothing the triple-frequency ionosphere-free carrier phase measurement noise using L1/L2 or L1/L5 or L2/L5 dual-frequency ionosphere-free carrier phase measurement.

A system for performing PPP ambiguity resolution using GNSS triple frequency signals may include a processing device. Additionally, the system may include a memory coupled to the processing device. The memory may include executable instructions for causing the processing device to perform operations. In an embodiment the operations may include computing an L1/L2 or L2/L5 wide-lane fractional bias model, in which the bias is split into one direction-independent and three direction-dependent bias components for each satellite. Additionally, the operations may include resolving PPP ambiguity using triple-frequency signals. The operations may also include applying a carrier smooth carrier function to resolve measurement noise. In one embodiment, resolving the PPP ambiguity may include fixing the L2/L5 wide-lane ambiguities in a geometry-free function. Additionally, resolving the PPP ambiguity may include fixing the L1/L2 wide-lane ambiguities in a geometry-based function. Similarly, resolving the PPP ambiguity may also include fixing the L1/L5 wide-lane ambiguities in a geometry-based function.

In an embodiment, the operations may include determining the L2/L5 wide-lane fractional bias product using Melbourne Wubenna combination. In addition, computing the L1/L2 or L1/L5 wide-lane fractional bias model may include determining a L1/L2 or L1/L5 wide-lane fractional bias product, in which the L1/L2 or L1/L5 wide-lane fractional bias is split into one direction-independent and three directional-dependent components for each satellite. Furthermore, the carrier smooth carrier function may include smoothing the triple-frequency ionosphere-free carrier phase measurement noise using L1/L2 or L1/L5 or L2/L5 dual-frequency ionosphere-free carrier phase measurement.

A tangible computer-readable medium including instructions that, when executed by a processing device, cause the processing device to perform operations for performing PPP ambiguity resolution using GNSS triple frequency signals. In an embodiment the operations may include computing an L1/L2 or L2/L5 wide-lane fractional bias model, in which the bias is split into one direction-independent and three direction-dependent bias components for each satellite. Additionally, the operations may include resolving PPP ambiguity using triple-frequency signals. The operations may also include applying a carrier smooth carrier function to resolve measurement noise. In one embodiment, resolving the PPP ambiguity may include fixing the L2/L5 wide-lane ambiguities in a geometry-free function. Additionally, resolving the PPP ambiguity may include fixing the L1/L2 wide-lane ambiguities in a geometry-based function. Similarly, resolving the PPP ambiguity may also include fixing the L1/L5 wide-lane ambiguities in a geometry-based function.

In an embodiment, the operations may include determining the L2/L5 wide-lane fractional bias product using Melbourne Wubenna combination. In addition, computing the L1/L2 or L1/L5 wide-lane fractional bias model may include determining a L1/L2 or L1/L5 wide-lane fractional bias product, in which the L1/L2 or L1/L5 wide-lane fractional bias is split into one direction-independent and three directional-dependent components for each satellite. Furthermore, the carrier smooth carrier function may include smoothing the triple-frequency ionosphere-free carrier phase measurement noise using L1/L2 or L1/L5 or L2/L5 dual-frequency ionosphere-free carrier phase measurement.

In one embodiment, there may be two approaches to generate a L1 fractional bias product. The first approach (referred to herein as "approach I"), may include the bias product filter only estimating one direction-independent bias for each satellite. The second approach (referred to herein as "approach II"), may include an L1 fractional bias model where one DIFB and three DDFB may be estimated for each satellite. The raw L1 fractional bias input to the approach II is similar to approach I, but approach II is different due to the estimation in the bias filter.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 1 is a table illustrating generalized Global Navigation Satellite System (GNSS) triple-frequency signals.

FIG. 2 is a table illustrating wide-lane (WL) combination of generalized GNSS triple-frequency signals.

FIG. 3 is a table illustrating a measurement noise scale analysis for ionosphere-free combinations.

FIG. 4 is a table illustrating a test of selected reference sites.

FIG. 20 is a table illustrating the distances to the closest server reference site for client rover sites.

FIG. 30 is a table illustrating default configurations in a simulation.

DETAILED DESCRIPTION

Figure 5:
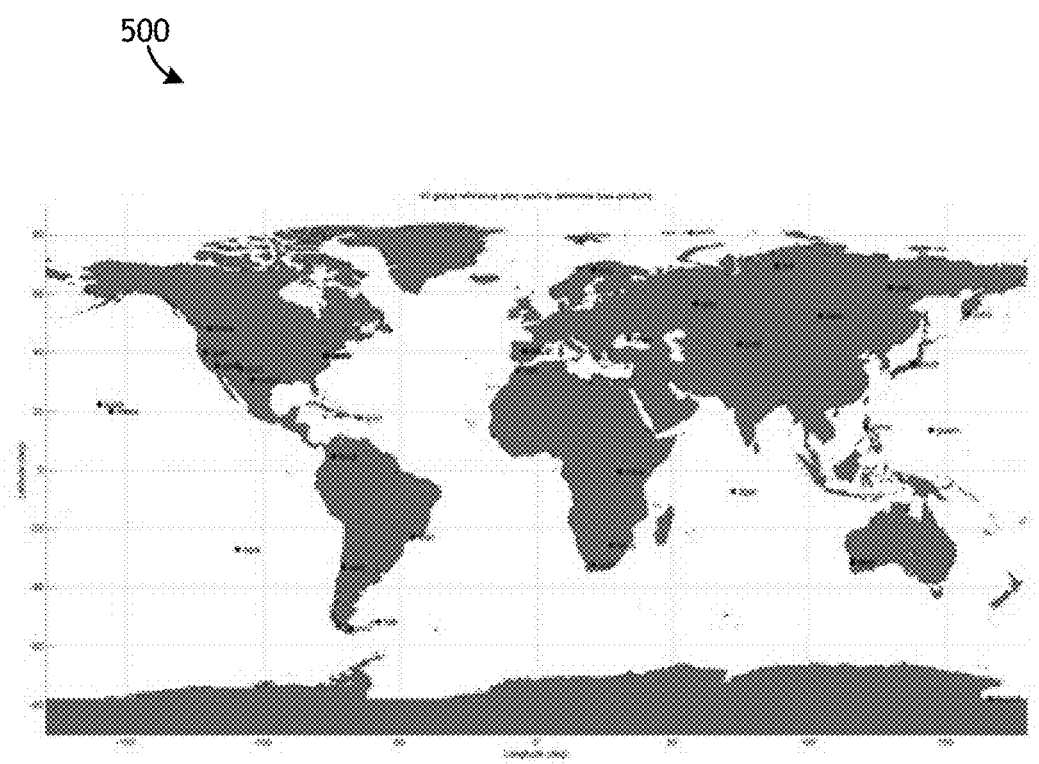
FIG. 5 is a block diagram illustrating a geographic distribution of reference sites that may be used as an input to a server.

Embodiments of methods and systems for performing Precise Point Positioning (PPP) ambiguity resolution using Global Navigation Satellite Systems (GNSS) triple frequency signals are described. In an embodiment, the present invention improves the performance of PPP ambiguity resolution with dual-frequency signals, in which the L1 fractional bias is split into one direction-independent and three directional-dependent components for each satellite.

In an embodiment, the present invention may provide instantaneous PPP ambiguity resolution with triple-frequency signals by fixing the L2/L5 wide-lane ambiguities with a geometry-free approach and fixing the L1/L2 wide-lane ambiguities with a geometry-based approach. Based test results with MATLAB simulation datasets and BeiDou real signal datasets, both L2/L5 wide-lane ambiguity and L1/L2 wide-lane ambiguity may be fixed instantaneously and reliably using a single epoch of triple-frequency measurements.

A carrier smooth carrier technique has been proposed to reduce the measurement noise for PPP ambiguity resolution with triple-frequency signals. PPP can achieve horizontal positioning accuracy of better than 5 cm and 3D positioning accuracy better than 10 cm with a convergence time of less than one minute. This performance is comparable to RTK. Furthermore, the present invention provides improved performance at both the server side and the client rover side.

By introducing the hardware bias terms into the GNSS measurement equation, it becomes much easier to understand the reason why PPP ambiguity may be described my non-integers. The un-differenced code and phase observation equations for GNSS signals at different signal bands can be expressed as:

$$P_{Li} = \rho + dT - dt + \delta Orb + \delta Clk + dSag + dTrop + \\ \gamma_{Li} dIono_{L1} + dRel + dSite + RB_{P_{Li}} - SB_{P_{Li}} + \varepsilon(P_{Li}) \quad \text{Equation 1}$$

$$\Phi_{Li} = \rho + dT - dt + \delta Orb + \delta Clk + dSag + \\ dTrop - \gamma_{Li} dIono_{L1} + dRel + dSite + dCenter + \\ dWind + \lambda_{Li} N_{Li} + RB_{\Phi_{Li}} - SB_{\Phi_{Li}} + \varepsilon(\Phi_{Li}) \quad \text{Equation 2}$$

Where:

$L_i$ is the GNSS signal bands (i.e., $L_1$, $L_2$, or $L_5$, etc.);

$P_{Li}$ is the measured pseudo-range on $L_i$ (m);

$\Phi_{Li}$ is the measured carrier-phase on $L_i$ (m);

ρ is the calculated geometric range with ephemeris (broadcast or precise) (m);

dT is the receiver clock error (m);

dt is the satellite clock error calculated with ephemeris (broadcast or precise) (m);

δOrb is the satellite orbit inaccuracy of the ephemeris (m);

δClk is the satellite clock inaccuracy of the ephemeris (m);

dSag is the Sagnac effect correction (m);

dTrop is the troposphere delay (m);

dIono$_{L1}$ is the ionosphere delay for code measurement or advance for carrier phase measurement on $L_1$ (m);

$\gamma_{Li}$ is the ionosphere dispersion coefficient for $L_i$, which can be calculated as $\gamma_{Li} = f_1^2/f_i^2$;

$f_i$ is the frequency on $L_i$ (Hz);

d Re l is the relativity effect correction (m);

dSite is the site displacement effect correction (m);

dCenter is the antenna phase center correction (m);

dWind is the antenna phase wind-up effect correction (m);

$\lambda_{Li}$ is the wavelength of $L_i$ (m);

$N_{Li}$ is the integer ambiguity term in measured carrier phase on $L_i$ (cycle);

RB* is the receiver hardware bias on measurement type * (m);

SB* is the satellite hardware bias on measurement type * (m); and

ε(*) is the noise including residual multipath on measurement type * (m).

The receiver and satellite hardware biases have properties that are not necessarily the same for different types of measurement. For instance the values for $RB_{P_{L1}}$, $RB_{P_{L2}}$, $RB_{\Phi_{L1}}$, $RB_{\Phi_{L2}}$ might be different. Similarly, values for $SB_{P_{L1}}$, $SB_{P_{L2}}$, $SB_{\Phi_{L1}}$, $SB_{\Phi_{L2}}$ might also be different, and these values may be inaccessible in an absolute sense. The receiver hardware bias RB* is the same for different satellites measured from a single receiver, which means that the Satellite-Satellite Single Difference (SSSD) at a single receiver can remove this term. Similarly, the satellite hardware bias SB* is the same for different receivers, which means that the Receiver-Receiver Single Difference (RRSD) can remove this term. Consequently, from the perspective of a double-difference (i.e., SSSD plus RRSD), the receiver and satellite hardware biases may be totally removed. In RTK the ambiguity is thus an integer after a double-difference. In regular PPP, both the receiver and hardware biases are estimated together with the true integer ambiguity viewed as one unknown. In the other words, the estimated PPP ambiguity is a non-integer. Before conducting PPP ambiguity resolution, it is desirable to investigate the properties of the hardware biases and then to use appropriate methods to recover the integer property of the PPP ambiguity. In an embodiment, a system for performing PPP ambiguity resolution using GNSS triple frequency signals may reduce the convergence time of PPP through ambiguity resolution, and boost PPP to reach its full potential, thereby achieving competitive performance against RTK via both positioning accuracy and convergence time. In one embodiment a system for performing PPP ambiguity resolution using GNSS triple frequency signals may include a new L1 fractional bias model, in which the bias is split into on direction-independent and three direction-dependent bias components for each satellite. In an embodiment performing PPP ambiguity resolution using GNSS triple frequency signals may include a new method of instantaneous PPP ambiguity resolution using triple-frequency signals, and a carrier smooth carrier technique to resolve the high measurement noise issue in the new ionosphere-free carrier phase combination.

Conventional methods for PPP ambiguity resolution with dual-frequency signals may include first fixing the WL ambiguity with a GFAR approach, applying the fixed WL ambiguity to the ionosphere-free measurement, and then fixing the L1 ambiguity (at NL wavelength) using a GBAR approach. Such a strategy has been used in the different publications related to the topic on PPP ambiguity resolution (Ge, 2008).

A geometry-free ambiguity resolution for wide-lane ambiguity may include a derivation from un-differenced raw measurements. After applying the error modeling for Sagnac, relativity, site displacements, antenna phase center corrections, and antenna phase wind-up effects, using the precise orbit and clock to calculate geometry and satellite clock error, the un-differenced observations discussed in Equation 1 and Equation 2 may become (respectively):

$$P_{Li} = \rho + dT + \delta Orb + \delta Clk + dTrop + \alpha_{Li} dIono_{L1} + + RB_{P_{Li}} - SB_{P_{Li}} + \varepsilon(P_{Li}) \quad \text{Equation 3}$$

$$\Phi_{Li} = \rho + dT + \delta Orb + \delta Clk + dTrop - \alpha_{Li} dIono_{L1} + \lambda_{Li} N_{Li} + RB_{\Phi_{Li}} - SB_{\Phi_{Li}} + \varepsilon(\Phi_{Li}) \quad \text{Equation 4}$$

In an embodiment, a wide-lane fractional bias product may be determined using a Melbourne-Wubbena combination. After the SSSD, a linear combination of NL pseudo-range and WL carrier phase measurement may be formed as:

$$\nabla P_{NL_{L1,L2}} = \frac{f_1}{f_1+f_2} \nabla P_{L1} + \frac{f_1}{f_1+f_2} \nabla P_{L2} \quad \text{Equation 5}$$
$$= \nabla \rho + \nabla \delta Orb + \nabla \delta Clk + \nabla dTrop + \frac{f_1}{f_2} \cdot$$
$$\nabla dIono_{L1} - \nabla SB_{P_{NL_{L1,L2}}} + \varepsilon(\nabla P_{NL_{L1,L2}})$$

$$\nabla \Phi_{WL_{L1,L2}} = \frac{f_1}{f_1-f_2} \nabla \Phi_{L1} - \frac{f_2}{f_1-f_2} \nabla \Phi_{L2} \quad \text{Equation 6}$$
$$= \nabla \rho + \nabla \delta Orb + \nabla \delta Clk + \nabla dTrop +$$
$$\frac{f_1}{f_2} \nabla dIono_{L1} + \lambda_{WL_{L1,L2}} \nabla N_{WL_{L1,L2}} -$$
$$\nabla SB_{\Phi_{WL_{L1,L2}}} + \varepsilon(\nabla \Phi_{WL_{L1,L2}})$$

A pseudo WL ambiguity may be obtained using the Melbourne-Wubbena phase/pseudo-range combination that removes the geometry and ionosphere, as shown in equation 7.

$$\nabla gfA_{WL_{L1,L2}} = \frac{(\nabla \Phi_{WL_{L1,L2}} - \nabla P_{NL_{L1,L2}})}{\lambda_{WL_{L1,L2}}} \quad \text{Equation 7}$$
$$= \nabla N_{WL_{L1,L2}} - \frac{(\nabla SB_{\Phi_{WL_{L1,L2}}} - \nabla SB_{P_{NL_{L1,L2}}})}{\lambda_{WL_{L1,L2}}}$$
$$= \nabla N_{WL_{L1,L2}} + \nabla gfAB_{WL_{L1,L2}}$$
$$= \nabla N_{WL_{L1,L2}} + \nabla gfIB_{WL_{L1,L2}} + \nabla gfFB_{WL_{L1,L2}}$$
$$= \nabla gfM_{WL_{L1,L2}} + \nabla gfFB_{WL_{L1,L2}}$$

where: $\nabla gfA_{WL}^*$ is the pseudo non-integer WL ambiguity (cycle), determined in geometry-free approach using Melbourne-Wubbena phase/pseudo-range combination; $\nabla gfM_{WL}$, is the pseudo integer WL ambiguity to be fixed in cycle, and the reason why the WL ambiguity is called as a pseudo integer is due to: $\nabla gfM_{WL}^* = \nabla N_{WL}^* + \nabla gfB_{WL}^*$; $\nabla gfAB_{WL}^*$ is WL ambiguity bias in cycle, which is typically not accessible in an absolute sense and has the relationship with satellite biases as:

$\nabla gfAB_{WL}^* = (\nabla SB_{P_{NL}}^* - \nabla SB_{\Phi_{WL}}^*)/\lambda_{WL}^*$;

and it can be split into integer part and fractional part as: $\nabla gfAB_{WL}^* = \nabla gfIB_{WL}^* + \nabla gfFB_{WL}^*$ $\nabla gfIB_{WL}$, is WL integer bias in cycle, which is typically not accessible either and is the round-off integer value of $\nabla gfAB_j$; and $\nabla gfFI3_{wL}$, is the WL fractional bias in cycle, which is receiver-independent and may be determined using global reference network at server and sent to client rover before conducting GFAR for WL ambiguity.

This fractional bias can be determined with Melbourne-Wubbena combination as depicted in equation 8.

$$\nabla gfFB_{WL^*} = \frac{(\nabla \Phi_{WL^*} - \nabla P_{NL^*})}{\lambda_{WL^*}} - Roundoff\left[\frac{(\nabla \Phi_{WL^*} - \nabla P_{NL^*})}{\lambda_{WL^*}}\right] \quad \text{Equation 8}$$

After the WL fractional bias is determined from a global reference network by a server and transmitted to a rover, the rover can fix the pseudo integer WL ambiguity with a geometry-free approach by averaging over time for the Melbourne-Wubbena phase/pseudo-range combination as shown in equation 9.

$$\nabla gfM_{W_{L1,L2}} = \frac{\sum_{t=1}^{n}\left[\frac{\nabla \Phi_{W_{L1,L2}}(t) - \nabla P_{N_{L1,L2}}(t)}{\lambda_{W_{L1,L2}}}\right]}{n} - \nabla gfFB_{W_{L1,L2}} \quad \text{Equation 9}$$

In one embodiment, the resolution of L1 ambiguity may include a geometry-based method. After SSSD, the ionosphere-free carrier phase combination for dual-frequency signals PPP may be as shown in equation 10.

$$\nabla \Phi_{IF_{L1,L2}} = \frac{f_1^2 \nabla \Phi_{L1} - f_2^2 \nabla \Phi_{L2}}{f_1^2 - f_2^2} \quad \text{Equation 10}$$

$$= \nabla \rho + \nabla \delta Orb + \nabla \delta Clk + \nabla dTrop + \frac{f_1^2 \lambda_1 \nabla N_{L1} - f_2^2 \lambda_2 \nabla N_{L2}}{f_1^2 - f_2^2} - \nabla SB_{\Phi_{IF_{L1,L2}}} + \varepsilon(\nabla \Phi_{IF_{L1,L2}})$$

In PPP, the geometry $\nabla \rho$ and the troposphere residual $\nabla dTrop$ are typically estimated. The estimated ambiguity in the model may be shown by equation 11.

$$\nabla gb\alpha_{IF_{L1,L2}} = (\nabla \delta Orb + \nabla \delta Clk) + \frac{f_1^2 \lambda_1 \nabla N_{L1} - f_2^2 \lambda_2 \nabla N_{L2}}{f_1^2 - f_2^2} - \nabla SB_{\Phi_{IF_{L1,L2}}} \quad \text{Equation 11}$$

Based on the estimated ambiguity, equation 10 becomes equation 12.

$$\nabla \Phi_{IF_{L1,L2}} = \nabla \rho + \nabla dTrop + \nabla gb\alpha_{IF_{L1,L2}} + \varepsilon(\nabla \Phi_{IF_{L1,L2}}) \quad \text{Equation 12}$$

Because $\nabla N_{L2} = \nabla N_{L1} - \nabla N_{W_{L1,L2}}$, the expression of equation 11 may be rewritten as equation 13.

$$\nabla gb\alpha_{IF_{L1,L2}} = (\nabla \delta Orb + \nabla \delta Clk) + \quad \text{Equation 13}$$
$$\left(\lambda_{NL_{L1,L2}} \nabla N_{L1} + \frac{f_2}{f_1 + f_2} \lambda_{W_{L1,L2}} \nabla N_{W_{L1,L2}}\right) - \nabla SB_{\Phi_{IF_{L1,L2}}}$$

Considering the relationship between the WL ambiguity truth and the pseudo integer WL ambiguity from equation 7 that $\nabla N_{W_{L1,L2}} = \nabla gfM_{W_{L1,L2}} - \nabla gfIB_{W_{L1,L2}}$, the expression of equation 13 can be further revised as equations 14 and 15 (respectively).

$$\text{Equation 14}$$
$$\nabla gb\alpha_{IF_{L1,L2}} = \frac{f_2}{f_1 + f_2}\lambda_{W_{L1,L2}} \nabla M_{W_{L1,L2}} + \left\{(\nabla \delta Orb + \nabla \delta Clk) + \left(\lambda_{NL_{L1,L2}} \nabla N_{L1} - \frac{f_2}{f_1 + f_2}\lambda_{W_{L1,L2}} \nabla gfIB_{W_{L1,L2}}\right) - \nabla SB_{\Phi_{IF_{L1,L2}}}\right\} = $$
$$\frac{f_2}{f_1 + f_2}\lambda_{W_{L1,L2}} \nabla gfM_{W_{L1,L2}} + \lambda_{NL_{L1,L2}} \nabla gbA_{L1}$$

$$\text{Equation 15}$$
$$\nabla gfA_{L1} = \nabla N_{L1} + \frac{(\nabla \delta Orb + \nabla \delta Clk) - \frac{f_2}{f_1 + f_2}\lambda_{W_{L1,L2}} \nabla gfIB_{W_{L1,L2}} - \nabla dSB_{\Phi_{IF_{L1,L2}}}}{\lambda_{NL_{L1,L2}}}$$
$$= \nabla N_{L1} + \nabla gbAB_{L1}$$
$$= \nabla N_{L1} + \nabla gbIB_{L1} + \nabla gbFB_{L1}$$
$$= \nabla gbM_{L1} + \nabla gbFB_{L1}$$

Where:
$\nabla gbA_{L1}$ is the pseudo non-integer L1 ambiguity (i.e., in the L1/L2 NL cycle), estimated via a geometry-based approach;
$\nabla gbM_{L1}$ is the pseudo integer L1 ambiguity to be fixed in the NL cycle, where the reason why such an ambiguity is called as a pseudo integer is because:

$\nabla gbM_{L1} = \nabla N_{L1} + \nabla gbIB_{L1}$;

$\nabla gbAB_{L1}$ is the L1 ambiguity bias in the NL cycle, which is typically not accessible in an absolute sense and has the relationship with orbit and clock inaccuracy, WL integer bias, and satellite bias as:

$$\nabla gbAB_{L1} = \frac{(\nabla \delta Orb + \nabla \delta Clk) - \frac{f_2}{f_1 + f_2}\lambda_{W_{L1,L2}} \nabla gfIB_{W_{L1,L2}} - \nabla dSB_{\Phi_{IF_{L1,L2}}}}{\lambda_{NL_{L1,L2}}},$$

And furthermore it can be split into integer part and fractional part as:

$\nabla gbAB_{L1} = \nabla gbIB_{L1} + \nabla gbFB_{L1}$;

$\nabla gbIB_{L1}$ is the L1 integer bias in the NL cycle, which is typically not accessible in an absolute sense and is the round-off integer value of $\nabla gbAB_{L1}$; and $\nabla gbFB_{L1}$ is the L1 fractional bias in the NL cycle, which is also receiver-independent and may be determined using a global reference network at a server and sent to a client rover before conducting GBAR for L1 ambiguity.

In one embodiment performing PPP ambiguity resolution using GNSS triple frequency signals may include fixing the pseudo integer L1 ambiguity. After the pseudo WL integer ambiguity is resolved and the L1 fractional bias is determined from a global reference network at a server and transmitted to a rover, equation 12 can be changed as equation 16.

$$\left(\nabla \Phi_{IF_{L1,L2}} - \frac{f_2}{f_1+f_2} \lambda_{WL_{L1,L2}} \nabla gfM_{WL_{L1,L2}} - \lambda_{NL_{L1,L2}} \nabla gbFB_{L1}\right) = \nabla \rho + \nabla dTrop + \lambda_{NL_{L1,L2}} \nabla gbM_{L1} + \varepsilon(\nabla \Phi_{IF_{L1,L2}})$$

Equation 16

Then the rover can fix the pseudo integer L1 ambiguity with a GBAR approach, for example a LAMBDA method.

In one embodiment performing PPP ambiguity resolution using GNSS triple frequency signals may include a server algorithm to generate bias products. At each reference station, the raw individual SSSD WL fractional bias with Melbourne-Wubbena combination may be calculated as shown in equation 17.

$$\nabla gfB_{WL_{L1,L2}}^{i,j} =$$

$$gfB_{WL_{L1,L2}}^j - gfB_{WL_{L1,L2}}^i = \frac{\left(\nabla \Phi_{WL_{L1,L2}}^{i,j} - \nabla P_{NL_{L1,L2}}^{i,j}\right)}{\lambda_{WL_{L1,L2}}} - Roundoff\left[\frac{\left(\nabla \Phi_{WL_{L1,L2}}^{i,j} - \nabla P_{NL_{L1,L2}}^{i,j}\right)}{\lambda_{WL_{L1,L2}}}\right]$$

Equation 17

In an embodiment, a separate filter may be created to estimate the WL fractional bias product with raw individual inputs together with an additional constraint to resolve the filter rank defect issue as seen in equation 18, where one assumes the number of observed satellites is n.

$$\sum_{i=1}^{n} gfB_{WL_{L1,L2}}^i = 0$$

Equation 18

In one embodiment, after the server begins producing the WL fractional bias product using a global reference network, the GFAR can be conducted at each individual reference site to fix the pseudo WL integer ambiguity. At a reference site, the receiver position can be pre-determined precisely through a coordinate survey. While using the precise orbit together with the surveyed receiver position to determine the geometry distance and applying the pseudo-fixed WL integer ambiguity, the measurement from equation 12 may be changed as equation 19.

$$\left(\nabla \Phi_{IF_{L1,L2}} - \nabla \rho - \frac{f_2}{f_1+f_2} \lambda_{WL_{L1,L2}} \nabla gfM_{WL_{L1,L2}}\right) = \nabla dTrop + \lambda_{NL_{L1,L2}} \nabla gbA_{L1} + \varepsilon(\nabla \Phi_{IF_{L1,L2}})$$

Equation 19

Consequently, at each reference site, only the troposphere and the pseudo non-integer L1 ambiguity are typically estimated. After the estimation is converged at each reference site, the raw individual SSSD L1 fractional bias between satellite i and j may be calculated as depicted in equation 20.

$$\nabla gbFB_{L1}^{i,j} =$$

$$gbFB_{L1}^j - gbFB_{L1}^i = \nabla gbA_{L1}^{i,j} - Roundoff[\nabla gbA_{L1}^{i,j}]$$

Equation 20

Similar to a WL fractional bias product, a separate filter may be created to estimate the L1 fractional bias product with raw individual inputs together with the additional constraints of equation 21 to resolve the filter rank defect issue, where the number of observed satellites is assumed to be n.

$$\sum_{i=1}^{n} gbFB_{L1}^i = 0$$

Equation 21

In an embodiment, a new model for a geometry-based fractional bias product may include the approach described below in equations 22 and 23. Currently the most popular conventional approach to estimate the geometry-based fractional bias, which is a L1 fractional bias for dual-frequency PPP ambiguity, is to estimate it as one Direction-Independent Fractional Bias (DIFB). But based on equation 15, the satellite orbit inaccuracy of the precise ephemeris, which is direction-dependent, is also included in the L1 fractional bias. A new model for a geometry-based fractional bias product may include estimating the L1 fractional bias product. In the new model, three additional Direction-Dependent Fractional Bias (DDFB) terms are introduced to represent the orbit inaccuracies at X, Y and Z directions besides the DIFB, as seen in equation 22.

$$\nabla gbFB_{L1}^{i,j} = \begin{bmatrix} 1 & \nabla H_x^{i,j} & \nabla H_y^{i,j} & \nabla H_z^{i,j} \end{bmatrix} \begin{bmatrix} \nabla gbDIFB_{L1}^{i,j} \\ \nabla gbDDFB_{L1,x}^{i,j} \\ \nabla gbDDFB_{L1,y}^{i,j} \\ \nabla gbDDFB_{L1,z}^{i,j} \end{bmatrix}$$

Equation 22

Similarly, an additional four zero constraint measurements are used to resolve the filter rank defect issue as seen in equation 23, where assumes the number of observed satellites is n.

$$\sum_{i=1}^{n} gbDIFB_{L1}^i = 0$$

$$\sum_{i=1}^{n} gbDDFB_{L1,x}^i = 0$$

$$\sum_{i=1}^{n} gbDDFB_{L1,y}^i = 0$$

$$\sum_{i=1}^{n} gbDDFB_{L1,z}^i = 0$$

Equation 23

In an embodiment, a method and system for performing PPP ambiguity resolution using GNSS triple frequency signals may include instantaneous PPP ambiguity resolution with triple-frequency signals. The era of GNSS triple-frequency signals is approaching, not only due to the modernization of GPS and GLONASS, but also due to the emergence of other GNSS constellations including Galileo and BeiDou. Some triple-frequency capable GNSS satellites are already in orbit, including 4 GPS Block-IIF satellites with L5 payload, 4 Galileo IOV satellites transmitting signals at E1, E5ab and E6 frequency bands, and 14 active BeiDou-2 satellites with B1, B2 and B3 frequency bands. It is worth investigating the impact to PPP ambiguity resolution while triple-frequency GNSS signals are available.

In one embodiment, performing PPP ambiguity resolution using GNSS triple frequency signals may include a geometry-free ambiguity resolution for L2/L5 wide-lane ambiguity. For triple-frequency GNSS signals, after SSSD, the linear combiner of NL pseudo-orange and WL carrier phase measurements for L2/L5 may be formed as equations 24 and 25.

$$\nabla P_{NL_{L2,L5}} = \frac{f_2}{f_2+f_5}\nabla P_{L2} + \frac{f_5}{f_2+f_5}\nabla P_{L5}$$
$$= \nabla\rho + \nabla\delta Orb + \nabla\delta Clk + \nabla dTrop +$$
$$\frac{f_1^2}{f_2 f_5}\cdot\nabla dIono_{L1} - \nabla SB_{P_{NL_{L2,L5}}} + \varepsilon(\nabla P_{NL_{L2,L5}})$$

Equation 24

$$\nabla\Phi_{WL_{L2,L5}} = \frac{f_2}{f_2-f_5}\nabla\Phi_{L2} - \frac{f_5}{f_2-f_5}\nabla\Phi_{L5}$$
$$= \nabla\rho + \nabla\delta Orb + \nabla\delta Clk + \nabla dTrop +$$
$$\frac{f_1^2}{f_2 f_5}\nabla dIono_{L1} + \lambda_{WL_{L2,L5}}\nabla N_{WL_{L2,L5}} -$$
$$\nabla SB_{\Phi_{WL_{L2,L5}}} + \varepsilon(\nabla\Phi_{WL_{L2,L5}})$$

Equation 25

A pseudo L2/L5 WL ambiguity can be obtained using the Melbourne-Wubbena phase/pseudo-range combination for L2 and L5 that removes the geometry, the ionosphere, and the inaccuracy of the orbit and clock, as depicted in equation 26.

$$\nabla gfA_{WL_{L2,L5}} = \frac{(\nabla\Phi_{WL_{L2,L5}} - \nabla P_{NL_{L2,L5}})}{\lambda_{WL_{L2,L5}}}$$
$$= \nabla N_{WL_{L2,L5}} - \frac{(\nabla SB_{\Phi_{WL_{L2,L5}}} - \nabla SB_{P_{NL_{L2,L5}}})}{\lambda_{WL_{L2,L5}}}$$
$$= \nabla N_{WL_{L2,L5}} + \nabla gfAB_{WL_{L2,L5}}$$
$$= \nabla N_{WL_{L2,L5}} + \nabla gfIB_{WL_{L2,L5}} + \nabla gfFB_{WL_{L2,L5}}$$
$$= \nabla gfM_{WL_{L2,L5}} + \nabla gfFB_{WL_{L2,L5}}$$

Equation 26

Where all of the denotations and variables in equation 26 represent the same things as in equation 7, except that the Melbourne-Wubbena combination is for L2/L5 rather than for L1/L2. After the geometry-free L2/L5 WL fractional bias is determined from a global reference network at a server and transmitted to a rover, similar to equation 8, the rover can fix the pseudo integer L2/L5 WL ambiguity with geometry-free approach by the averaging over time for the corresponding Melbourne-Wubbena phase/pseudo-range combination as shown in equation 27.

$$\nabla gfM_{WL_{L2,L5}} = \frac{\sum_{t=1}^{n}\left[\frac{\nabla\Phi_{WL_{L2,L5}}(t) - \nabla P_{NL_{L2,L5}}(t)}{\lambda_{WL_{L2,L5}}}\right]}{n} - \nabla gfFB_{WL_{L2,L5}}$$

Equation 27

The wavelength for this L2/L5 WL ambiguity is about 5.86 m, taking GPS signals as an example. Typically using one epoch of measurements can achieve a success rate of fixing over 99% of the ambiguity, and thus the instantaneous fixing of an L2/L5 WL ambiguity is possible.

In an embodiment, performing PPP ambiguity resolution using GNSS triple frequency signals may include a geometry-based ambiguity resolution for the other wide-lane ambiguity (e.g., to resolve the L1/L2 wide-lane). In one embodiment, the L2/L5 wide-lane may be combined with the L1/L2 wide-lane to ionosphere free. One of the new ionosphere-free carrier phase combinations used for a PPP model with triple-frequency GNSS signals can be formed with the L1/L2 WL carrier in equation 6 and the L2/L5 WL carrier in equation 25, as follows in equation 28.

$$\nabla\Phi_{IF(WL_{L1,L2},WL_{L2,L5})} = \frac{\frac{f_2}{f_1}}{\frac{f_2}{f_1}-\frac{f_2 f_5}{f_1^2}}\nabla\Phi_{WL_{L1,L2}} - \frac{\frac{f_2 f_5}{f_1^2}}{\frac{f_2}{f_1}-\frac{f_2 f_5}{f_1^2}}\nabla\Phi_{WL_{L2,L5}}$$
$$= \nabla\rho + \nabla\delta Orb + \nabla\delta Clk + \nabla dTrop +$$
$$\frac{f_1}{f_1-f_5}\lambda_{WL_{L1,L2}}\nabla N_{WL_{L1,L2}} -$$
$$\frac{f_5}{f_1-f_5}\lambda_{WL_{L2,L5}}\nabla N_{WL_{L2,L5}} -$$
$$\nabla SB_{\Phi_{IF(WL_{L1,L2},WL_{L2,L5})}} + \varepsilon[\Phi_{IF(WL_{L1,L2},WL_{L2,L5})}]$$

Equation 28

The estimated ambiguity in equation 28 may be modeled as shown below in equation 29.

$$\nabla gb\alpha_{IF(WL_{L1,L2},WL_{L2,L5})} =$$
$$(\nabla\delta Orb + \nabla\delta Clk) + \frac{f_1}{f_1-f_5}\lambda_{WL_{L1,L2}}\nabla N_{WL_{L1,L2}} -$$
$$\frac{f_5}{f_1-f_5}\lambda_{WL_{L2,L5}}\nabla N_{WL_{L2,L5}} - \nabla SB_{\Phi_{IF(WL_{L1,L2},WL_{L2,L5})}}$$

Equation 29

Therefore equation 28 may then become equation 30, as depicted below.

$$\nabla\Phi_{IF(WL_{L1,L2},WL_{L2,L5})} = \nabla\rho + \nabla\delta Clk + \nabla dTrop + \nabla gb\alpha_{IF(WL_{L1,L2},WL_{L2,L5})} + \varepsilon[\nabla\Phi_{IF(WL_{L1,L2},WL_{L2,L5})}]$$

Equation 30

In one embodiment, performing PPP ambiguity resolution using GNSS triple frequency signals may include modeling from ionosphere-free ambiguity to L1/L2 wide-lane ambiguity. Due to the relationship between the L2/L5 WL ambiguity truth and the pseudo integer WL ambiguity of $\nabla N_{WL_{L2,L5}} = \nabla gfM_{WL_{L2,L5}} - \nabla gfIB_{WL_{L2,L5}}$, equation 29 can be revised as shown in equation 31.

Equation 31

$$\nabla gb\alpha_{IF(WL_{L1,L2},WL_{L2,L5})} = (\nabla\delta Orb + \nabla\delta Clk) + \frac{f_1}{f_1-f_5}\lambda_{WL_{L1,L2}}\nabla N_{WL_{L1,L2}} -$$
$$\frac{f_5}{f_1-f_5}\lambda_{WL_{L2,L5}}(\nabla M_{WL_{L2,L5}} - \nabla gfIB_{WL_{L2,L5}}) -$$
$$\nabla SB_{IF(WL_{L1,L2},WL_{L2,L5})}$$
$$= -\frac{f_5}{f_1-f_5}\lambda_{WL_{L2,L5}}\nabla gfM_{WL_{L2,L5}}(\nabla\delta Orb + \nabla\delta Clk) +$$
$$\frac{f_1}{f_1-f_5}\lambda_{WL_{L1,L2}}\nabla N_{WL_{L1,L2}} +$$
$$\frac{f_5}{f_1-f_5}\lambda_{WL_{L2,L5}}\nabla gfIB_{WL_{L2,L5}} -$$
$$\nabla SB_{\Phi_{IF(WL_{L1,L2},WL_{L2,L5})}}$$
$$= -\frac{f_5}{f_1-f_5}\lambda_{WL_{L2,L5}}\nabla gfM_{WL_{L2,L5}} +$$
$$\frac{f_1}{f_1-f_5}\lambda_{WL_{L1,L2}}\nabla gbA_{WL_{L1,L2}}$$

And

-continued $$\nabla gbA_{WL_{L1,L2}} = \nabla N_{WL_{L1,L2}} + \frac{(\nabla \delta Orb + \nabla \delta Clk) + \frac{f_5}{f_1 - f_5}\lambda_{WL_{L2,L5}}\nabla gfIB_{WL_{L2,L5}} - \nabla SB_{\Phi_{IF(WL_{L1,L2},WL_{L2,L5})}}}{\frac{f_1}{f_1 - f_5}\lambda_{WL_{L1,L2}}}$$

$$= \nabla N_{WL_{L1,L2}} + \nabla gbAB_{WL_{L1,L2}}$$

$$= \nabla N_{WL_{L1,L2}} + \nabla gbIB_{WL_{L1,L2}} + \nabla gbFB_{WL_{L1,L2}}$$

$$= \nabla gbM_{WL_{L1,L2}} + \nabla gbFB_{WL_{L1,L2}}$$

equation 32 where $\nabla gbA_{WL_{L1,L2}}$ is the pseudo non-integer L1/L2 WL ambiguity using a geometry-based approach in cycle (i.e., the wavelength is $$\frac{f_1}{f_1 - f_5}\lambda_{WL_{L1,L2}},$$

which is about 3.4 m for GPS). All the other denotations and variables shown in equation 32 represent same things as in equation 15, except that the ambiguity terms are for $WL_{L1,L2}$ rather than for L1.

In an embodiment, performing PPP ambiguity resolution using GNSS triple frequency signals may include fixing the L1/L2 wide-lane pseudo integer ambiguity. After the pseudo L2/L5 WL integer ambiguity is resolved and the L1/L2 WL fractional bias fractional bias is determined from a global reference network at a server and transmitted to a rover, equation 30 can be changed as shown in equation 33 below.

$$\left(\nabla \Phi_{IF(WL_{L1,L2},WL_{L2,L5})} + \frac{f_5}{f_1 - f_5}\lambda_{WL_{L2,L5}}\nabla gfM_{WL_{L2,L5}} - \frac{f_1}{f_1 - f_5}\lambda_{WL_{L1,L2}}\nabla gbFB_{WL_{L1,L2}}\right) =$$

$$\nabla \rho + \nabla dTrop + \frac{f_1}{f_1 - f_5}\lambda_{WL_{L1,L2}}\nabla gbM_{WL_{L1,L2}} + \varepsilon\left(\nabla \Phi_{IF(WL_{L1,L2},WL_{L2,L5})}\right)$$

Equation 33

In one embodiment, the rover may then fix the pseudo L1/L2 WL integer ambiguity with a geometry-based approach, such as the LAMBDA method. The valid wavelength for this ambiguity is typically about 3.4 m, taking GPS signals as an example. In an embodiment the GBAR can achieve ambiguity fixing instantaneously while handling such a large wavelength.

In another embodiment, an option may be to resolve the L1/L5 wide-lane. Alternatively, the other WL carrier measurement, L1/L5 WL, may be used together with the L2/L5 WL to form the other type of ionosphere-free combination as shown below in equation 34 and equation 35.

$$\nabla \Phi_{IF(WL_{L1,L5},WL_{L2,L5})} =$$

$$\frac{\frac{f_5}{f_1}}{\frac{f_5}{f_1} - \frac{f_2 f_5}{f_1^2}}\nabla \Phi_{WL_{L2,L5}} - \frac{\frac{f_2 f_5}{f_1^2}}{\frac{f_5}{f_1} - \frac{f_2 f_5}{f_1^2}}\nabla \Phi_{WL_{L2,L5}} =$$

$$\nabla \rho + \nabla \delta Orb + \nabla \delta Clk + \nabla dTrop + \frac{f_1}{f_1 - f_2}\lambda_{WL_{L1,L5}}$$

$$\nabla N_{WL_{L1,L5}} - \frac{f_2}{f_1 - f_2}\lambda_{WL_{L2,L5}}\nabla N_{WL_{L2,L5}} -$$

$$\nabla SB_{\Phi_{IF(WL_{L1,L5},WL_{L2,L5})}} + \varepsilon\left[\nabla \Phi_{IF(WL_{L1,L5},WL_{L2,L5})}\right]$$

Equation 34

$$\nabla \Phi_{WL_{L1,L5}} = \frac{f_1}{f_1 - f_5}\nabla \Phi_{L1} - \frac{f_5}{f_1 - f_5}\nabla \Phi_{L5}$$

$$= \nabla \rho + \nabla \delta Orb + \nabla \delta Clk + \nabla dTrop +$$

$$\frac{f_1}{f_5}\nabla dIono_{L1} + \lambda_{WL_{L1,L5}}\nabla N_{WL_{L1,L5}} -$$

$$\nabla SB_{\Phi_{WL_{L1,L5}}} + \varepsilon\left(\nabla \Phi_{WL_{L1,L5}}\right)$$

Equation 35

Similarly, after the geometry-free pseudo L2/L5 WL integer ambiguity is resolved, the L1/L5 WL fractional bias fractional bias can be determined from a global reference network at a server and transmitted to a rover, the similar expression to equation 33 may be shown as equation 36 below.

$$\left(\nabla \Phi_{IF(WL_{L1,L5},WL_{L2,L5})} + \frac{f_2}{f_1 - f_2}\lambda_{WL_{L2,L5}}\nabla gfM_{WL_{L2,L5}} - \frac{f_1}{f_1 - f_2}\lambda_{WL_{L1,L5}}\nabla gbFB_{WL_{L1,L5}}\right) =$$

$$\nabla \rho + \nabla dTrop + \frac{f_1}{f_1 - f_2}\lambda_{WL_{L1,L5}}\nabla gbM_{WL_{L1,L5}} + \varepsilon\left(\nabla \Phi_{IF(WL_{L1,L5},WL_{L2,L5})}\right)$$

Equation 36

In an embodiment, the effective wavelength for pseudo L1/L5 WL integer ambiguity may be the same as for the pseudo L1/L2 WL integer ambiguity, as discussed in equation 33, where the effective wavelength may be described as:

$$\frac{cf_1}{(f_1 - f_2)(f_1 - f_5)} \approx 3.4 \text{ m.}$$

In one embodiment, performing PPP ambiguity resolution using GNSS triple frequency signals may include server algorithms to generate bias products, such as the L2/L5 wide-lane fractional bias product and/or the L1/L2 wide-lane fractional bias product. At each reference station, the raw individual SSSD L2/L5 WL fractional bias with a Melbourne-Wubbena combination may be calculated as shown in equation 36 below.

$$\nabla gfFB^{i,j}_{WL_{L2,L5}} =$$

$$gfFB^i_{WL_{L2,L5}} - gfFB^j_{WL_{L2,L5}} = \frac{\left(\nabla \Phi^{i,j}_{WL_{L2,L5}} - \nabla P^{i,j}_{NL_{L2,L5}}\right)}{\lambda_{WL_{L2,L5}}} -$$

$$Roundoff\left[\frac{\left(\nabla \Phi^{i,j}_{WL_{L2,L5}} - \nabla P^{i,j}_{NL_{L2,L5}}\right)}{\lambda_{WL_{L2,L5}}}\right]$$

Equation 36

Where the other filter may be created to estimate the L2/L5 WL fractional bias product with raw individual inputs together with additional constraints to resolve the filter rank defect issue as seen in equation 37 below, which assumes the number of observed satellites is n.

$$\sum_{i=1}^{n} gfFB^i_{WL_{L2,L5}} = 0 \quad \text{Equation 37}$$

In a similar manner to the dual-frequency signals case, instantaneous PPP ambiguity resolution with triple-frequency signals may include the server beginning to produce the L2/L5 WL fractional bias product using a global reference network, and the GFAR may be conducted at each individual reference site to fix the pseudo L2/L5 WL integer ambiguity. Based on equation 37, the expression after resolving the pseudo L2/L5 WL integer ambiguity may be described as shown in equation 38 below.

$$\left(\nabla \Phi_{IF(WL_{L1,L2}, WL_{L2,L5})} - \nabla \rho + \frac{f_5}{f_1 - f_5} \lambda_{WL_{L2,L5}} \nabla gfM_{WL_{L2,L5}}\right) = \quad \text{Equation 38}$$
$$\nabla dTrop + \frac{f_1}{f_1 - f_5} \lambda_{WL_{L1,L2}} \nabla gbA_{WL_{L1,L2}} + \varepsilon\left(\nabla \Phi_{IF(WL_{L1,L2}, WL_{L2,L5})}\right)$$

In an embodiment, at each reference site only the troposphere and the pseudo non-integer L1/L2 WL ambiguity may be estimated. After the estimation is converged at each reference site, the raw individual SSSD L1/L2 WL fractional bias between satellite i and j is calculated as follows.

$$\nabla gbFB^{i,j}_{WL_{L1,L2}} = gbFB^j_{WL_{L1,L2}} - gbFB^i_{WL_{L1,L2}} = \quad \text{Equation 39}$$
$$\nabla gbA^{i,j}_{WL_{L1,L2}} - Roundoff\left[\nabla gbA^{i,j}_{WL_{L1,L2}}\right]$$

For the L1/L2 WL fraction bias product filter, if only one direction-independent fractional term is desirable (e.g., similar to equation 37), then the zero constraint in equation 40 below helps to resolve the filter rank defect issue.

$$\sum_{i=1}^{n} gbFB^i_{WL_{L1,L2}} = 0 \quad \text{Equation 40}$$

In one embodiment, if additional three direction-dependent fractional biases are desirable, then the four fractional biases for L1/L2 WL ambiguity may be estimated as depicted below in equation 41.

$$\nabla gbFB^{i,j}_{WL_{L1,L2}} = \quad \text{Equation 41}$$
$$\begin{bmatrix} 1 & \nabla H^{i,j}_x & \nabla H^{i,j}_y & \nabla H^{i,j}_z \end{bmatrix} \begin{bmatrix} \nabla gbDIFB^{i,j}_{WL_{L1,L2}} \\ \nabla gbDDFB^{i,j}_{WL_{L1,L2},x} \\ \nabla gbDDFB^{i,j}_{WL_{L1,L2},y} \\ \nabla gbDDFB^{i,j}_{WL_{L1,L2},z} \end{bmatrix}$$

Similarly, in an embodiment four zero constraint measurements can be used to resolve the filter rank defect issue.

$$\sum_{i=1}^{n} gbDIFB^i_{WL_{L1,L2}} = 0 \quad \text{Equation 42}$$
$$\sum_{i=1}^{n} gbDDFB^i_{WL_{L1,L2},x} = 0$$
$$\sum_{i=1}^{n} gbDDFB^i_{WL_{L1,L2},y} = 0$$
$$\sum_{i=1}^{n} gbDDFB^i_{WL_{L1,L2},z} = 0$$

In an embodiment, performing PPP ambiguity resolution using GNSS triple frequency signals may include a carrier smooth carrier function on the ionosphere-free combinations. One of the potential issues for the proposed instantaneous PPP ambiguity resolution model with triple-frequency signals is the high measurement noise of the new ionosphere-free combinations using L1/L2 WL and L2/L5 WL carrier phase measurements, as seen in equation 43.

$$\Phi_{IF(WL_{L1,L2}, WL_{L2,L5})} = \frac{f_1}{f_1 - f_5} \Phi_{WL_{L1,L2}} - \frac{f_5}{f_1 - f_5} \Phi_{WL_{L2,L5}} \quad \text{Equation 43}$$
$$= \frac{f_1}{f_1 - f_5}\left[\frac{f_1}{f_1 - f_2} \Phi_{L1} - \frac{f_2}{f_1 - f_2} \Phi_{L2}\right] -$$
$$\frac{f_5}{f_1 - f_5}\left[\frac{f_2}{f_2 - f_5} \Phi_{L2} - \frac{f_5}{f_2 - f_5} \Phi_{L5}\right]$$

By using the covariance law and assuming that the carrier phase measurement noise levels at different frequency bands are the same, equation 44 may be obtained.

$$\text{Equation 44}$$
$$\sigma_{\Phi_{IF(WL_{L1,L2}, WL_{L2,L5})}} = \left\{\left(\frac{f_1}{f_1 - f_5}\right)^2 \left[\left(\frac{f_1}{f_1 - f_2}\right)^2 + \left(\frac{f_2}{f_1 - f_2}\right)^2\right] + \left(\frac{f_5}{f_1 - f_5}\right)^2 \left[\left(\frac{f_2}{f_2 - f_5}\right)^2 + \left(\frac{f_5}{f_2 - f_5}\right)^2\right]\right\} \sigma^2_{\Phi_{Li}}$$
$$= S^2_{\Phi_{IF(WL_{L1,L2}, WL_{L2,L5})}} \cdot \sigma^2_{\Phi_{Li}}$$

Where S* is the measurement noise scale. The calculated noise scale for the new ionosphere-free combinations using L1/L2 WL and L2/L5 WL carrier phase measurements may be approximately 100. In an embodiment, if $\sigma_{\Phi_{Li}}$ is 1 mm, (i.e., approximately 0.5% of the carrier wavelength), the magnitude of $$\sigma_{\Phi_{IF(WL_{L1,L2}, WL_{L2,L5})}}$$

may be 10 cm. In various embodiments, large measurement noise may have potential side effects on the PPP navigation results. From the measurement noise scale analysis in FIG. 3, for all the ionosphere-free combinations, the L1 and L5 carrier combination may have the smallest noise scale. Therefore, the $\Phi_{IF_{L1,L5}}$ carrier may be used to smooth the $\Phi_{IF(WL_{L1,L2}, WL_{L2,L5})}$ carrier as described in equation 45, thereby reducing the impact of measurement noise on triple-frequency PPP.

$$\Phi_{IF(WL_{L1,L2},WL_{L2,L5})}(t_i) =$$

Equation 45

$$\Phi_{IF_{L1,L5}}(t_i) + \frac{\sum_{j=i-N}^{j=i-1}[\Phi_{IF(WL_{L1,L2},WL_{L2,L5})}(t_j) - \Phi_{IF_{L1,L5}}(t_j)]}{N}$$

Where N is the smoothing window length(s).

In an embodiment, performing PPP ambiguity resolution using GNSS triple frequency signals may include a new model for a geometry-based fractional bias product in PPP ambiguity resolution with dual-frequency signals. In one embodiment, a test may be performed using globally distributed high-rate IGS reference sites equipped with Ashtech dual-frequency receivers. At the server side, L1 fractional bias products may be generated using two approaches and their qualities may be evaluated and compared. At the client rover side, some figures of merit may be analyzed including but not limited to: L1 ambiguities fix availability and TTFF, position accuracy, and convergence time. The test may compare the performance differences using two different approaches of L1 fractional bias products. In one embodiment of the test, only GPS signals may be used.

In an embodiment, the test may address server configurations and performance, as well as global reference sites. In one embodiment there may originally be 49 reference sites selected for the analysis. The details of the reference sites are listed in FIG. 4, including site name, WGS-84 coordinate, receiver type and antenna type. In an embodiment, high-rate datasets with 1 Hz sampling rate for 3 reference sites (BRUS, GUAO, and KELY) may not be available. There may be 6 other reference sites (AMC2, AREQ, FAIR, MOBN, SHAO and TIDB) selected as client rover sites for the analysis. Therefore, there may be 40 sites valid as reference site inputs to the server to generate bias products. The geographic distributions of these 40 sites are provided in FIG. 5.

In one embodiment, the precise orbit and clock products used for a dataset analysis may be the final precise orbit and the final 5-second interval precise clock from the CODE analysis center, which are available for download from the following location: ftp://cddis.gsfc.nasa.gov/gps/products/1642/. In an embodiment, IGS provides the combined final orbit and clock, and the clock product is with a 30-second interval. To ensure the accuracy of a satellite clock, the CODE 5-second interval clock product may be selected.

In an embodiment, three (3) reference sites, HRAO, IRKM, and MAD2, may be excluded from the L1 fractional bias product generation due to the poor qualities of their WL ambiguity residuals. Therefore another thirty-seven reference sites may be used to generate the L1 fractional bias product. In one embodiment, there may be two approaches to generate a L1 fractional bias product. The first approach (referred to herein as "approach I"), may include the bias product filter only estimating one direction-independent bias for each satellite.

Figure 6:
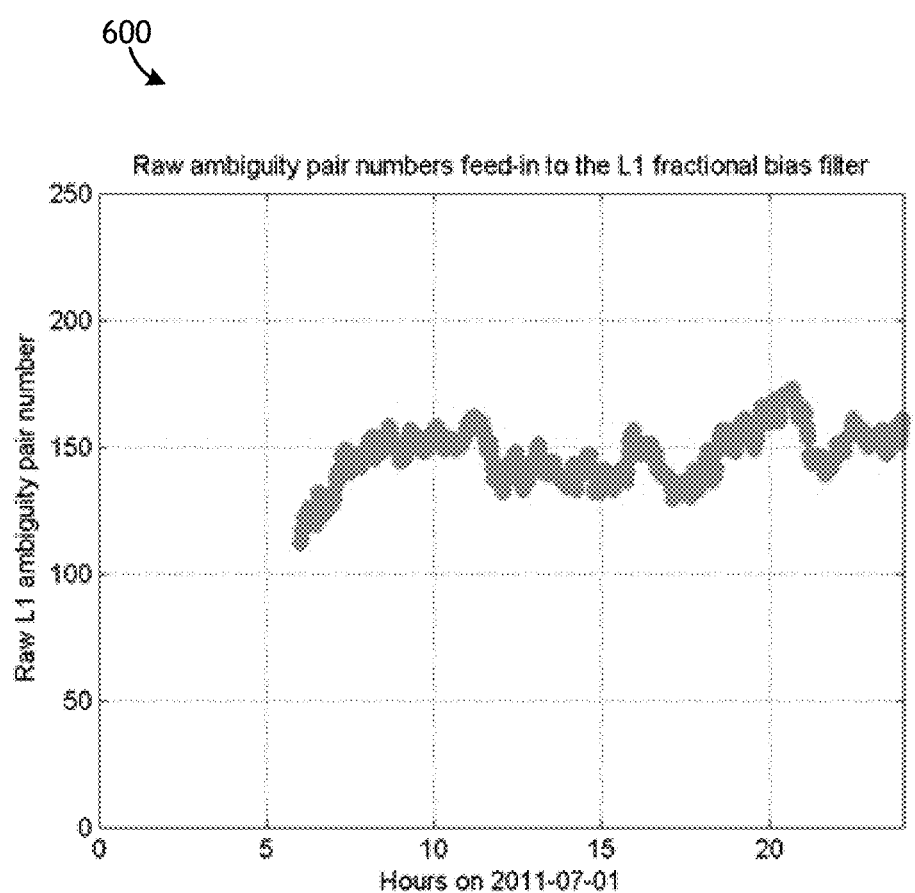
FIG. 6 is a graph illustrating raw L1 ambiguity pair numbers versus time for a L1 fractional bias filter.
Figure 7:
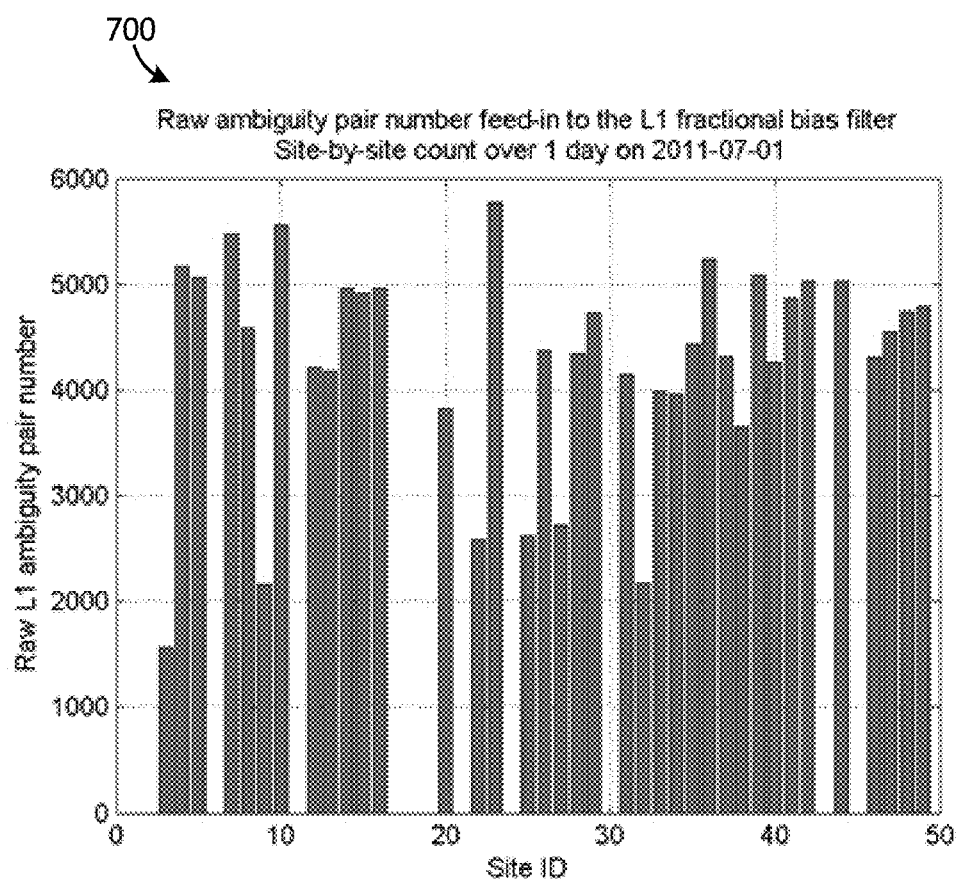
FIG. 7 is a graph illustrating raw L1 ambiguity pair numbers versus site ID for a L1 fractional bias filter during a site-by-site count over a one (1) day period.

Similar to the WL part, the direction-independent bias may be analyzed for the raw L1 fractional bias number as the input to a bias product filter. In one embodiment, the analysis may include a software configuration that may allow the output of the raw L1 fractional bias after 6 hours at each reference site to ensure the convergence of the troposphere estimate. After the 6$^{th}$ hour, the analysis may include more than 150 raw L1 fractional biases as the input to the L1 fractional bias product filter, as shown in FIG. 6. The number of raw L1 fractional bias may also be analyzed site by site, as seen in FIG. 7.

Figure 8:
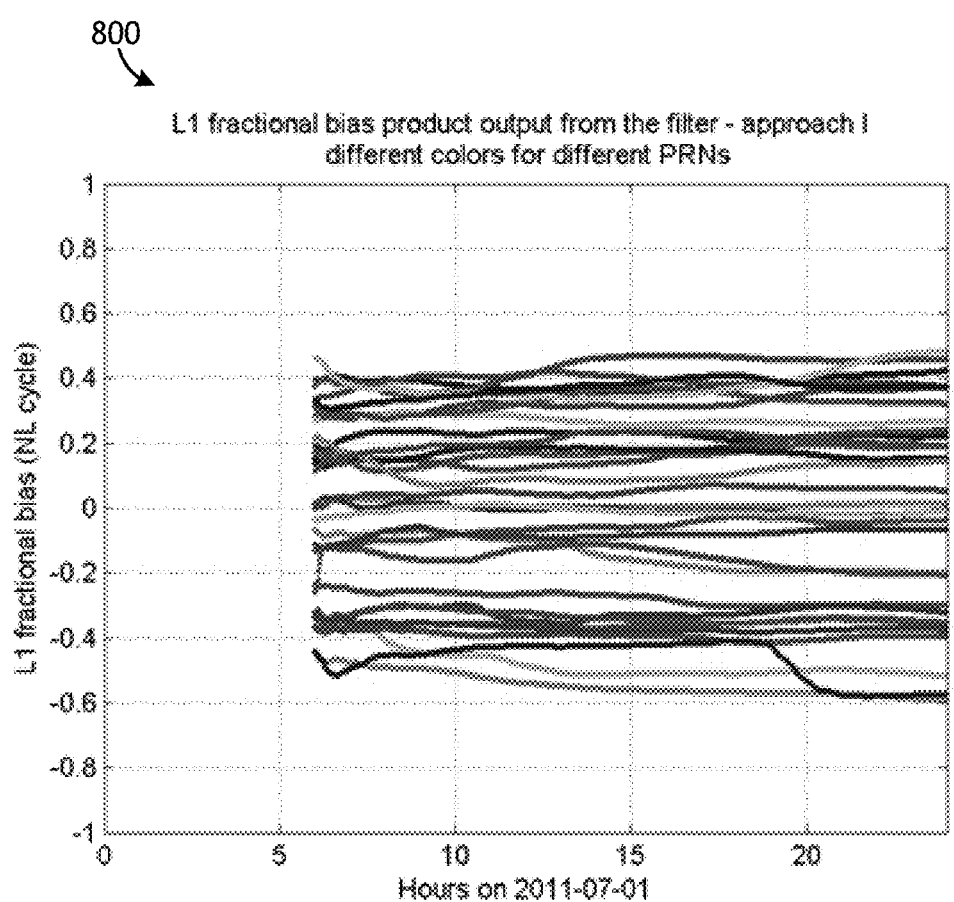
FIG. 8 is a graph illustrating a L1 fractional bias product via approach I.

As seen in FIG. 8, over a day, the generated L1 fractional bias product may not be as stable as a WL one, but the variation is still very small over a relatively short period of time such as 15 minutes.

Figure 9:
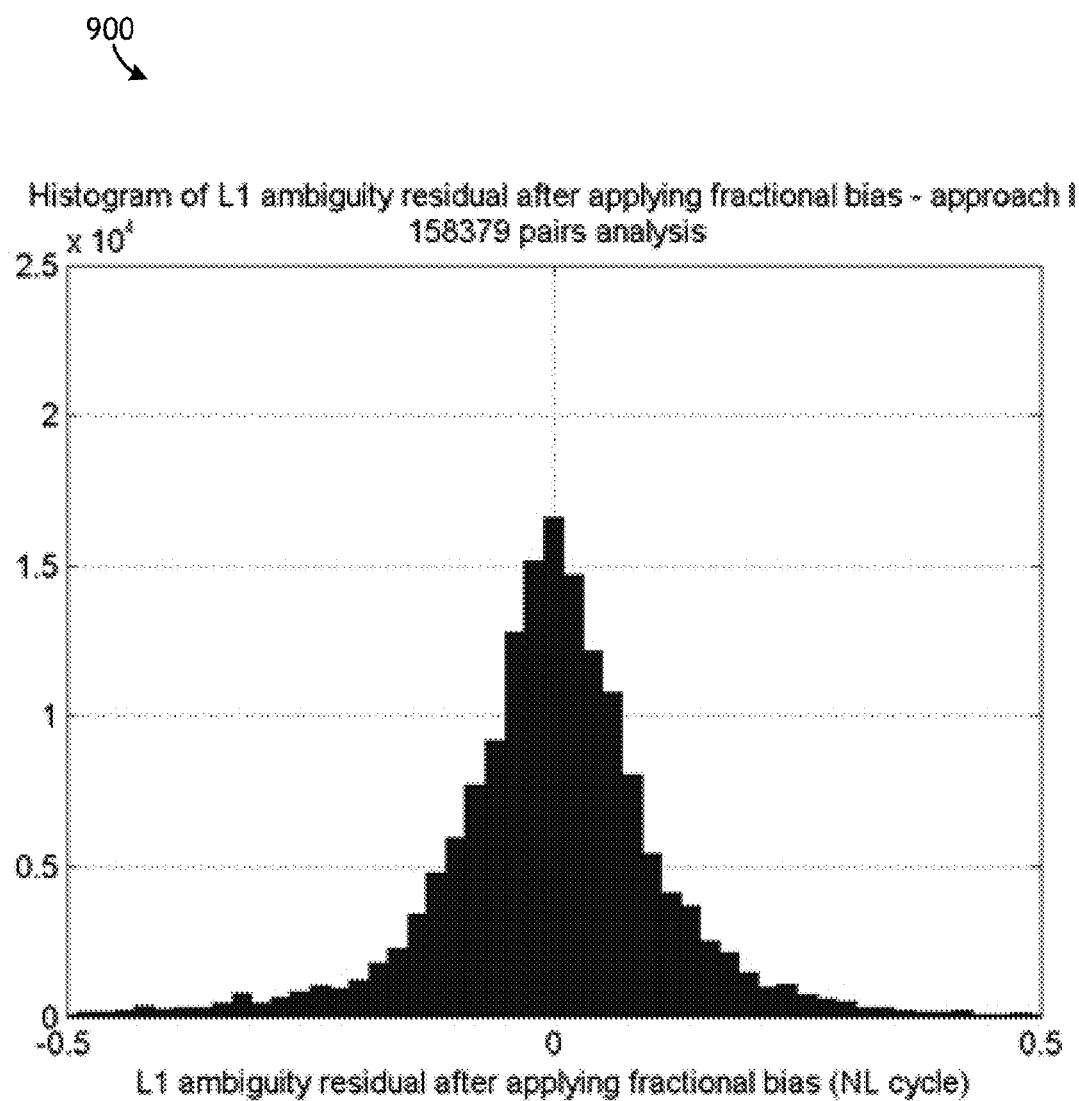
FIG. 9 is a graph illustrating a histogram of the L1 ambiguity residual via approach I.
Figure 10:
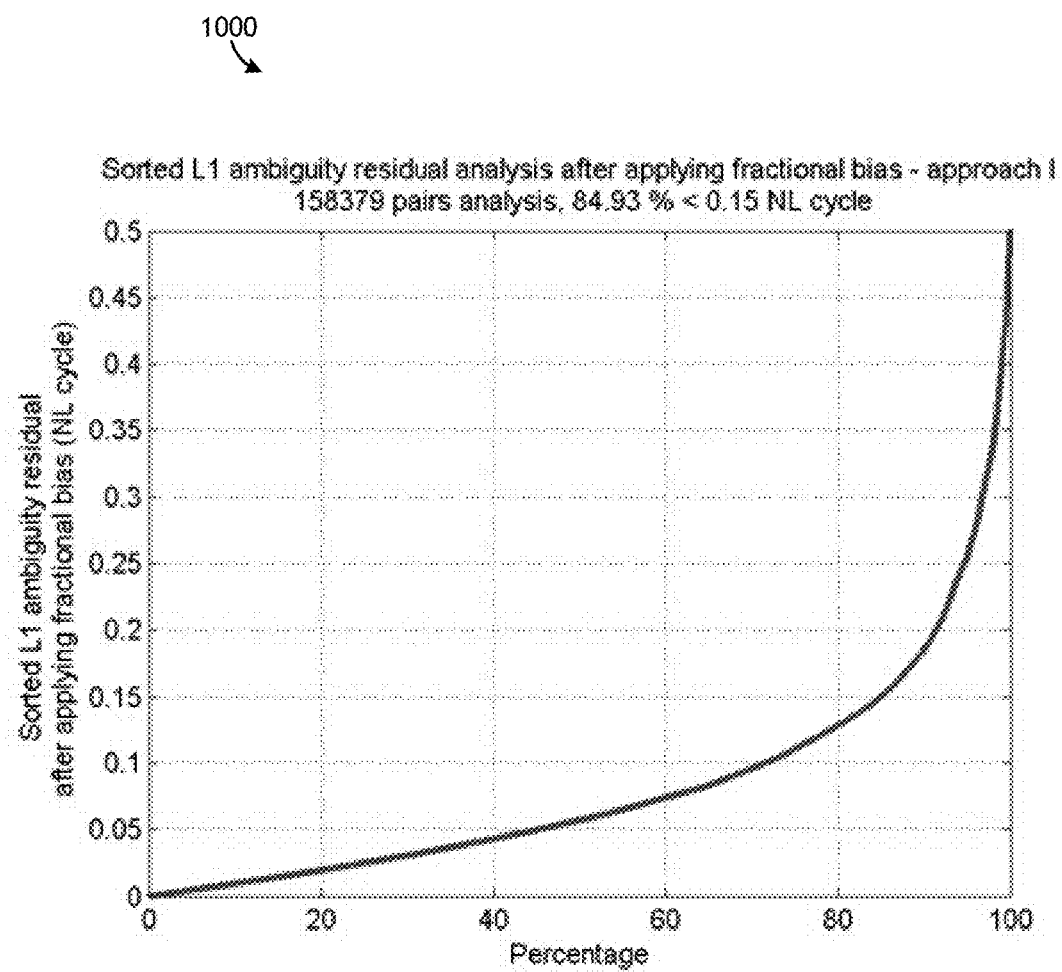
FIG. 10 is a graph illustrating a sorted L1 ambiguity residual via approach I.
Figure 11:
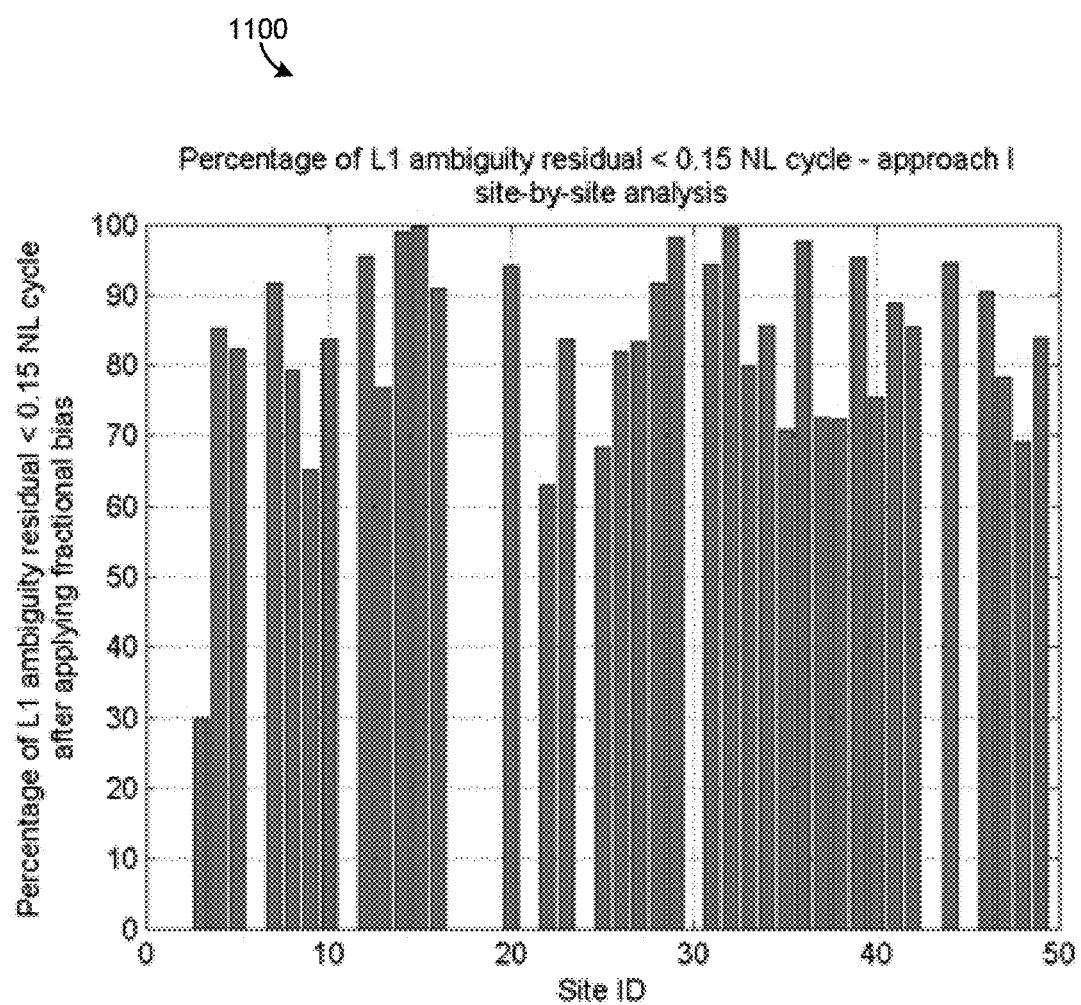
FIG. 11 is a graph illustrating a L1 ambiguity residual quality analysis of multiple sites via approach I.
Figure 12:
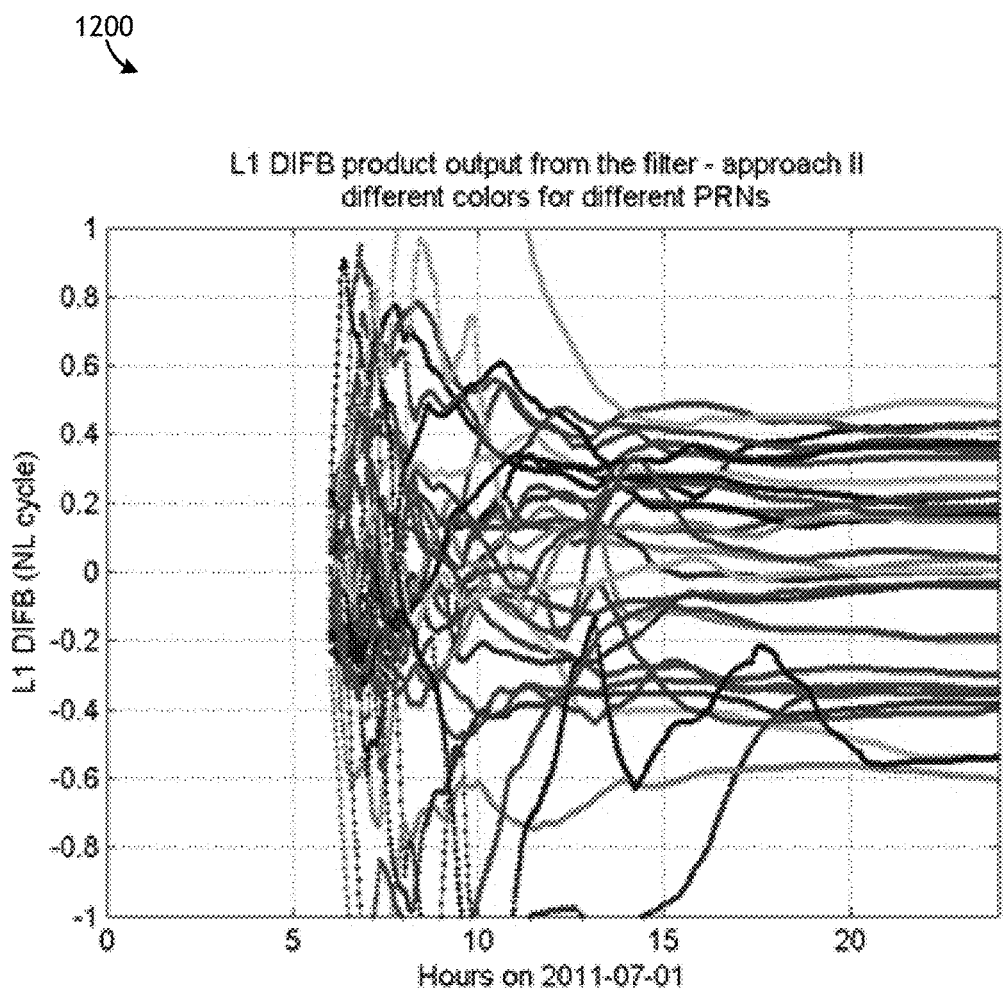
FIG. 12 is a graph illustrating a L1 Direction-Independent Fractional Bias (DIFB) product via approach II.
Figure 13:
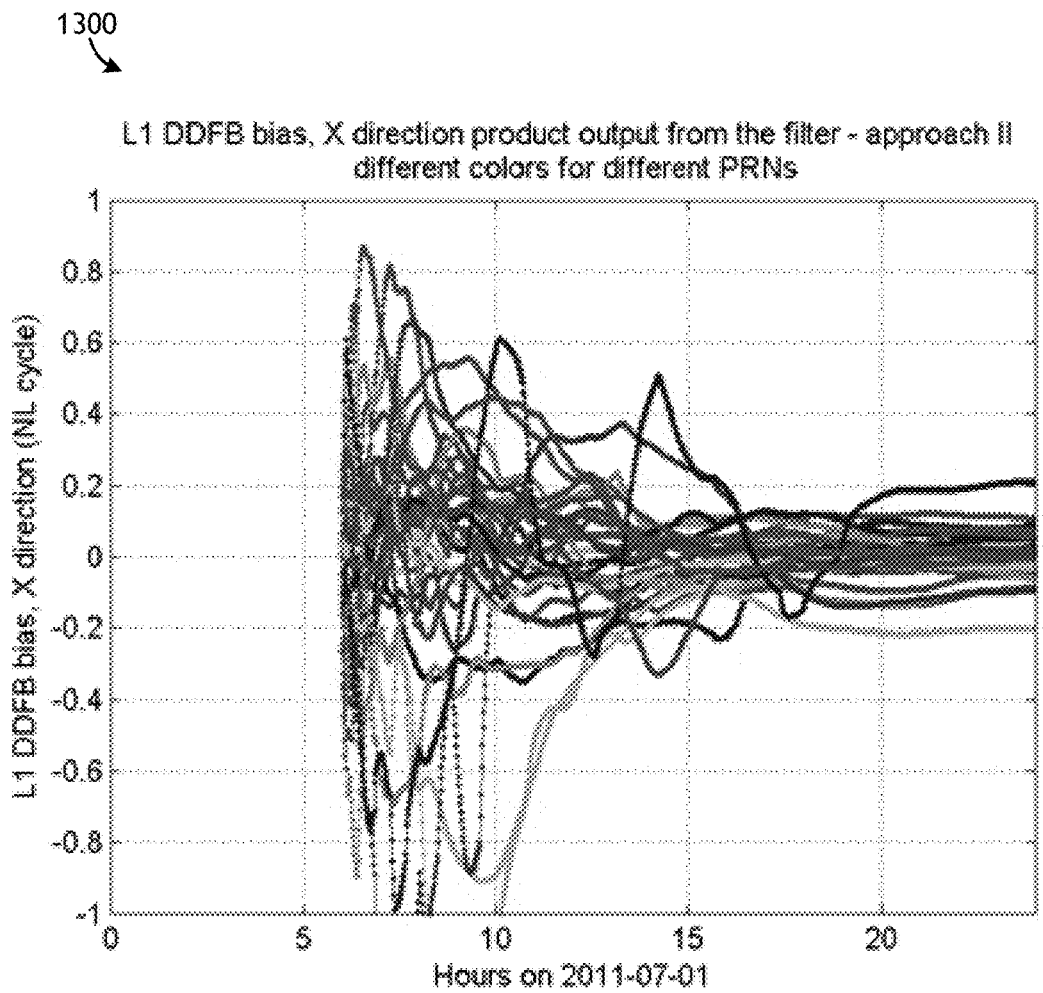
FIG. 13 is a graph illustrating a L1 Direction-Dependent Fractional Bias (DDFB) product in the X direction via approach II.
Figure 14:
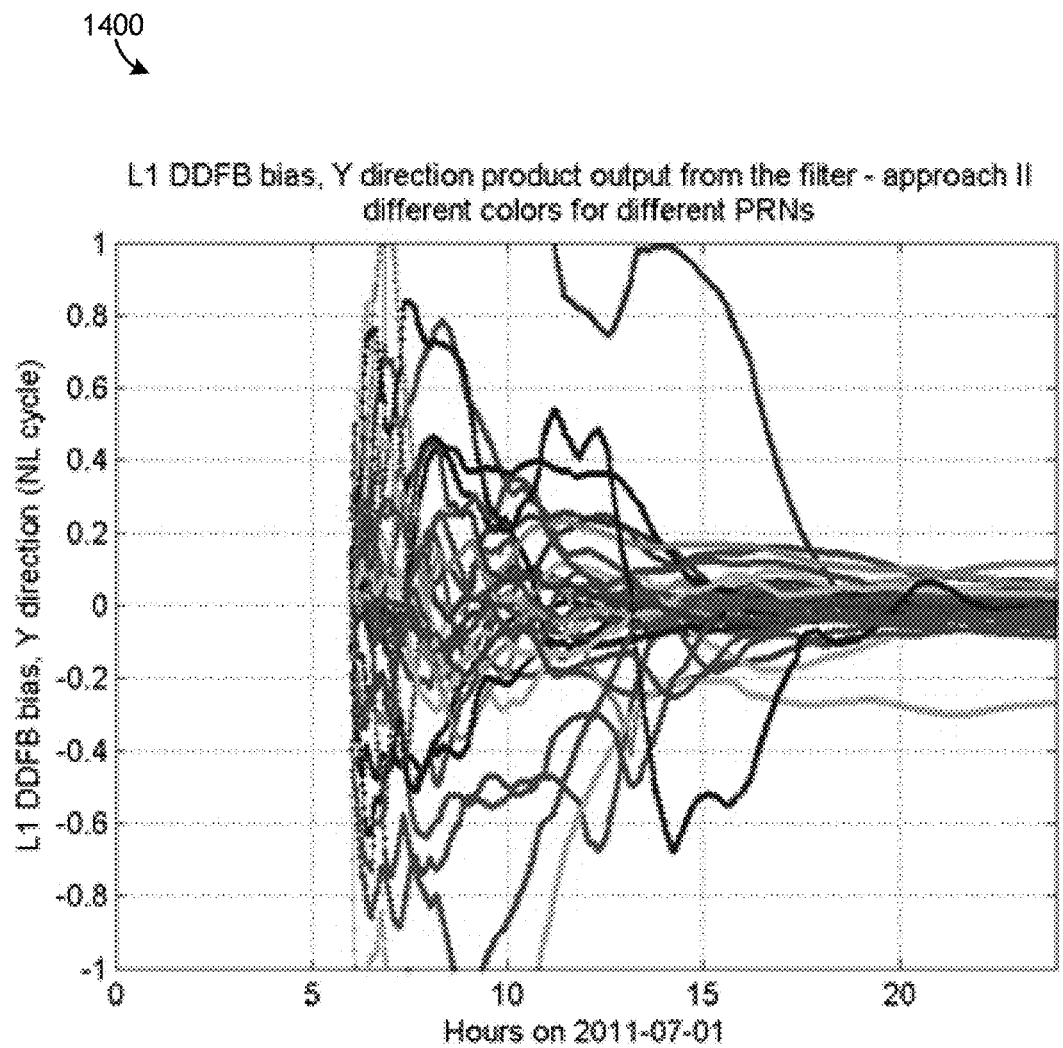
FIG. 14 is a graph illustrating a L1 DDFB product in the Y direction via approach II.
Figure 15:
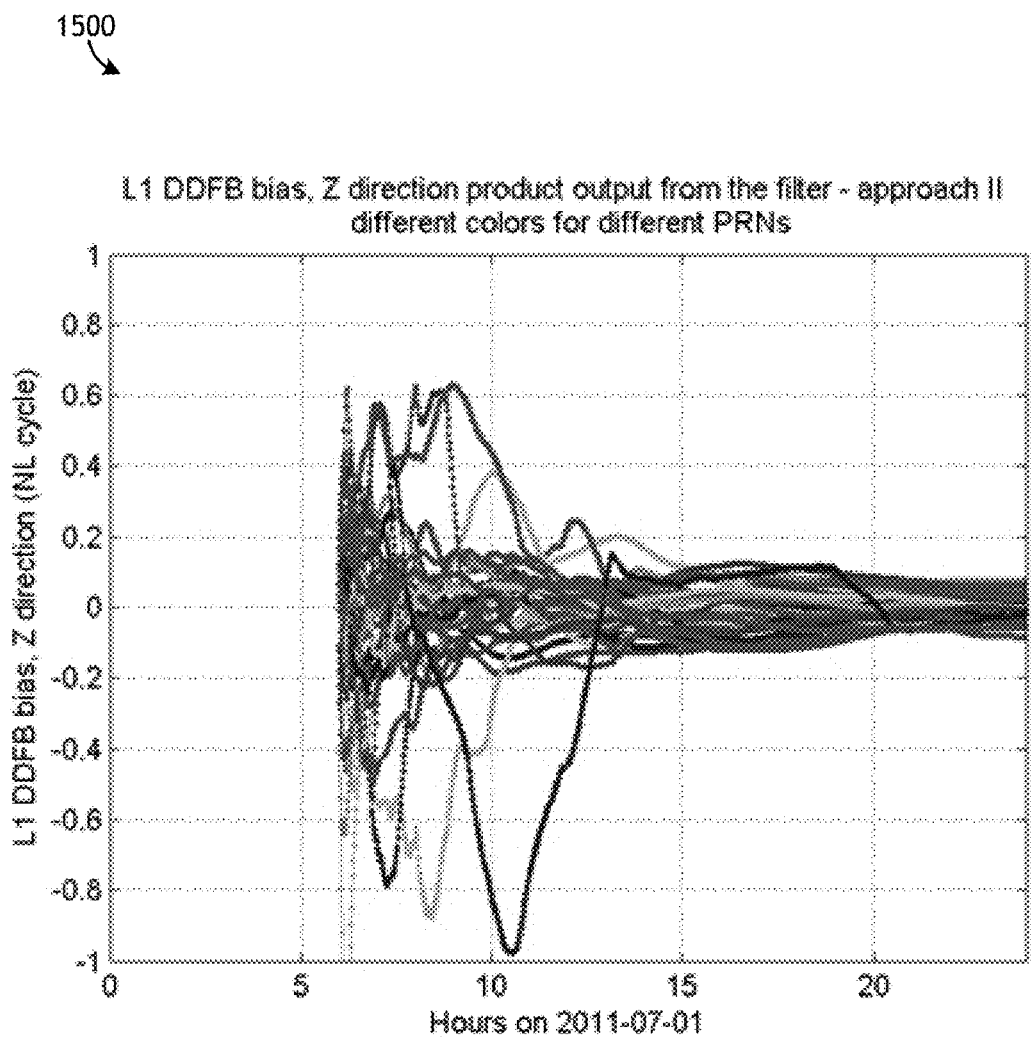
FIG. 15 is a graph illustrating a L1 DDFB product in the Z direction via approach II.

Similarly, for the raw L1 ambiguity $\nabla gbA_{L1}^{i,j}$ at reference sites, after applying the L1 fractional bias product, the raw ambiguity becomes $\nabla gbM_{L1}^{i,j} = \nabla gbA_{L1}^{i,j} - \nabla gbFB_{L1}^{i,j}$, which is close to an integer, if the L1 fractional bias product is correct and accurate. In one embodiment the value should be close to zero for the calculated L1 ambiguity residual as $\nabla gbM_{L1}^{i,j} - \text{Roundoff}(\nabla gbM_{L1}^{i,j})$. This ambiguity residual may be used as a quality indicator at the server side for the L1 fractional bias product. From the histogram and the sorted value of the L1 ambiguity residual, as shown in FIG. 9 and FIG. 10, using approach I results in around 85% of the L1 ambiguity residuals being below 0.15 NL cycles. Based on a site by site analysis, most of sites have more than 70% of the L1 ambiguity residual less than 0.15 NL cycles, as seen in FIG. 11.

In an embodiment, performing PPP ambiguity resolution using GNSS triple frequency signals may include an L1 fractional bias product. In the L1 fractional bias model (referred to herein as "approach II"), one DIFB and three DDFB may be estimated for each satellite. The raw L1 fractional bias input to the approach II is similar to approach I, but approach II is different due to the estimation in the bias filter. As seen in FIG. 12, FIG. 13, FIG. 14, and FIG. 15, there is some stabilization time for the generated fractional bias products in approach II. But after the stabilization time, the variations behave similarly to approach I.

In one embodiment of approach II, for the raw L1 ambiguity $\nabla gAl_1^{i,j}$ at reference sites, after applying the L1 fractional bias product in approach II, the individual ambiguity becomes $$\nabla gbM_{L1}^{i,j} = \nabla gbA_{L1}^{i,j} - [1 \quad \nabla H_x^{i,j} \quad \nabla H_y^{i,j} \quad \nabla H_z^{i,j}] \begin{bmatrix} \nabla gbDIFB_{L1}^{i,j} \\ \nabla gbDDFB_{L1,x}^{i,j} \\ \nabla gbDDFB_{L1,y}^{i,j} \\ \nabla gbDDFB_{L1,z}^{i,j} \end{bmatrix}.$$

The L1 ambiguity residual can be calculated as $\nabla gbM_{L1}^{i,j} = \text{Roundoff}(\nabla gbM_{L1}^{i,j})$.

Figure 16:
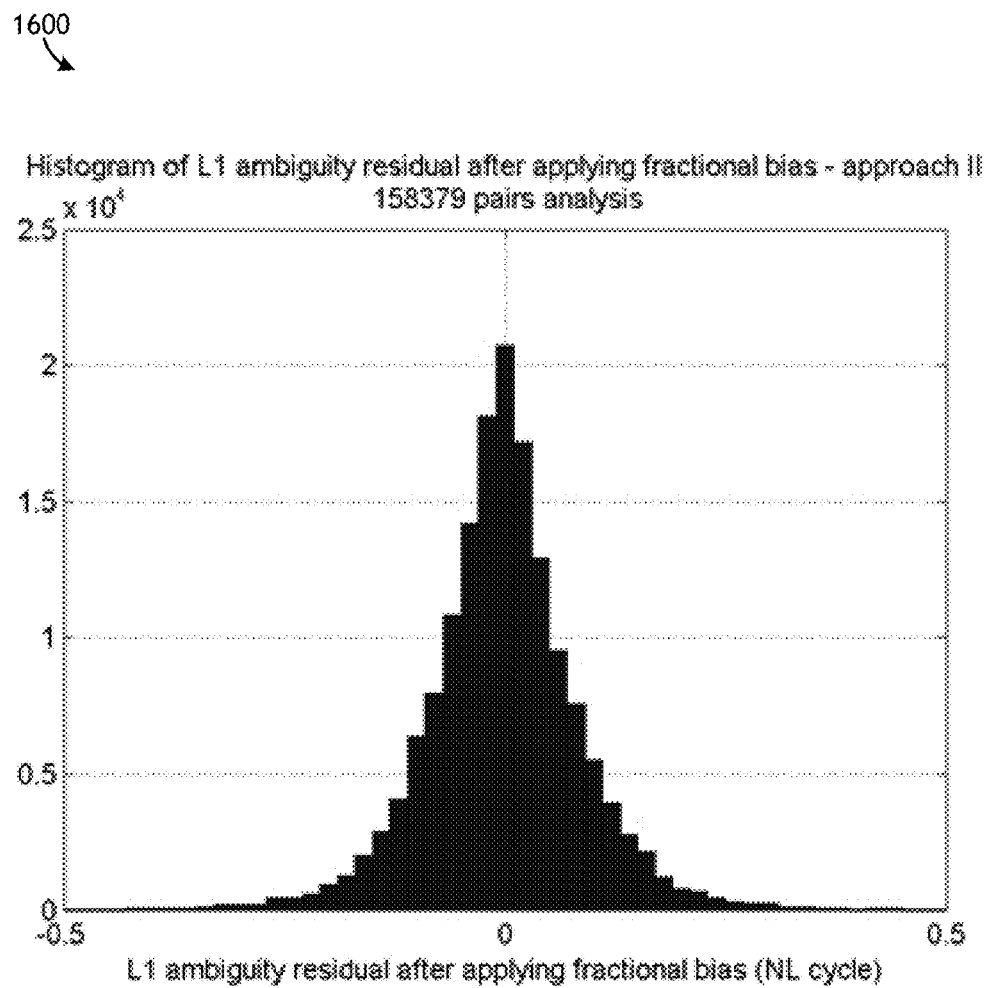
FIG. 16 is a graph illustrating a histogram of an L1 ambiguity residual via approach II.
Figure 17:
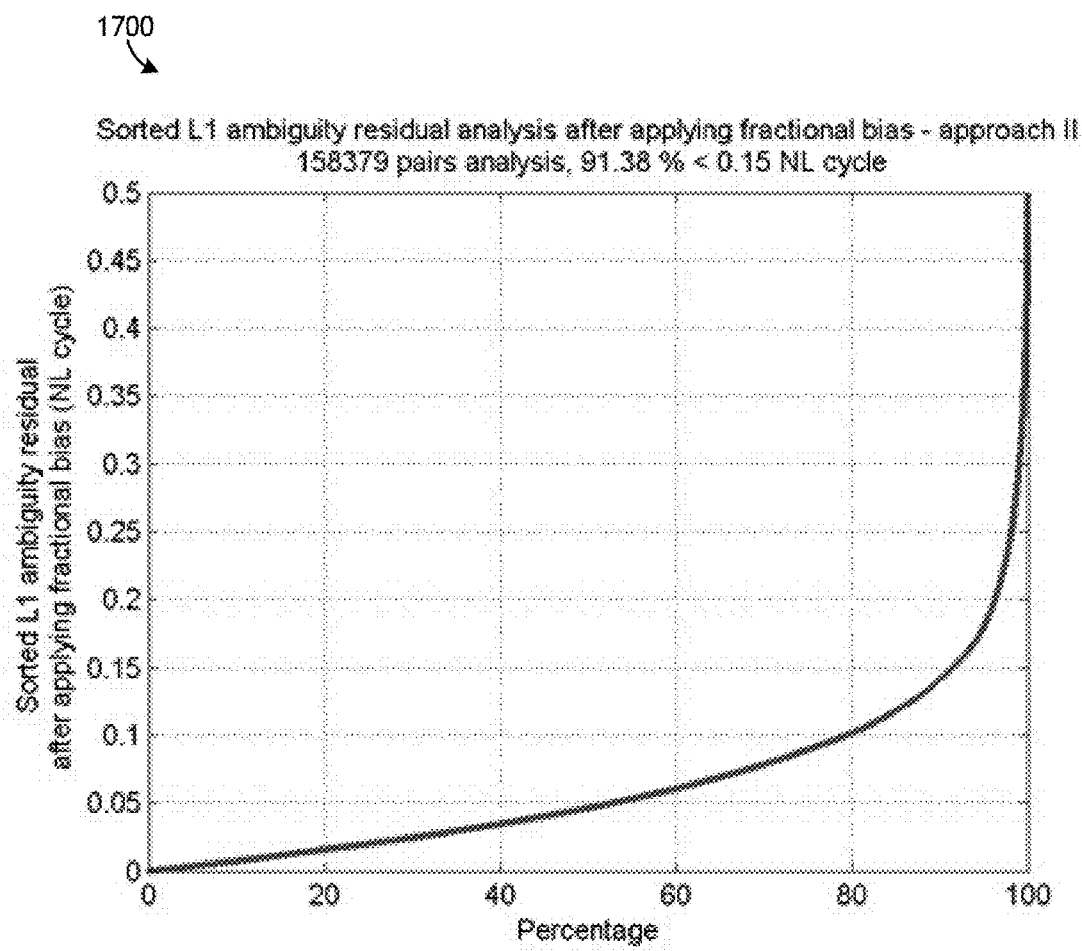
FIG. 17 is a graph illustrating a sorted L1 ambiguity residual via approach II.
Figure 18:
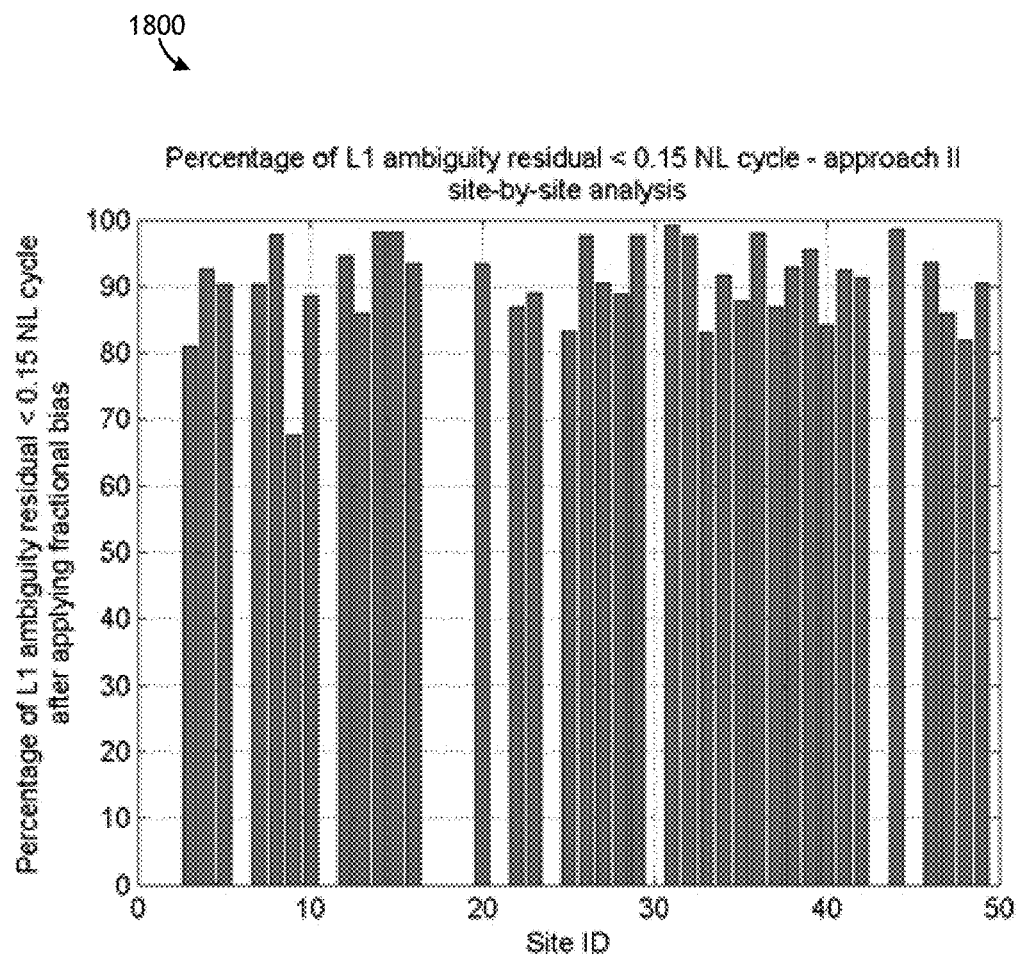
FIG. 18 is a graph illustrating an ambiguity residual quality site by site analysis via approach II.

From the results illustrated in FIG. 16, FIG. 17, and FIG. 18, using approach II, results in an overall 91% of the L1 ambiguity residuals being below 0.15 NL cycles. At most of the sites, more than 85% of the L1 residuals are less than 0.15 NL cycles. The results indicate that approach II may achieve better quality L1 fractional bias product than approach I at the server side.

In an embodiment, one application of the WL and L1 fractional bias products is to aid the PPP ambiguity resolution at the rover. Some figures of merit for the rover performance is discussed below, including WL fix availability and TTFF, L1 fix availability and TTFF, position accuracy after fixing ambiguities, and convergence time.

Figure 19:
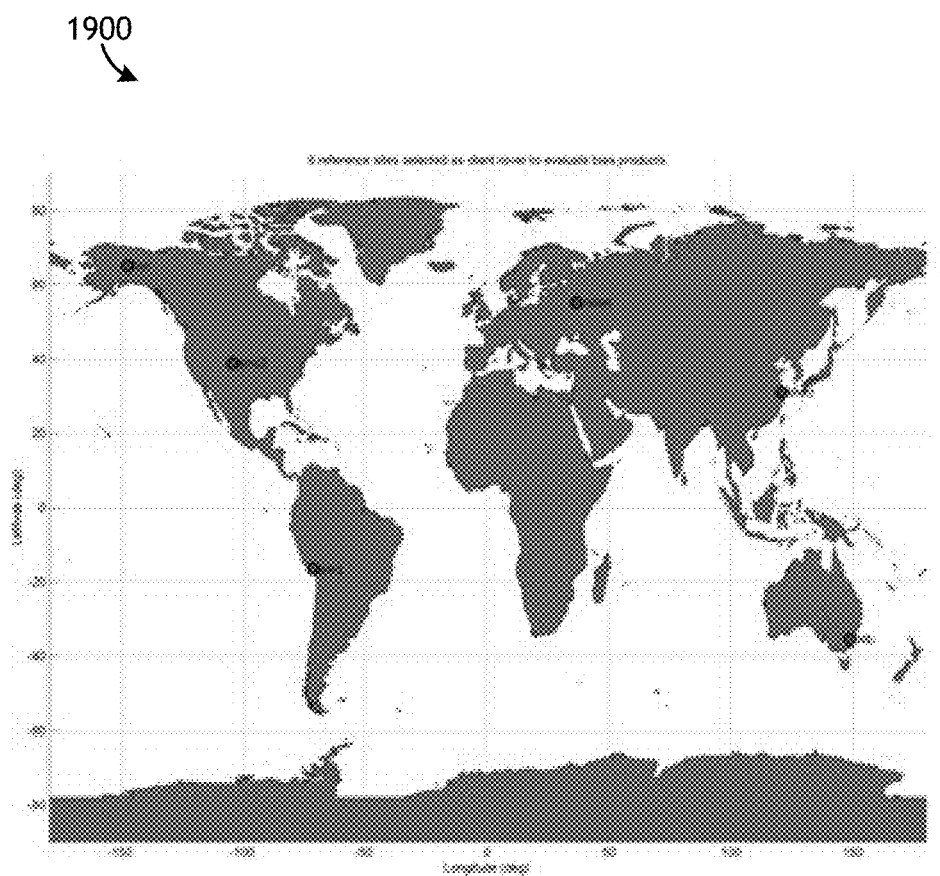
FIG. 19 is a block diagram illustrating a geographic distribution of client rover sites.

In one embodiment, there may be six (6) globally distributed reference sites selected as client rovers to evaluate the PPP ambiguity resolution performance with dual-frequency signals. The geographic distributions of these 6 sites are shown in FIG. 19 and their baseline distances to the closest server reference sites are listed in FIG. 20. The minimum baseline distance is for rover site AMC2, with the distance to its closest server reference site at PIE1, may be approximately 900 km. The maximum baseline distance may be for rover site TIDB to its closest server reference site at PERT with a baseline length of 3050 km. In PPP ambiguity resolution, the baseline length between a reference site and a rover site may be at hundreds or thousands of kilometers, which is longer than that of RTK.

In an embodiment, at the client rover side GFAR for WL ambiguity may be conducted using the differential between WL carrier and NL code after applying the WL fractional bias product received from server. After the WL ambiguity is fixed and eliminated from the estimated ionosphere-free ambiguity, a non-integer pseudo-L1 ambiguity may be obtained. The integer property of this pseudo-L1 ambiguity may be recovered after applying the L1 fractional bias received from server. The pseudo-L1 ambiguity is secondly fixed to an integer by GBAR, such as the LAMBDA method. Consequently, the PPP fixed solution may be achieved.

In one embodiment of rover testing, the beginning time may be set as $12^{th}$ hour of the day, to ensure all the fractional bias products are with good quality, because some stabilization time for the L1 fractional bias product is desirable in approach II. At each site, manipulated full reset may be introduced at the beginning of each hour. In an embodiment, there may be 72 (6×12) scenarios tested to evaluate rover PPP AR performance From the $13^{th}$ to the $17^{th}$ hour, there may be some measurement quality issues at site FAIR, and such exceptional scenarios may be excluded from the testing resulting in a valid test scenario number of 68 in that embodiment.

Figure 21:
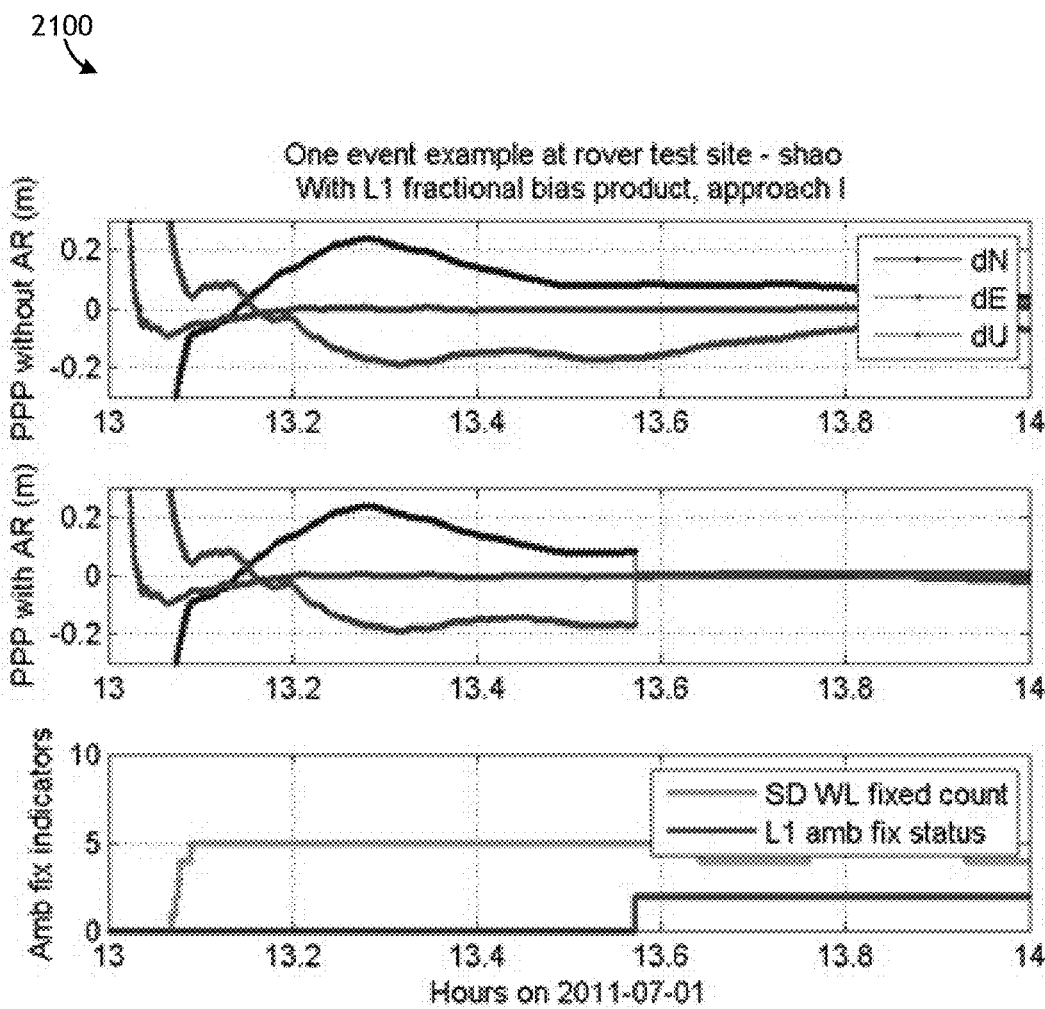
FIG. 21 is a graph illustrating a performing Precise Point Positioning (PPP) AR example for a scenario using approach I.
Figure 22:
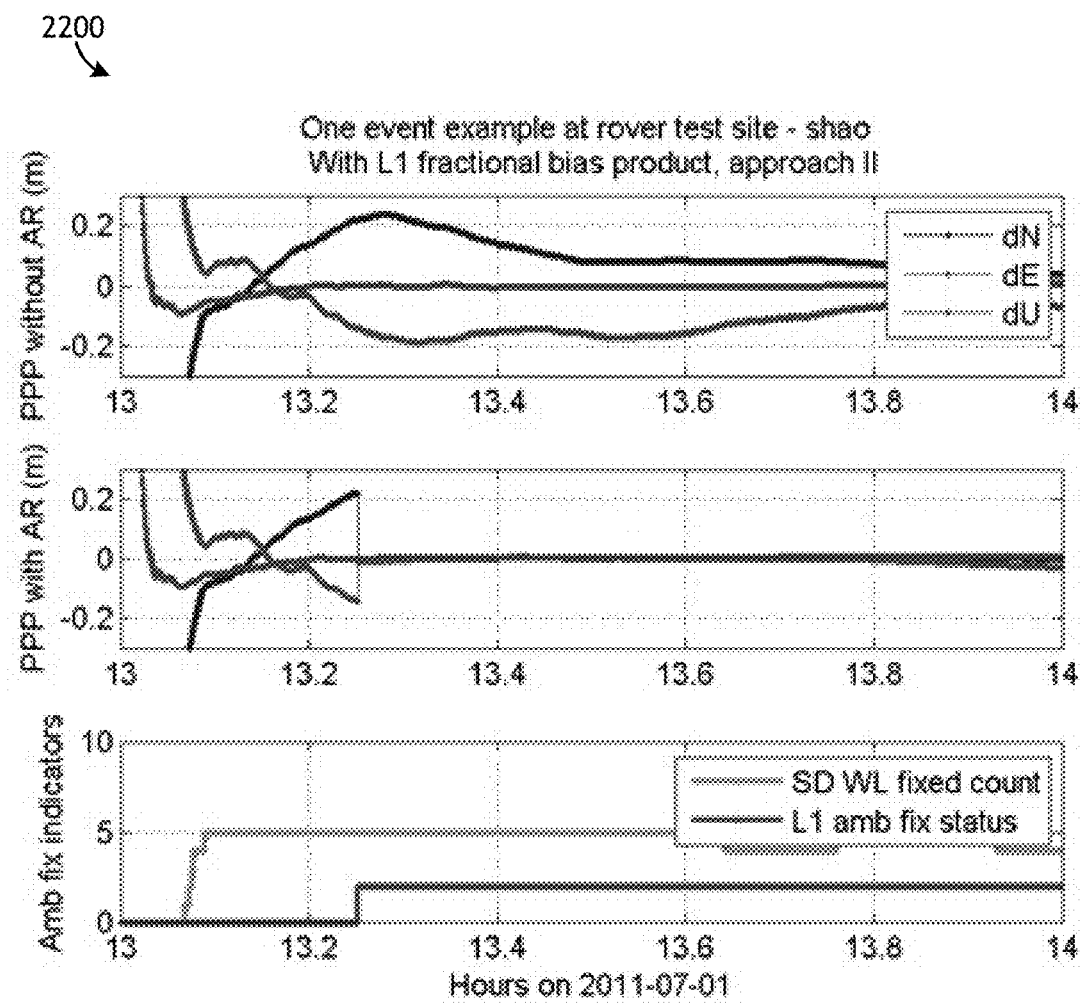
FIG. 22 is a graph illustrating a performing Precise Point Positioning (PPP) AR example for a scenario using approach II.

An example of PPP ambiguity resolution performance at one specific scenario at test site SHAO are shown in FIG. 21 and FIG. 22. The performance differences of the L1 fractional bias products from approach I and II are also compared. After fixing the ambiguities, the position accuracy is much better than the float one. In one embodiment, the ambiguity fixing time of approach II may be faster than approach I.

Figure 23:
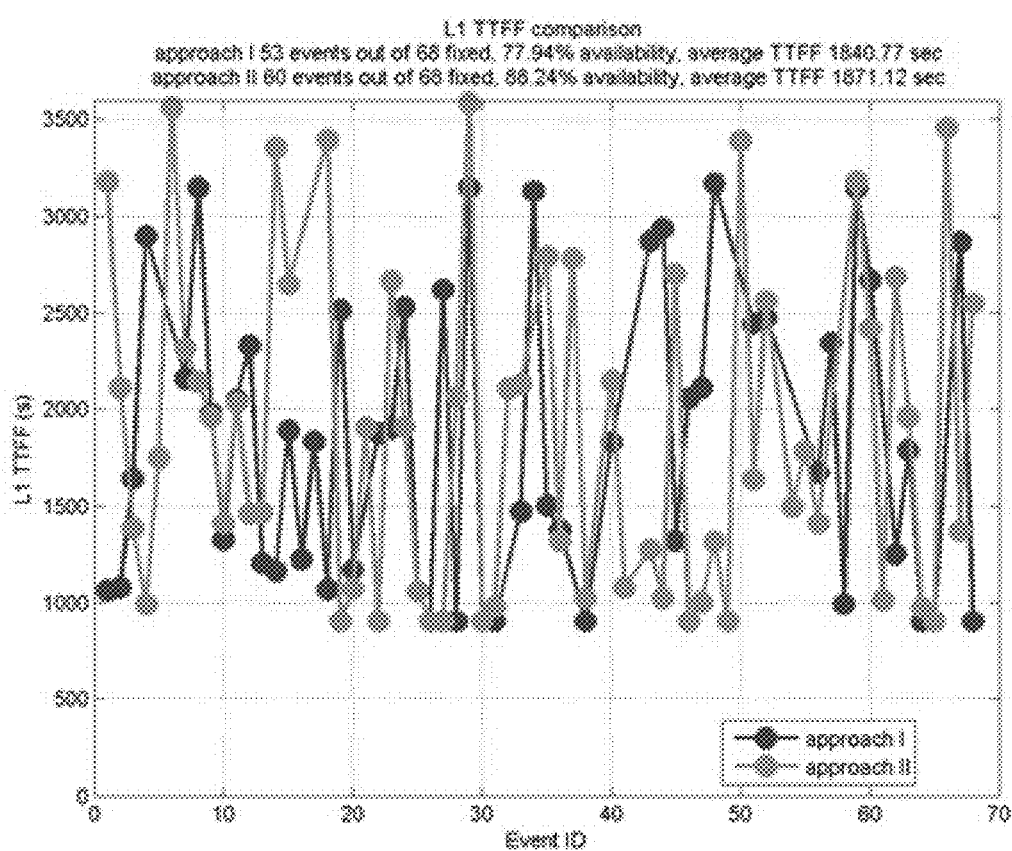
FIG. 23 is a graph illustrating a L1 fix TTFF comparison.
Figure 24:
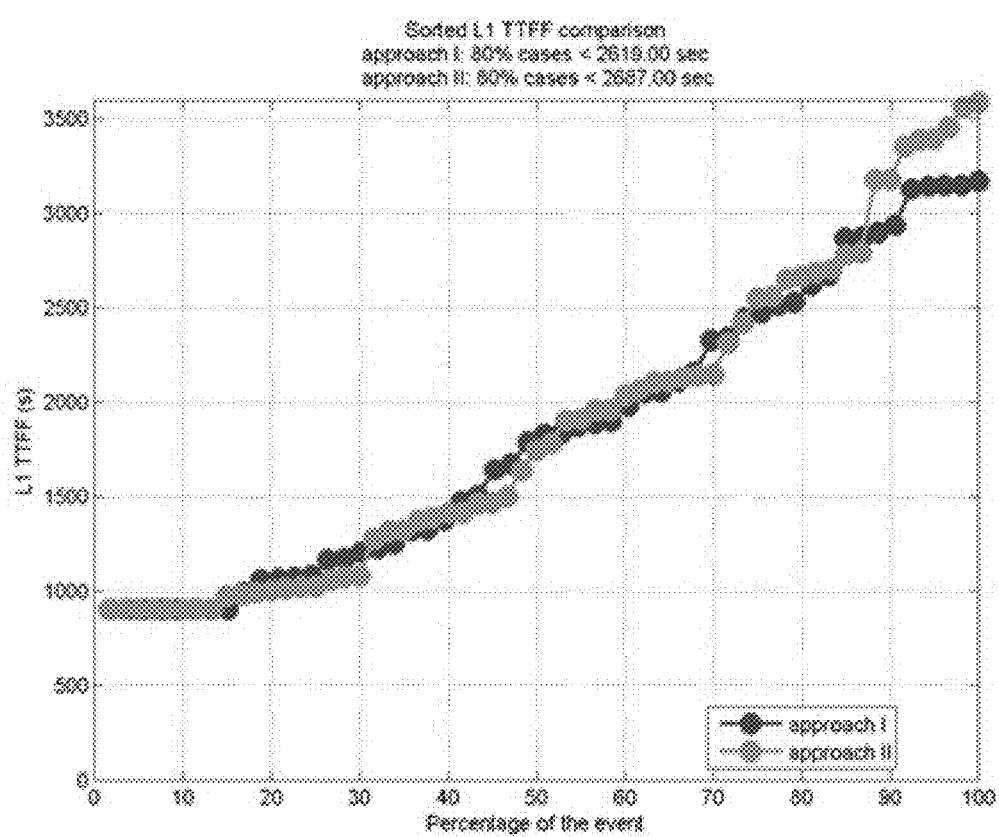
FIG. 24 is a graph illustrating a sorted L1 fix TTFF comparison.

In an embodiment, the performance differences of L1 ambiguity fix availability and TTFF using fractional bias products from approach I and II may be compared. In each scenario, L1 ambiguity may be labeled as achieving TTFF when the number of fixed L1 ambiguity becomes greater than 4, and the ambiguity search ratio becomes greater than 2.5, and the ambiguity repeatability check passes 100 seconds. In one embodiment, L1 fix success may be labeled when the TTFF is less than 3600 seconds. The L1 fix availability and TTFF performance comparison between approach I and II are illustrated in FIG. 23 and FIG. 24. Approach II typically achieves better fix availability than approach I and improves the fix availability from 77.94% to 88.24%. Statistically, there may be no significant difference between the two approaches for the L1 ambiguity TTFF. On average, L1 ambiguity TTFF may be around 30 minutes to 43 minutes with a 95% probability.

In one embodiment, the PPP fixed solution may be achieved after the L1 TTFF, which may obtain better position accuracy than the float solution without PPP AR. The PPP float and fixed position accuracy analyses are conducted separately for approach I and II, due to their differences on fix availability and TTFF.

Figure 25:
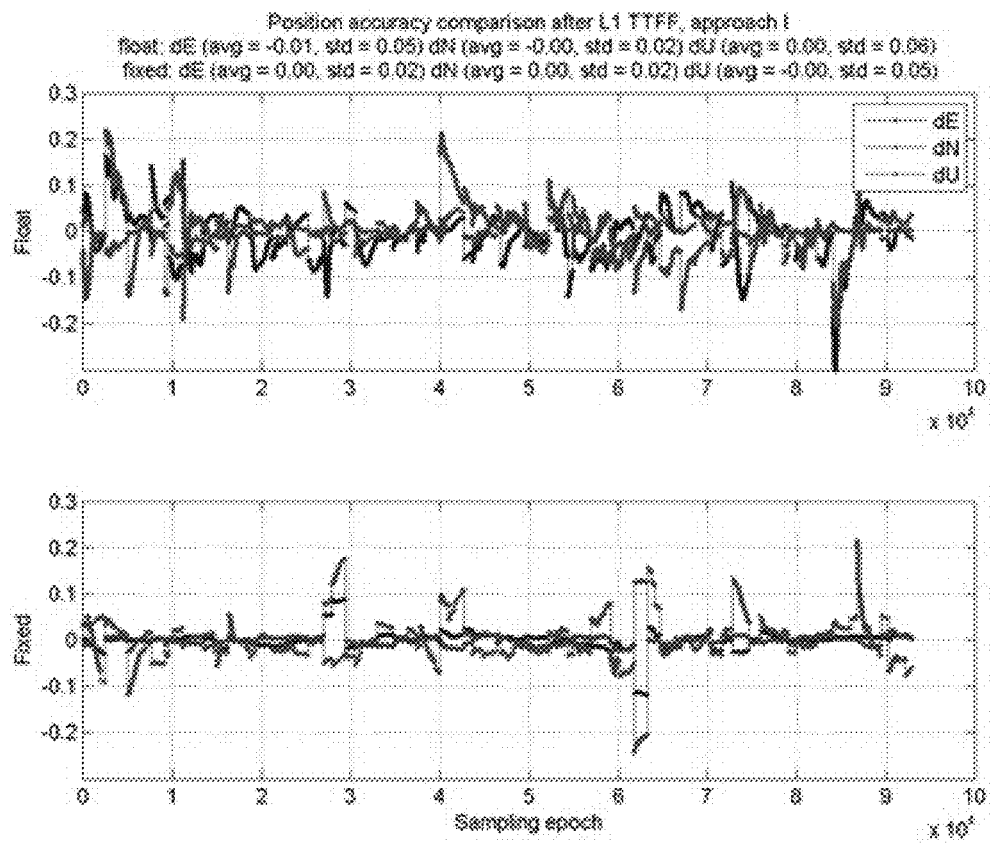
FIG. 25 is a graph illustrating a position accuracy comparison via approach I.
Figure 26:
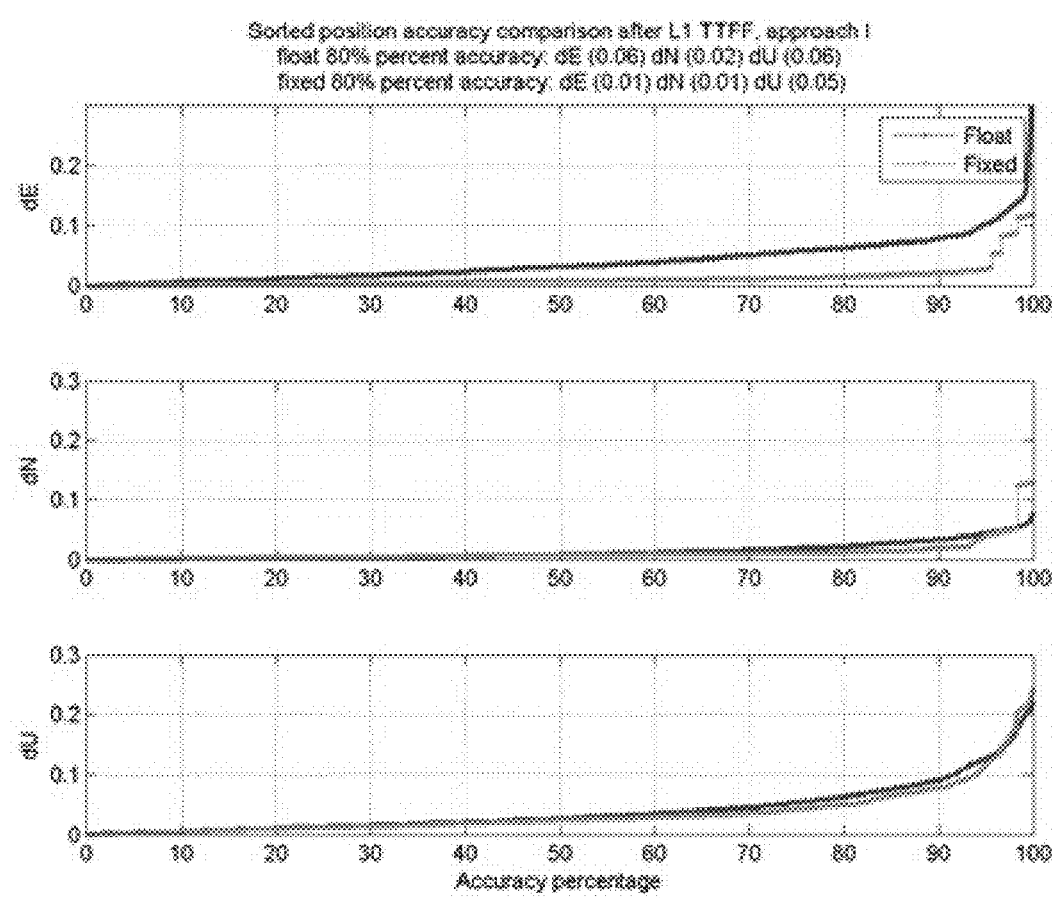
FIG. 26 is a graph illustrating a sorted position accuracy comparison via approach II.

In approach I, the fixed solution can typically achieve better position accuracy than the float solution, as indicated in FIG. 25. However sometimes, the fixed solution introduces a bigger error due to a wrong ambiguity fix. Overall, the fixed position used in approach I can improve the position STD from 5 cm/2 cm/6 cm to 2 cm/2 cm/5 cm at east/north/up. Based on the sorted position accuracy comparison in FIG. 26, the fixed solution from approach I can improve the position accuracy from 6 cm/2 cm/6 cm to 1 cm/1 cm/5 cm at east/north/up, with 80% of the probability.

Figure 27:
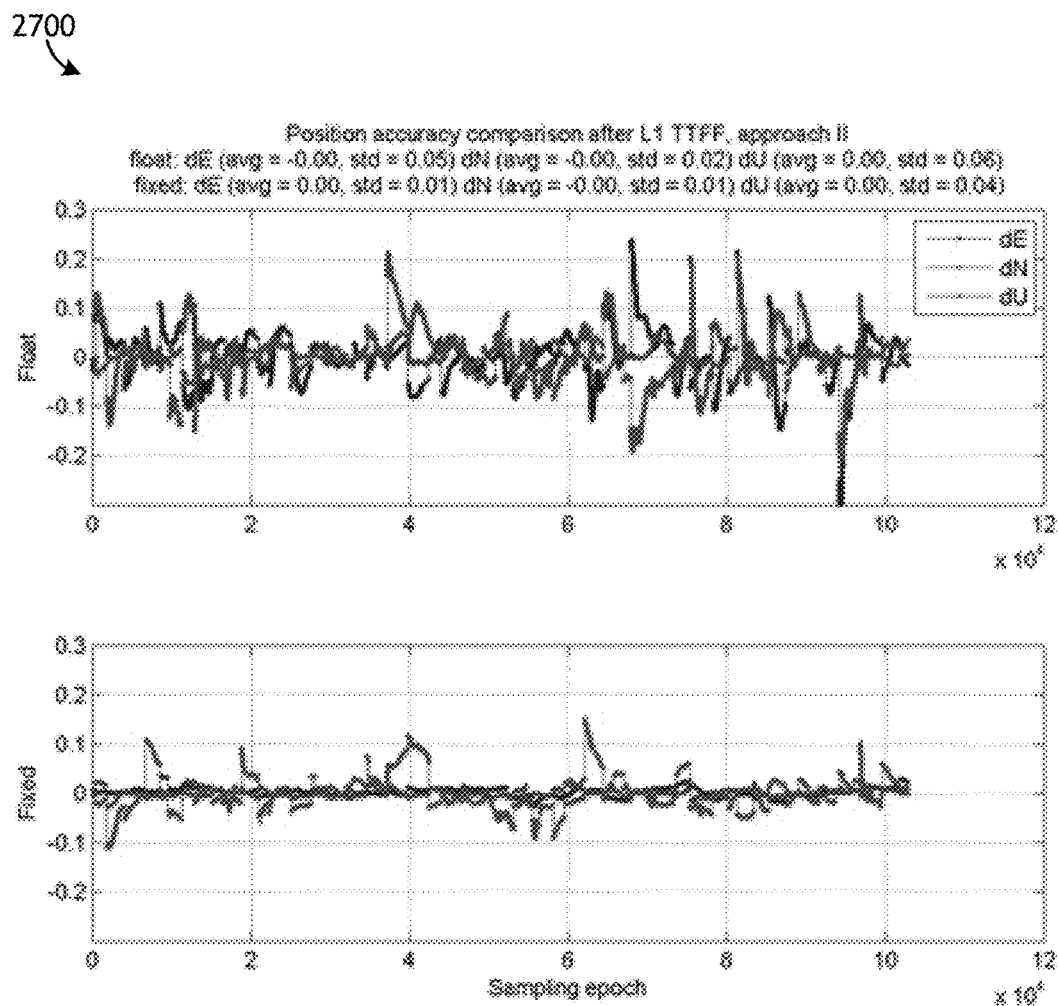
FIG. 27 is a graph illustrating a position accuracy comparison via approach II.
Figure 28:
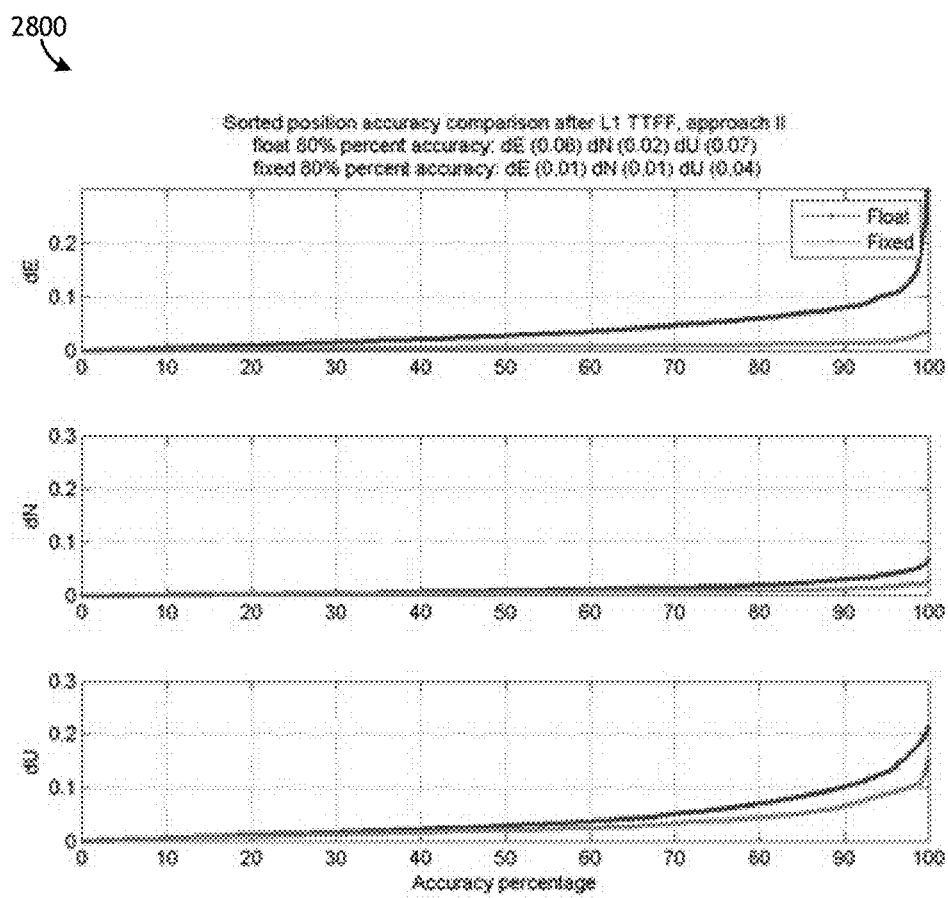
FIG. 28 is a graph illustrating a sorted position accuracy comparison via approach II.

In an embodiment, the risk of an incorrect ambiguity fix in approach II is less than in approach I, because the chance of a bigger position error from the fixed solution is less, as indicated from FIG. 27. Thus the fixed position in approach II may further improve the position STD to 1 cm/1 cm/4 cm at east/north/up. Based on the sorted position accuracy comparison from FIG. 28, approach II may further improve the position accuracy to 1 cm/1 cm/4 cm at east/north/up, in 80% of the probability.

Figure 29:
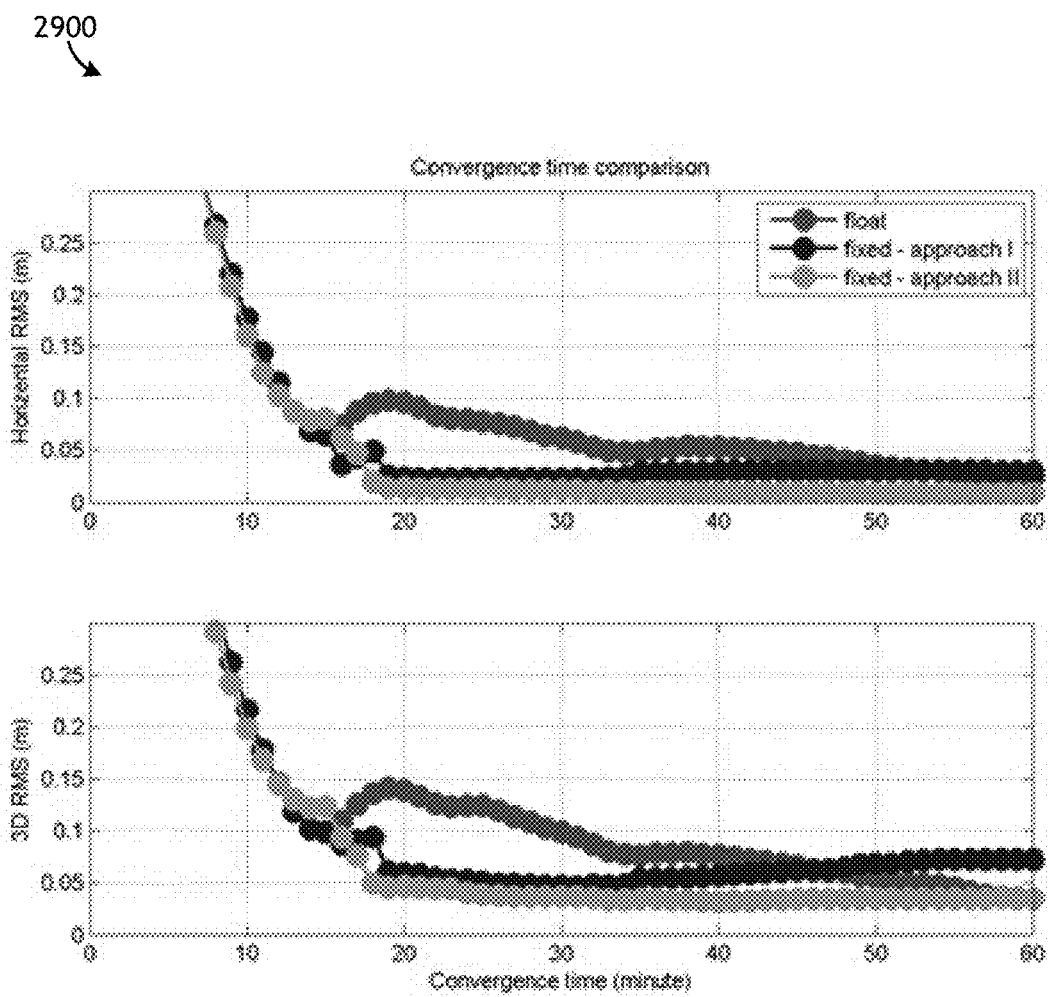
FIG. 29 is a graph illustrating a convergence time comparison.

In one embodiment, the major motivation of PPP ambiguity resolution may be to reduce the long convergence time. For example, the convergence time may be analyzed using the scenarios with L1 ambiguity TTFF less than 20 minutes. In approach I, there may be 15 out of 68 scenarios with less than 20 minutes L1 ambiguity TTFF, while in approach II there may be 18 out of 68 scenarios that meet these criteria. In other words, the convergence time analysis may represent around 25% of the probability. The convergence time comparisons for float solution, fixed solutions at approach I and II are provided in FIG. 29. In an embodiment, an analysis may typically require around 30 minutes for achieving a horizontal position of RMS better than 5 cm and a 3D position of RMS better than 10 cm for the float solution. After PPP ambiguity resolution, the fixed solution can reduce this convergence time to around 18 minutes. In another embodiment, the result that approach II can maintain the position accuracy better than approach I after the convergence may be mainly due to approach II's better quality of the L1 fractional bias product, and also a lower risk of a wrong ambiguity fix.

In an embodiment, at the server side the newly proposed fractional bias model, namely approach II, in which one DIFB and three DDFB are estimated for each satellite, can improve the L1 fractional bias product quality. This may be since in approach I, only 85% of L1 ambiguity residuals are less than 0.15 NL cycles, but after a switch to approach II, the result may be improved to 91%.

In one embodiment, at the client rover side the average L1 TTFF may be approximately 30 minutes for both approach I and approach II. The L1 ambiguity fixing availability in approach I may be around 78%, while approach II may improve this to around 88%. The fixed solution in approach I can improve the position STD from 5 cm/2 cm/6 cm to 2 cm/2 cm/5 cm at east/north/up. Approach II can further improve this to 1 cm/1 cm/4 cm. Approach II can also reduce the risk of a wrong ambiguity fix compared to approach I. After the convergence, approach II may maintain the position accuracy better than approach I, mainly due to the better quality of approach II's L1 fractional bias product, and a lower risk of a wrong ambiguity fix.

In an embodiment, instantaneous PPP ambiguity resolution with triple-frequency signals may include a simulated client rover performance with triple-frequency signals. For example, a MATLAB® simulation software package may be developed to assess the performance of instantaneous PPP AR with triple-frequency signals at the client rover side. Several figures of merit may be analyzed, including the L2/L5 WL and L1/L2 WL ambiguity fix availability and TTFF, the position accuracy, the convergence time, and the like. The performance improvement may also be evaluated after applying the proposed carrier smooth carrier method. In one embodiment of the test, only GPS signals may be simulated. The default parameter configuration used in an exemplary simulation is illustrated in FIG. 30, in which the receiver and satellite hardware biases are ignored. Therefore, the fractional bias products may not be required while conducting the PPP AR in some simulation tests.

For example, in a simulation test for triple-frequency signals, there may be six (6) IGS site locations selected which may be the same as for dual-frequency signal cases, including AMC2, AREQ, FAIR, MOBN, SHAO, and TIDB. The simulation test time may also be selected (e.g., from July $1^{st}$ 12:00 h to July $2^{nd}$ 00:00h in 2011, which lasts 12 hours). A manipulated full reset may also be introduced at the beginning of each hour. In total there may be 72 scenarios used to evaluate the rover performance of instantaneous PPP AR with triple-frequency signals.

In one embodiment, for instantaneous PPP AR with triple-frequency signals at the client rover side, GFAR for L2/L5 WL ambiguity may be conducted using a differential between L2/L5 WL carrier and L2/L5 NL code, after receiving the L2/L5 WL fractional bias product from the server. The ionosphere-free carrier phase used for instantaneous triple-frequency PPP ambiguity resolution may be a combination formed by L2/L5 WL carrier and L1/L2 WL carrier. A non-integer pseudo L1/L2 WL ambiguity can be obtained after the L2/L5 WL ambiguity is fixed and eliminated from the estimated ionosphere-free ambiguity. Secondly, after correcting the L1/L2 WL fractional bias product received from the server, the integer property of this pseudo L1/L2 WL ambiguity may be recovered, and it can be fixed in a GBAR approach, such as LAMBDA. In various embodiments, both the L2/L5 WL ambiguity and the L1/L2 WL ambiguity may be expected to be fixed instantaneously using a single epoch of triple-frequency measurements.

Figure 31:
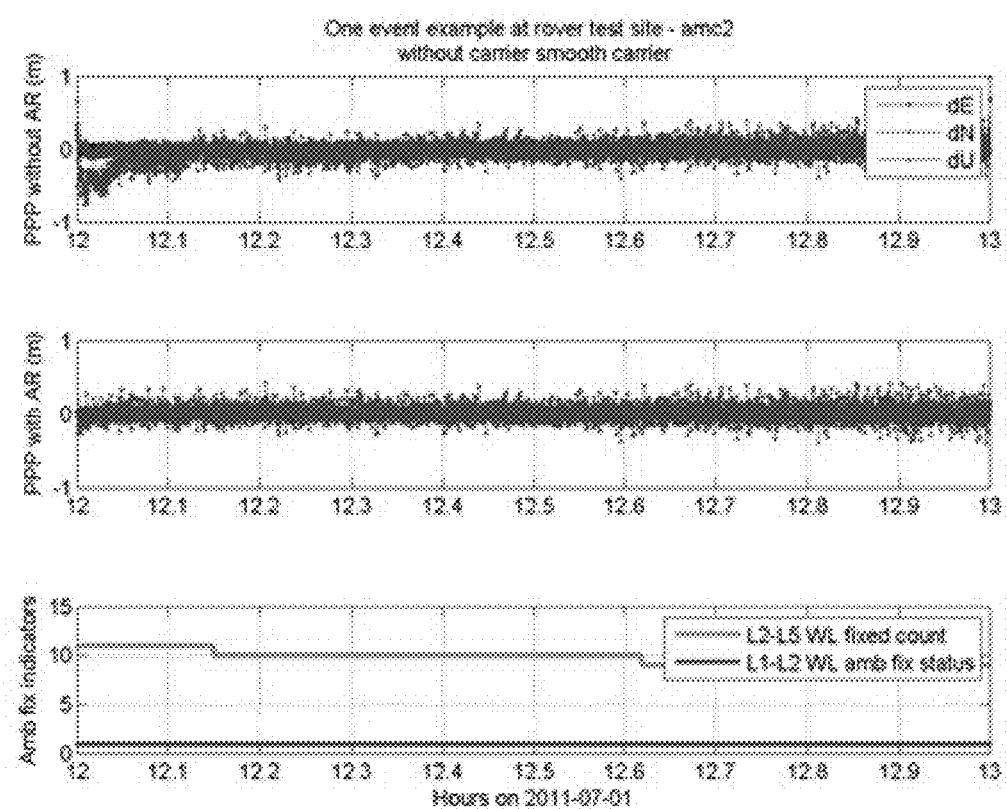
FIG. 31 is a graph illustrating a PPP AR example for one scenario without a carrier smooth carrier function.
Figure 32:
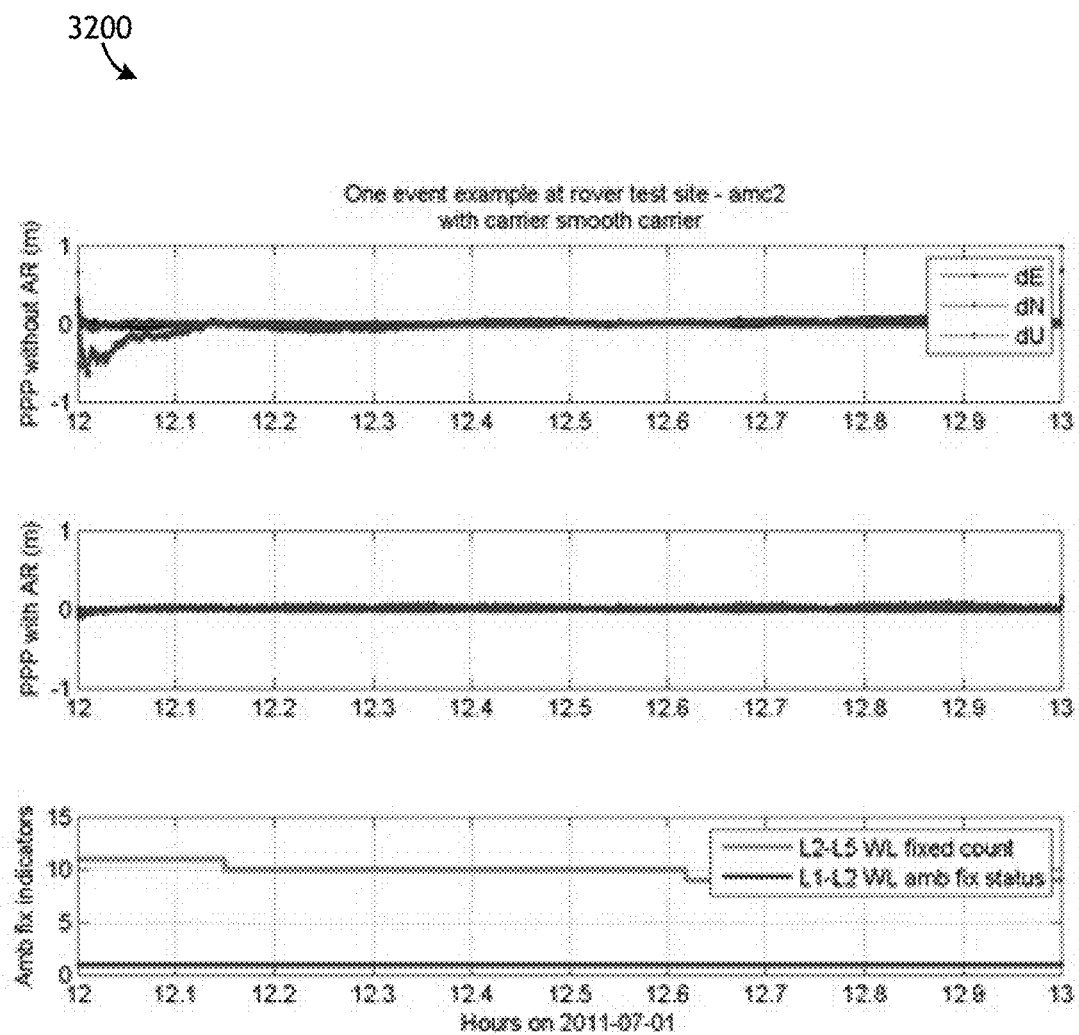
FIG. 32 is a graph illustrating a PPP AR example for one scenario with a carrier smooth carrier function.

An example for the instantaneous PPP ambiguity resolution with triple-frequency signal performance at the first scenario at test site AMC2 is depicted in FIG. 31 and FIG. 32. The performance differences between without and with the proposed carrier smooth carrier method are also compared. In this scenario, the PPP ambiguity fixing for both the L2/L5 WL ambiguity in a GFAR approach and the L1/L2 WL ambiguity in a GBAR approach can be achieved within one epoch. The position accuracy may be significantly improved after the ambiguity fixing, especially after applying a carrier smooth carrier technique.

Figure 33:
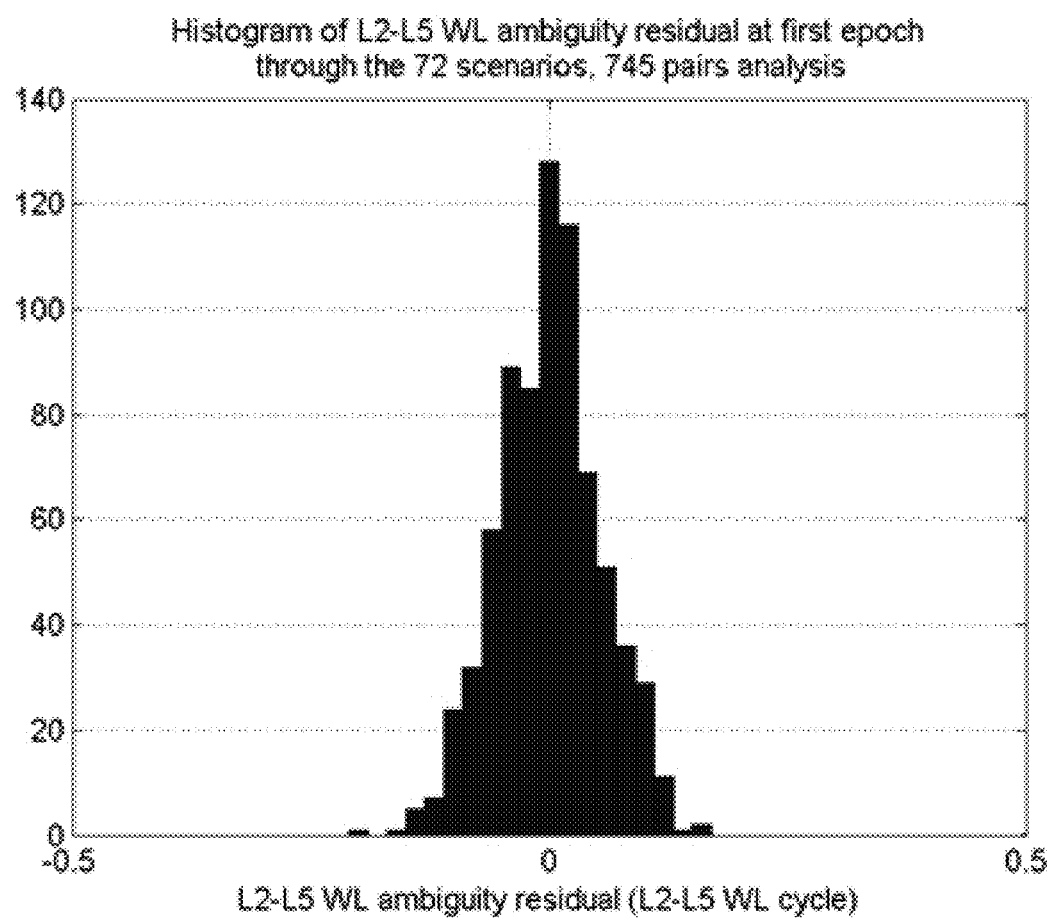
FIG. 33 is a graph illustrating a histogram analysis of the reliability of a L2/L5 WL ambiguity fix.
Figure 34:
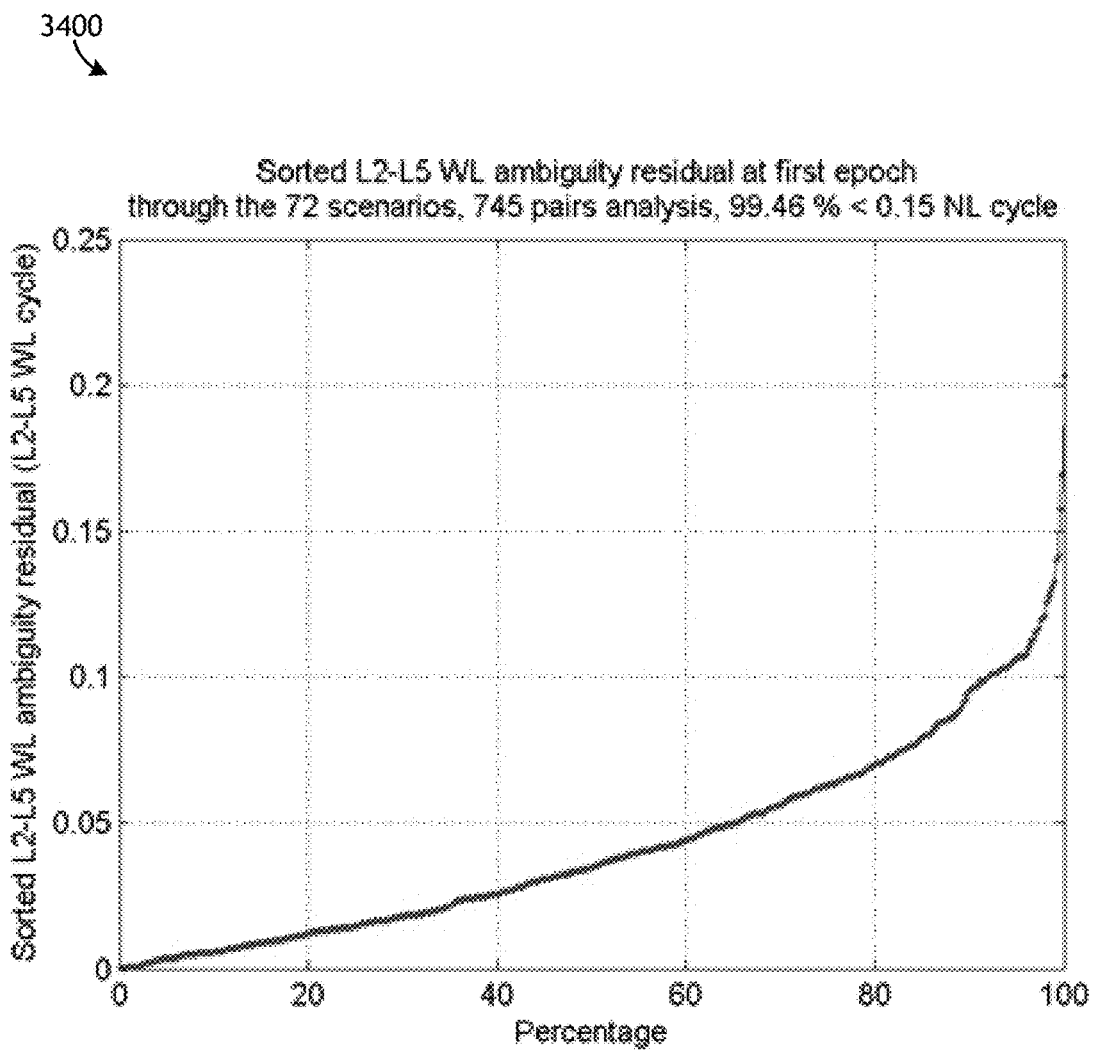
FIG. 34 is a graph illustrating a sorted value analysis of the reliability of a L2/L5 WL ambiguity fix.

In an embodiment, performing PPP ambiguity resolution using GNSS triple frequency signals may include instantaneous L2/L5 wide-lane ambiguity fix reliability. In one embodiment, the first step of the instantaneous PPP AR strategy with triple-frequency signal may be to fix the L2/L5 WL ambiguity in a geometry-free approach using the measurement differential between the L2/L5 WL carrier and the L2/L5 NL code. FIG. 33 and FIG. 34 illustrate an analysis for the reliability of this GFAR approach by using a single epoch of the measurements. In an embodiment, there may be 745 pairs of L2/L5 WL float ambiguities extracted from the first epoch of 72 test scenarios. For each float ambiguity, the residual may be calculated by removing a round-off integer value. Based on the results (i.e., by using only one epoch of the measurements), the L2/L5 WL ambiguity residuals may be less than 0.15 cycles, with a 99.46% probability. In other words, the L2/L5 WL ambiguity can be fixed instantaneously and reliably by using single epoch of the triple-frequency measurements.

Figure 35:
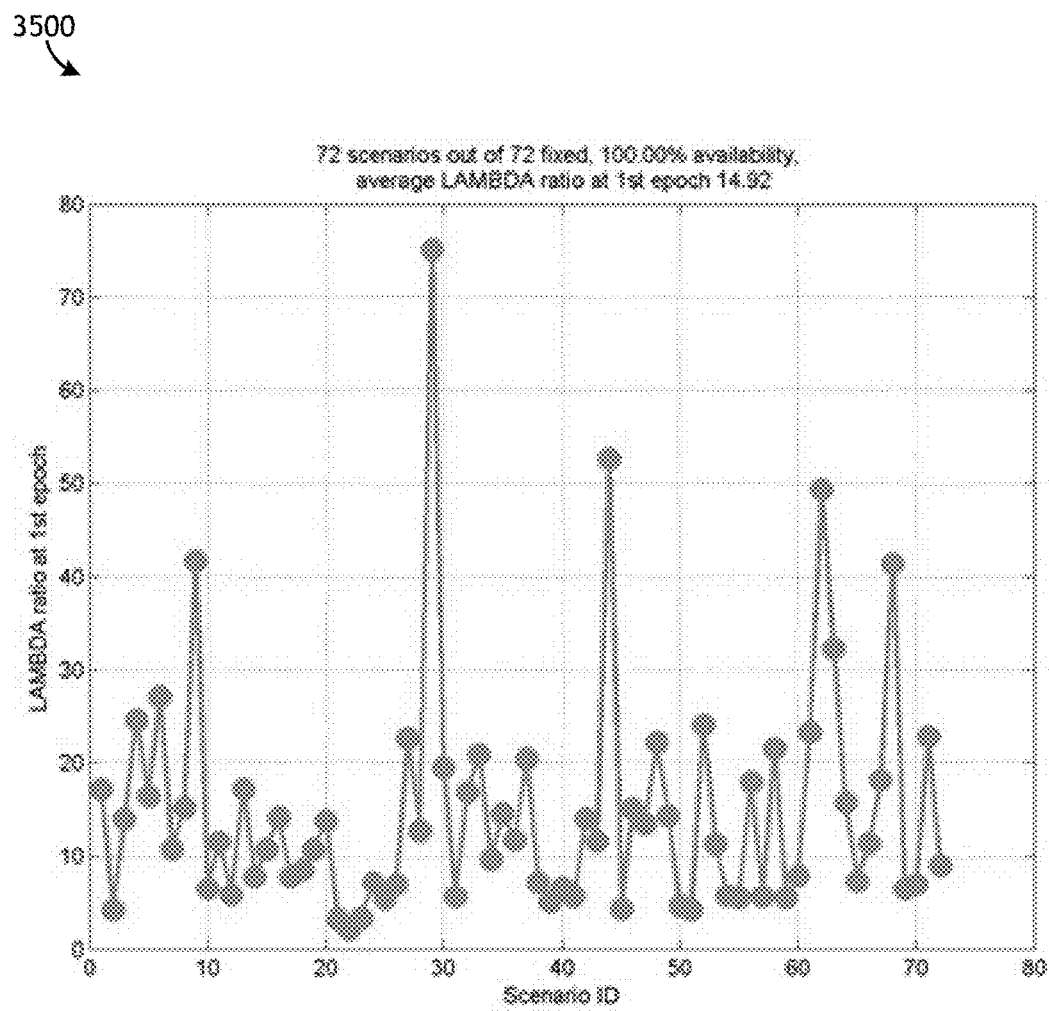
FIG. 35 is a graph illustrating a ratio of values for all scenarios of the reliability of a L1/L2 WL ambiguity fix.
Figure 36:
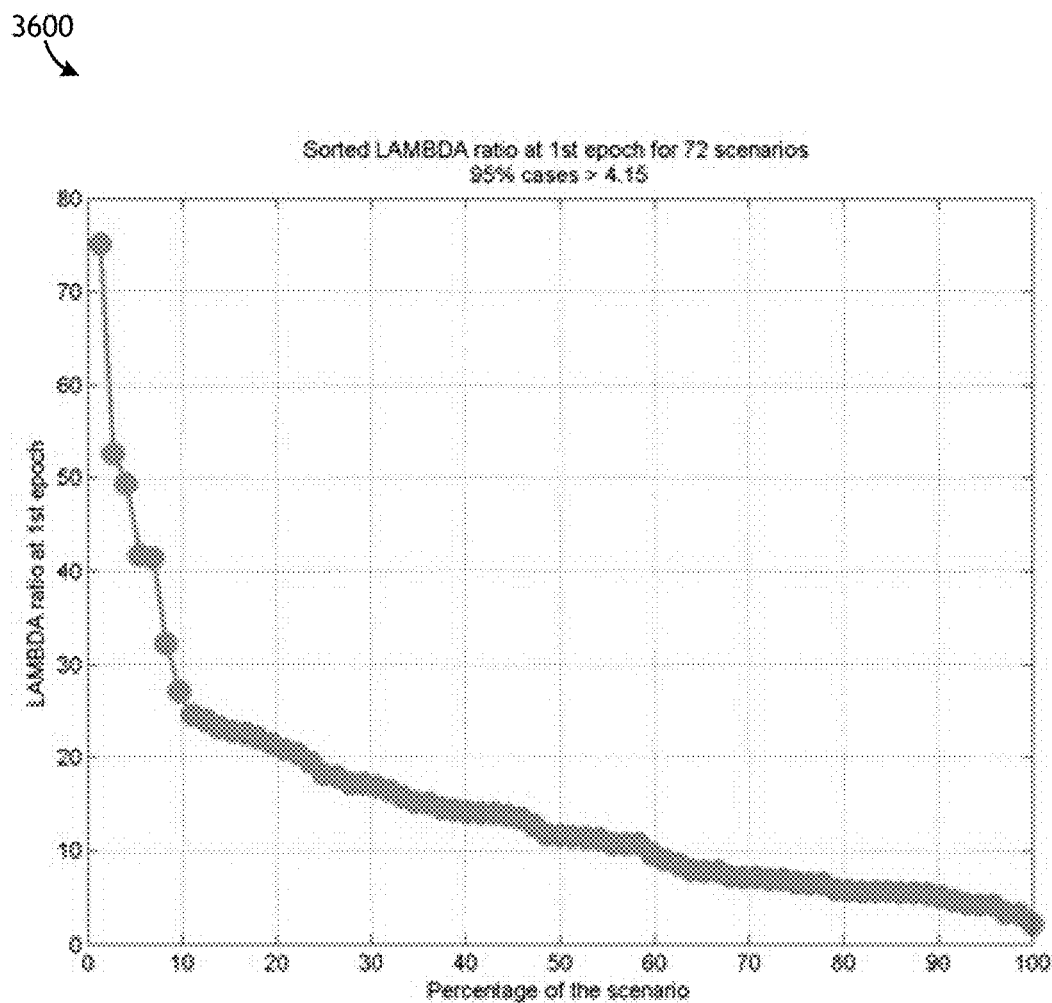
FIG. 36 is a graph illustrating a sorted ratio values analysis of a L1/L2 WL ambiguity fix.

In one embodiment, performing PPP ambiguity resolution using GNSS triple frequency signals may include instantaneous L1/L2 wide-lane ambiguity fix reliability. In an embodiment, the second step of the instantaneous PPP AR strategy with triple-frequency signal is to fix the L1/L2 WL ambiguity via a geometry-based approach along with the position and troposphere estimation at a PPP rover (e.g., by using LAMBDA). In one embodiment, a ratio test may be used to evaluate the reliability of the searched ambiguity from the LAMBDA method. FIG. 35 and FIG. 36 illustrate that at the first epoch, the LAMBDA ratio value outputs for 72 test scenarios may be 14.92 on average, and greater than 4.15 within 95% probability. In other words, the L1/L2 WL ambiguity can also be fixed instantaneously and reliably using a single epoch of the measurements.

Figure 37:
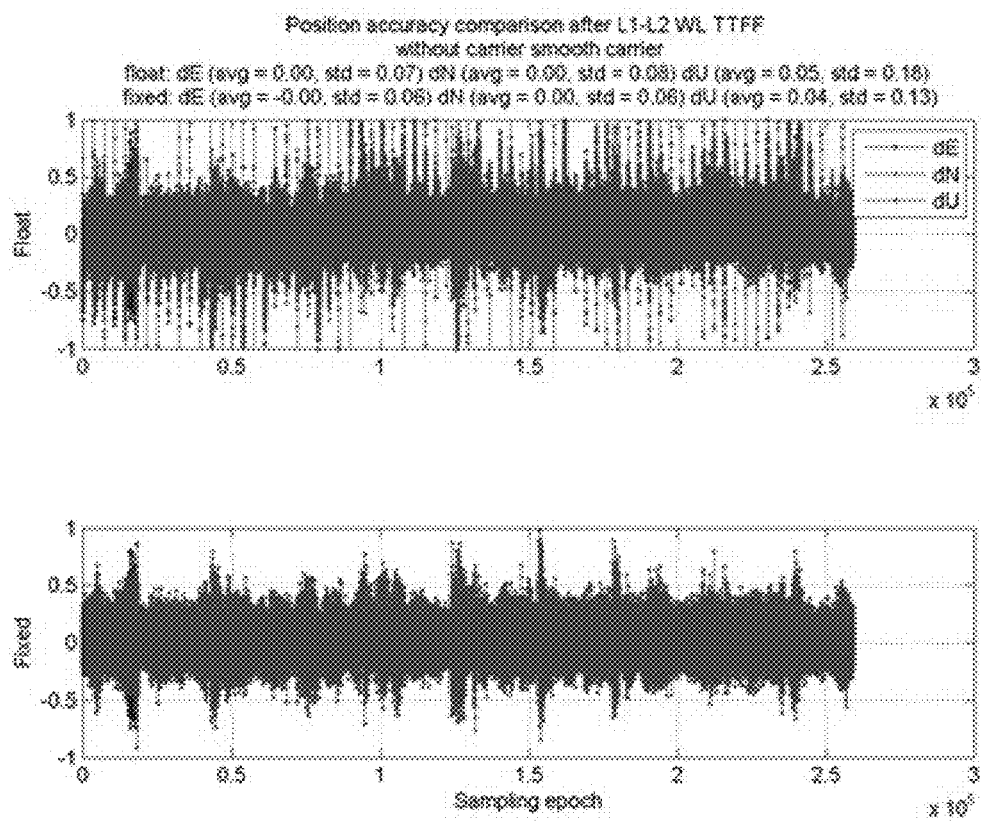
FIG. 37 is a graph illustrating a position accuracy comparison without a carrier smooth carrier function.
Figure 38:
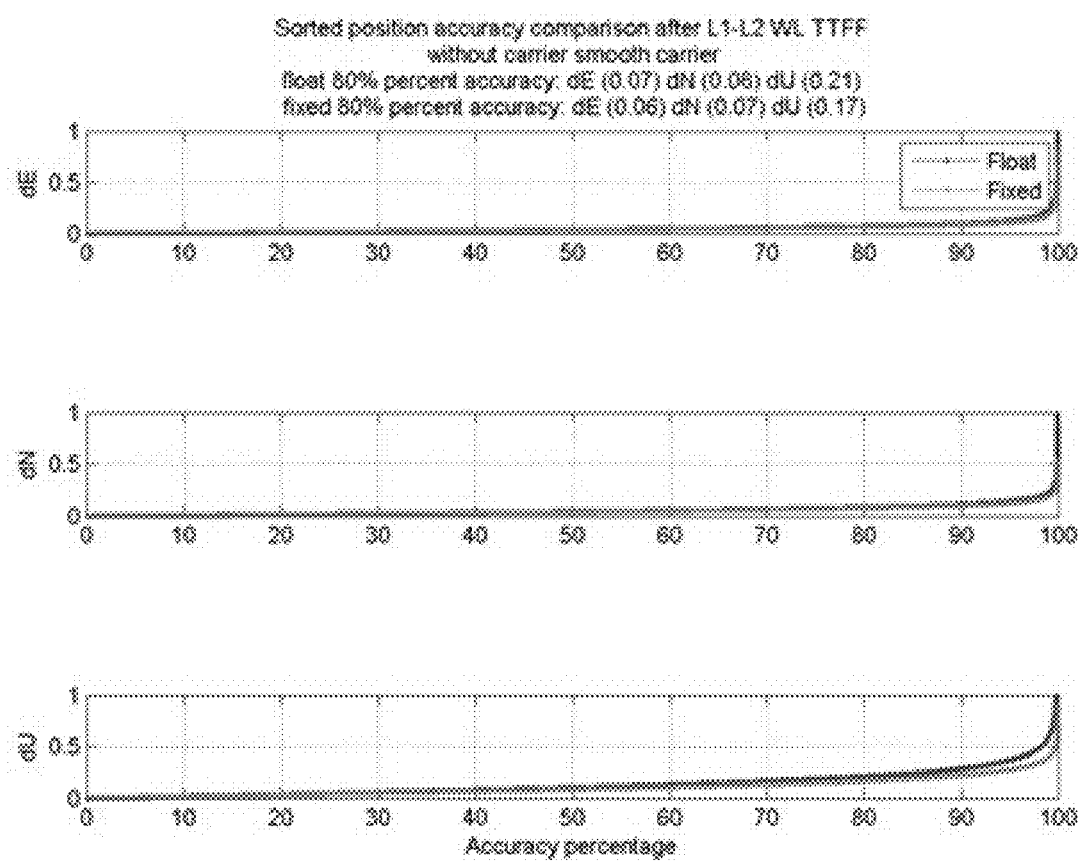
FIG. 38 is a graph illustrating a sorted position accuracy comparison without a carrier smooth carrier function.
Figure 39:
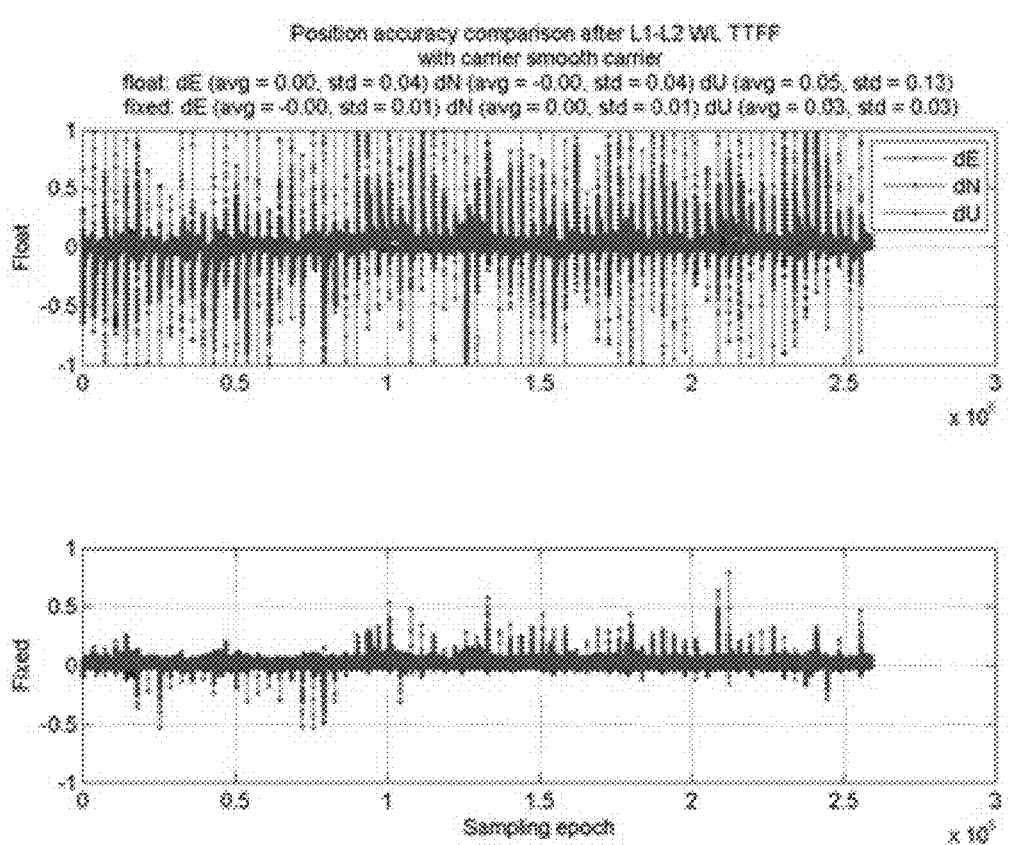
FIG. 39 is a graph illustrating a position accuracy comparison with a carrier smooth carrier function.
Figure 40:
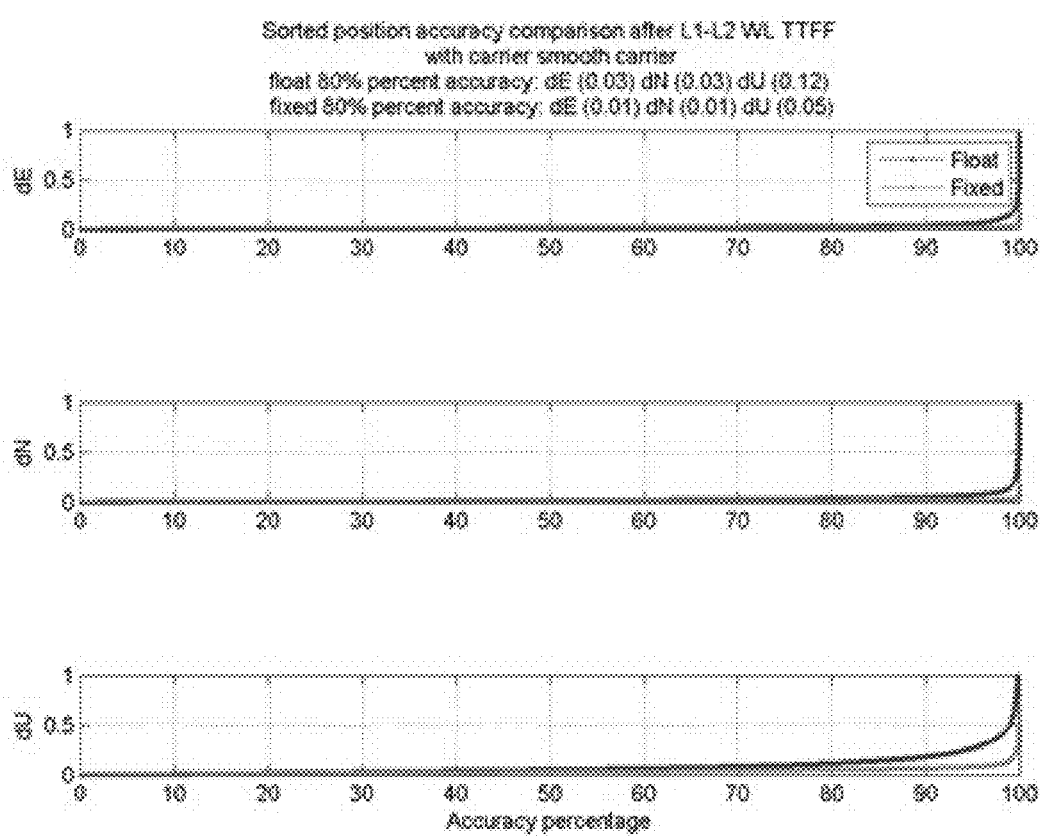
FIG. 40 is a graph illustrating a sorted position accuracy comparison with a carrier smooth carrier function.

After resolving the L1/L2 WL ambiguity, a PPP fixed solution may be achieved that can obtain better position accuracy than the float solution. In an embodiment, the carrier smooth carrier technique may be applied to further improve the positioning accuracy because it can reduce the measurement noise for the triple-frequency ionosphere-free carrier phase combination. When the carrier smooth carrier technique is not applied, as depicted in FIG. 37, the PPP AR can improve the position STD from 7 cm/8 cm/18 cm to 6 cm/6 cm/13 cm at east/north/up components. Based on the sorted position accuracy comparison shown in FIG. 38, the fixed solution can improve the position accuracy from 7 cm/8 cm/21 cm to 6 cm/7 cm/17 cm at east/north/up with 80% probability. After applying the carrier smooth carrier technique, as seen in FIG. 39, the fixed solution STD can be further improved to 1 cm/1 cm/3 cm at east/north/up components. As shown in FIG. 40, for the sorted position accuracy the fixed solution accuracy may be 1 cm/1 cm/5 cm at east/north/up, with 80% probability.

Figure 41:
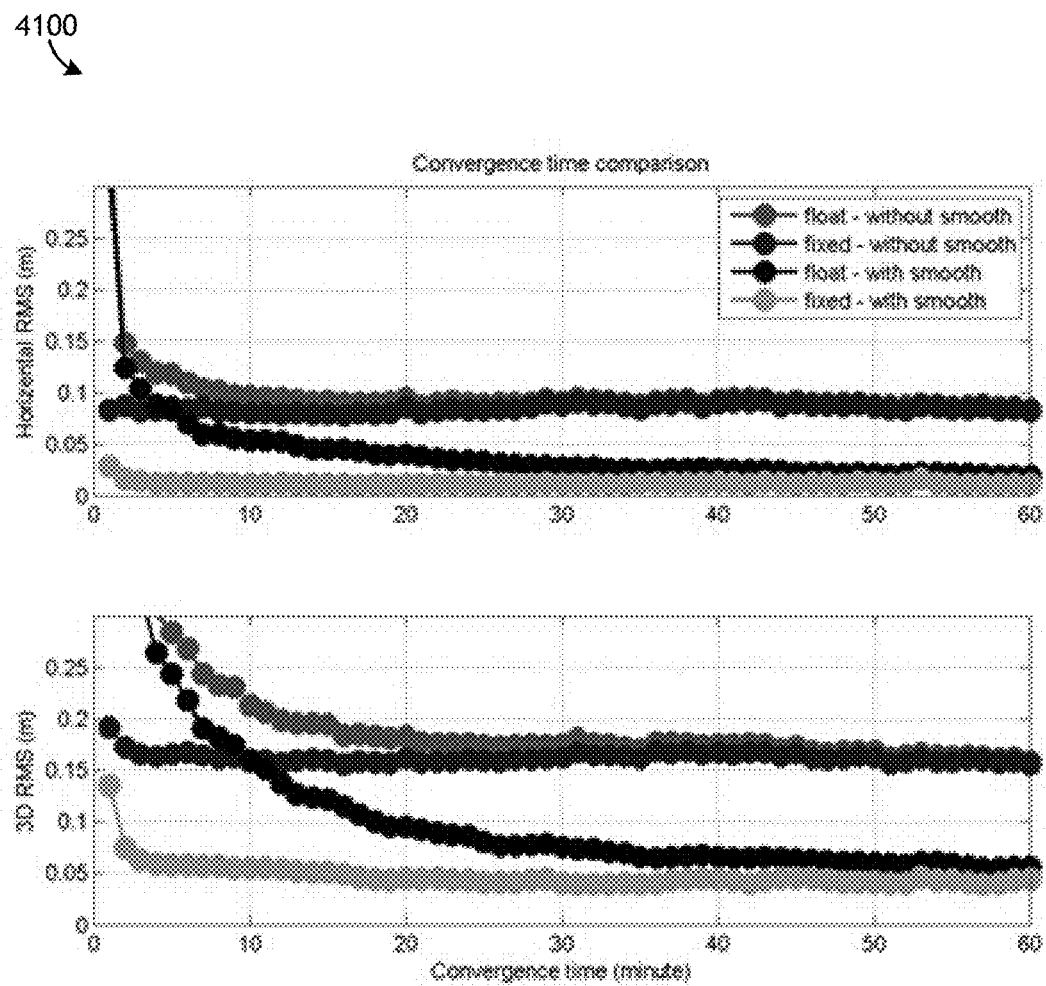
FIG. 41 is a graph illustrating a convergence time comparison.

In an embodiment, convergence time may also be analyzed. All of the various scenarios described above may be used for the convergence time analysis for the triple-frequency PPP ambiguity resolution, which represents a 100% probability. As seen in FIG. 41, by using the carrier smooth carrier technique the instantaneous triple-frequency PPP ambiguity resolution may obtain a horizontal position RMS of better than 5 cm and a 3D position RMS of better than 10 cm within 1 minute, which is comparable to RTK.

Figure 42:
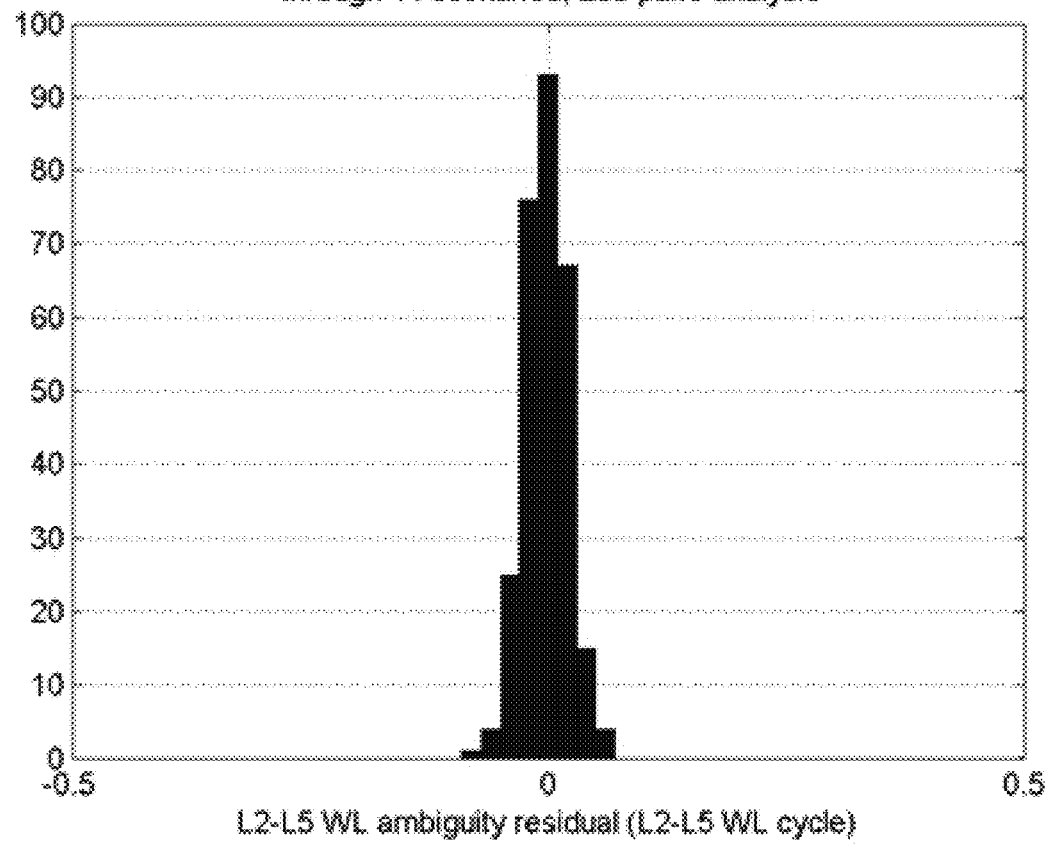
FIG. 42 is a graph illustrating a histogram analysis of the reliability of a L2/L5 ambiguity fix.
Figure 43:
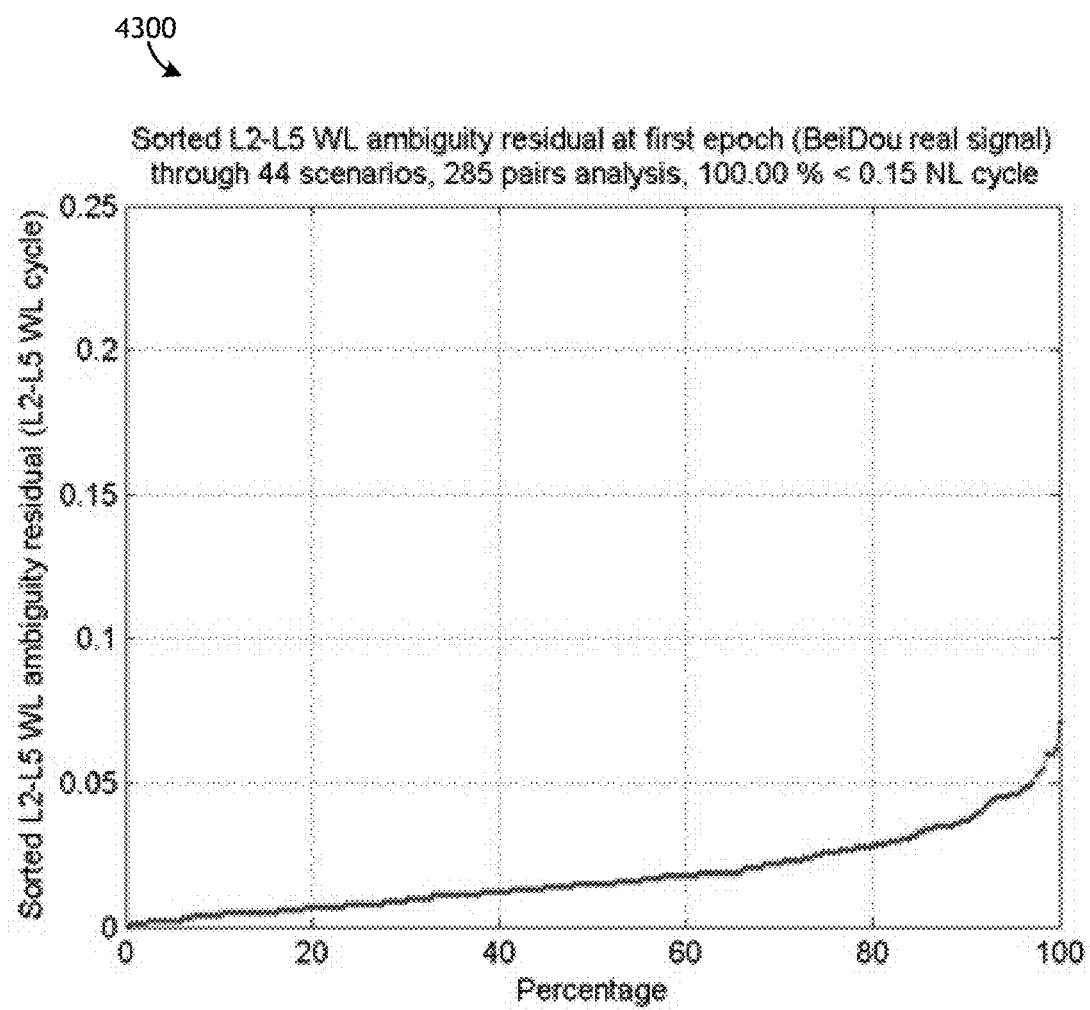
FIG. 43 is a graph illustrating a sorted value analysis of the reliability of a L2/L5 ambiguity fix.

In one embodiment, performing PPP ambiguity resolution using GNSS triple frequency signals may include verification of triple-frequency PPP ambiguity resolution with BeiDou real signals. BeiDou triple-frequency real signal datasets are available for download from ComNav Technology Ltd. in China at the website http://www.comnav.cn/download/. In an embodiment, a zero-baseline dataset collected on Apr. 1, 2013 at Shanghai, China may be used in the following to evaluate the performance of instantaneous PPP AR for L2/L5 WL ambiguities in the geometry-free approach and L1/L2 WL ambiguities in the geometry-based approach. The dataset may contain 200 minutes of long BeiDou observations that may be split into 44 scenarios of approximately 300 seconds long for each. As depicted in FIG. 42 and FIG. 43, the reliability of the L2/L5 WL ambiguity in a geometry-free approach may be analyzed using the differential measurements between a L2/L5 WL carrier and the L2/L5 NL code. In one embodiment, there may be 285 pairs of L2/L5 WL float ambiguities from the first epoch of 44 test scenarios. Based on the results, those L2/L5 WL ambiguity residuals may all be below 0.15 cycles. This confirms that the L2/L5 WL ambiguity can be instantaneously and reliably fixed by using a single epoch of BeiDou measurements.

Figure 44:
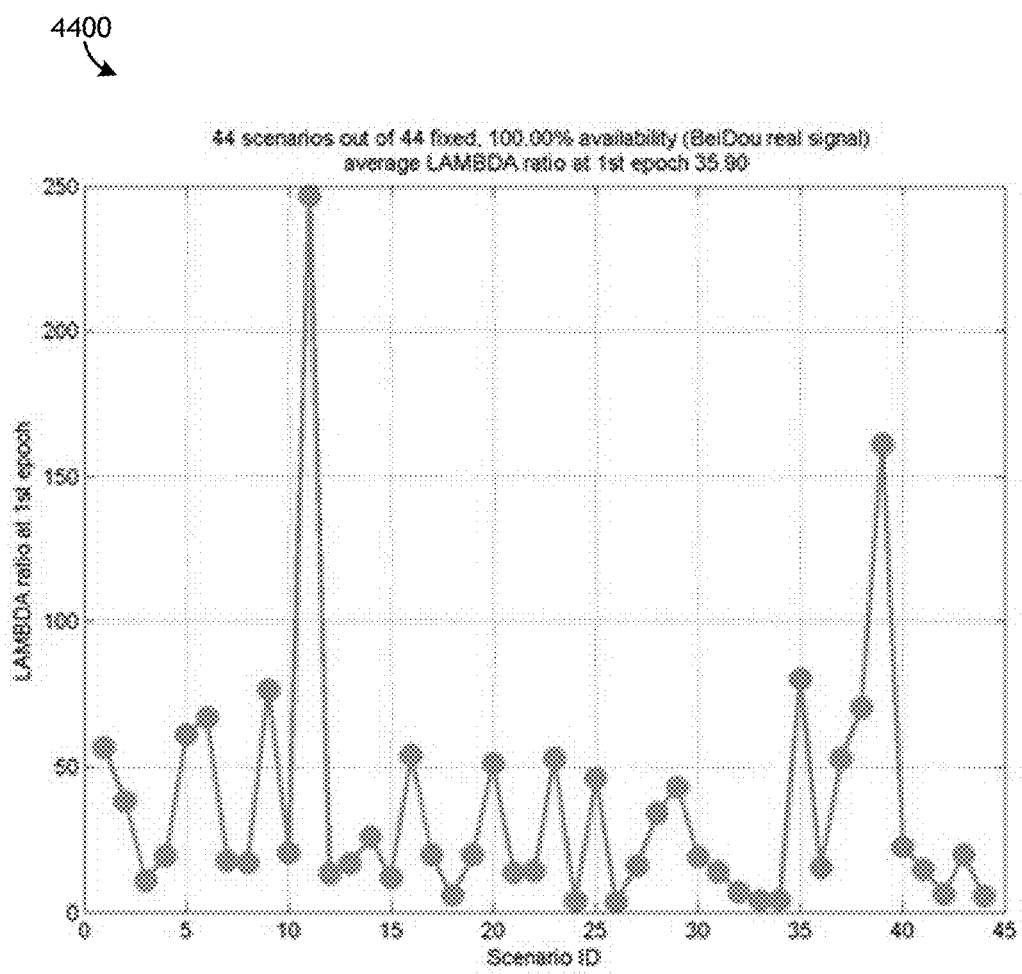
FIG. 44 is a graph illustrating a ratio values analysis of all scenarios of the reliability of a L1/L2 WL ambiguity fix.
Figure 45:
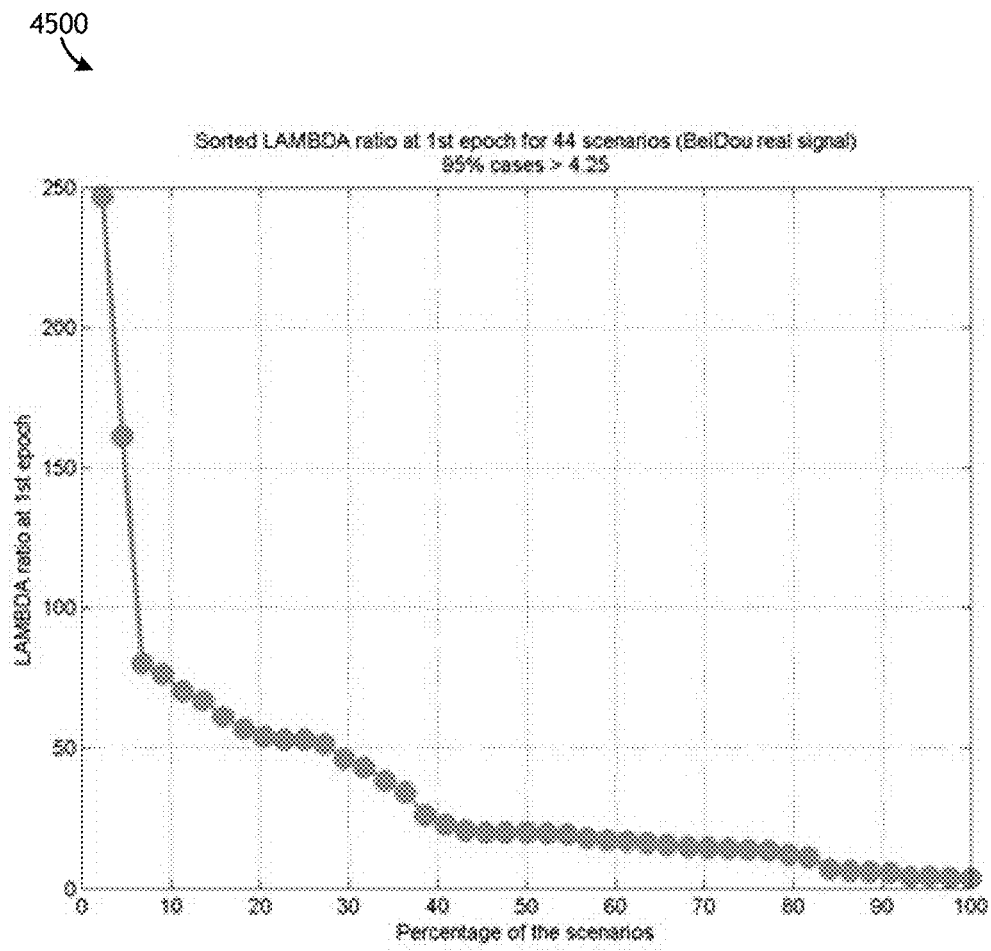
FIG. 45 is a graph illustrating a sorted ratio values analysis of the reliability of a L1/L2 WL ambiguity fix.

In an embodiment, the reliability of instantaneous L1/L2 WL ambiguity fixing in the geometry-based approach using BeiDou live signals may also be evaluated by using a ratio test. As illustrated in FIG. 44 and FIG. 45, the average of the LAMBDA ratio values for all 44 test scenarios at the first epoch may be 35.90. The ratio values may be greater than 4.25 with a 95% probability. This confirms that the L1/L2 WL ambiguities can also be fixed instantaneously and reliably just using a single epoch of BeiDou measurements.

In one embodiment, the test results of a triple-frequency instantaneous PPP ambiguity may demonstrate that both a L2/L5 WL ambiguity and a L1/L2 ambiguity can be fixed reliably using a single epoch of the triple-frequency measurements, which may be confirmed by both simulation and BeiDou real signal tests. In an embodiment, based on the simulation results of 72 scenarios from 6 different client rover locations, when the carrier smooth carrier technique is not applied the PPP AR can improve the position STD from 7 cm/8 cm/18 cm to 6 cm/6 cm/13 cm at east/north/up. In 80% of cases, a PPP AR can improve the position accuracy from 7 cm/8 cm/21 cm to 6 cm/7 cm/17 cm. After applying the carrier smooth carrier technique, the fixed position STD may be further improved to 1 cm/1 cm/3 cm at east/north/up directions, respectively. In 80% of the cases, the fixed solution accuracy can be further improved to 1 cm/1 cm/5 cm. In one embodiment, the carrier smooth carrier technique may therefore ensure the position accuracy of a triple-frequency PPP fixed solution. The instantaneous PPP ambiguity resolution and the carrier smooth carrier technique may guarantee the horizontal position RMS to better than 5 cm and the 3D position RMS to better than 10 cm within 1 minute at a 100% probability, which is comparable to RTK. The results thus indicate that PPP ambiguity resolution can effectively overcome the long convergence time limitation, especially when triple-frequency GNSS measurements are available.

Figure 46:
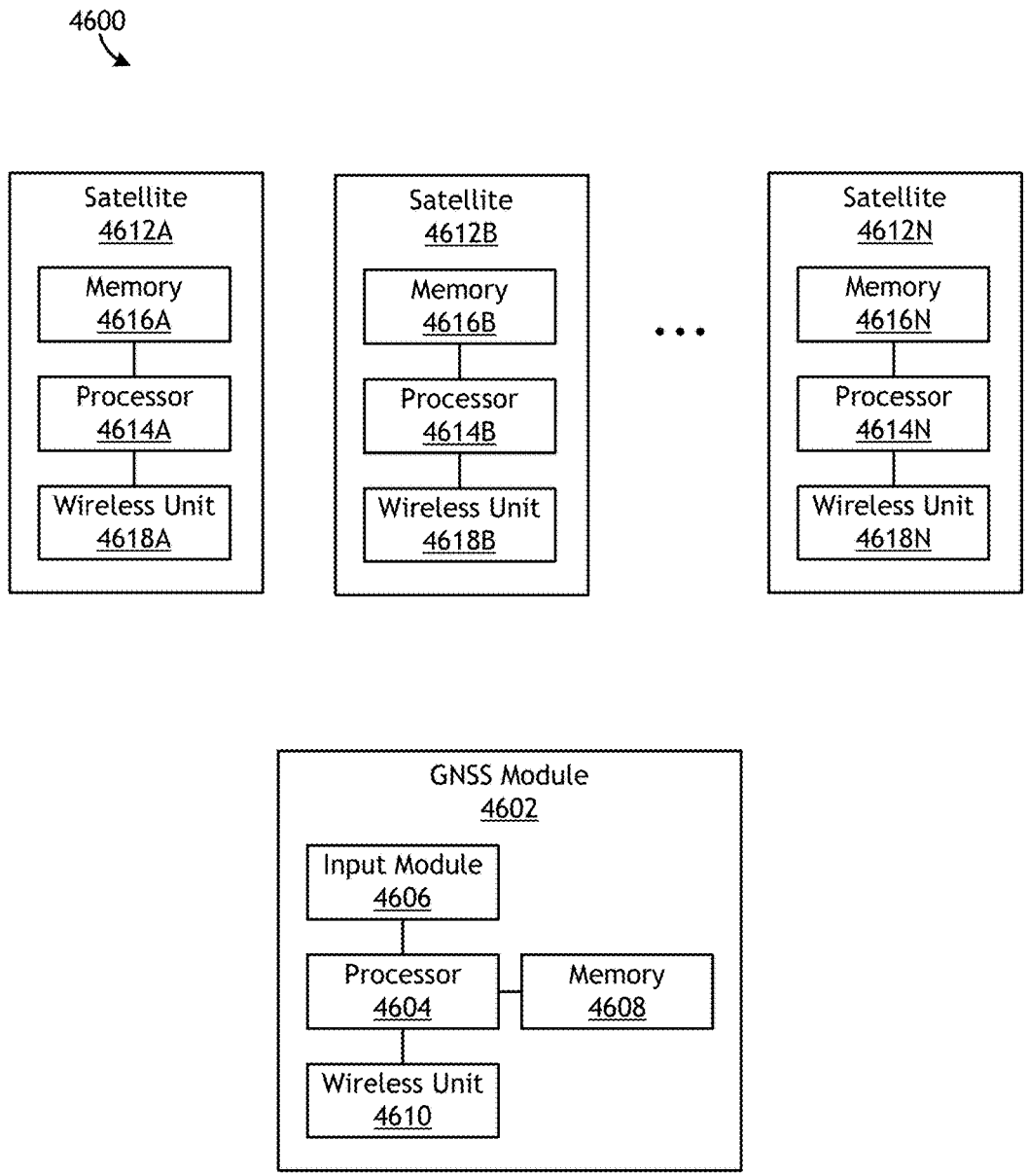
FIG. 46 is a schematic block diagram illustrating one embodiment of a system configured for performing PPP ambiguity resolution using GNSS triple frequency signals.

FIG. 46 is a schematic circuit diagram illustrating one embodiment of a system 4600 for performing PPP ambiguity resolution using GNSS triple frequency signals. In one embodiment, the system 4600 may include a GNSS module 4602 and multiple satellites 4612A-N. In an embodiment, GNSS module 4602 may include a processing device, such as processor 4604, coupled to an input module 4606, a memory 4608, and a wireless unit 4610. Similarly, satellites 4612A-N may include processors 4614A-N, memory 4616A-N, and wireless units 4618A-N, respectively. In different embodiments, input module 4606 may be a keyboard, mouse, button, touch-screen module, or other user interface.

In various embodiments, GNSS module 4602 and/or satellites 4612A-N may be single-processor device(s) including one processor, or multi-processor device(s) including two or more processors (e.g., two, four, eight, or another suitable number). The processor(s) 4604 and/or 4614A-N may be any processor capable of executing program instructions. For example, in various embodiments, processor(s) 4604 and/or 4614A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of the processor(s) may commonly, but not necessarily, implement the same ISA. Also, in some embodiments, at least one of the processor(s) may be a graphics processing unit (GPU) or other dedicated graphics-rendering device.

In an embodiment, memory 4608 and/or memories 4616A-N may be configured to store program instructions and/or data accessible by processor(s) 4604 and/or 4614A-N, respectively. For example, memory 4608 may be used to store software program and/or database shown in FIG. 47. In various embodiments, memory 4608 and/or memories 4616A-N may be implemented using any suitable processor-accessible memory technology, such as random access memory (RAM), static RAM (SRAM), read only memory (ROM), dynamic RAM (DRAM) synchronous dynamic RAM (SDRAM), nonvolatile/Flash-type memory, or any other type of memory.

Figure 47:
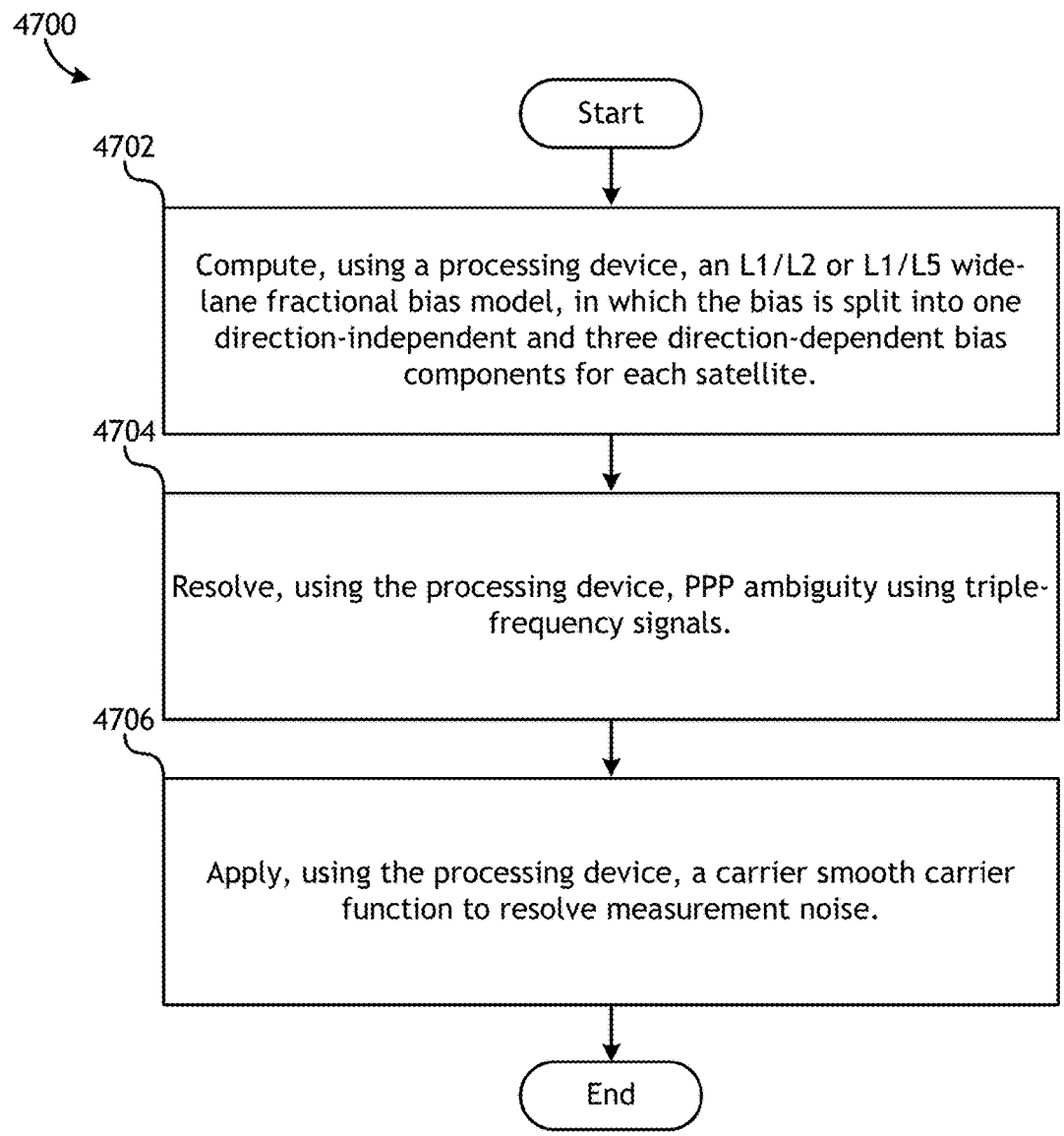
FIG. 47 is a schematic flowchart diagram illustrating one embodiment of a method for performing PPP ambiguity resolution using GNSS triple frequency signals.

FIG. 47 is a schematic flowchart diagram illustrating one embodiment of a method 4700 for performing PPP ambiguity resolution using GNSS triple frequency signals. At block 4702, the method 4700 includes computing, using a processing device (e.g., processor 4604 of FIG. 46), an L1/L2 or L1/L5 wide-lane fractional bias model, in which the bias is split into one direction-independent and three direction-dependent bias components for each satellite (e.g., satellite(s) 4612A-N of FIG. 46). As depicted in block 4704, the method 4700 includes resolving, using the processing device, PPP ambiguity using triple-frequency signals. As shown in block 4706, the method 4700 includes applying, using the processing device, a carrier smooth carrier function to resolve measurement noise.

A new method and system for instantaneous PPP ambiguity resolution with triple-frequency signals has been described. In an embodiment, the method may involve first fixing the L2/L5 wide-lane ambiguities in a geometry-free approach and then fixing the L1/L2 wide-lane ambiguities in a geometry-based approach. Based test results with MATLAB® simulation datasets and BeiDou real signal datasets, both the L2/L5 wide-lane ambiguity and the L1/L2 wide-lane ambiguity can be fixed instantaneously and reliably using a single epoch of triple-frequency measurements. A carrier smooth carrier technique has been described to reduce the measurement noise for PPP ambiguity resolution with triple-frequency signals. In one embodiment, PPP can achieve a horizontal positioning accuracy of better than 5 cm and a 3D positioning accuracy of better than 10 cm with a convergence time less of than one minute. This performance is comparable to RTK.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for performing Precise Point Positioning (PPP) ambiguity resolution using Global Navigation Satellite System (GNSS) triple frequency signals, comprising:
    computing, using a processing device, an L1/L2 or L1/L5 wide-lane fractional bias model, in which the fractional bias model includes a mathematical representation of a bias having one direction-independent and three direction-dependent bias components for each satellite;
    resolving, using the processing device, PPP ambiguity using triple-frequency signals; and
    applying, using the processing device, a carrier smooth carrier function to resolve measurement noise.

2. The method of claim 1, wherein resolving the PPP ambiguity comprises fixing the L2/L5 wide-lane ambiguities in a geometry-free function.

3. The method of claim 1, wherein resolving the PPP ambiguity comprises fixing the L1/L2 wide-lane ambiguities in a geometry-based function.

4. The method of claim 1, wherein resolving the PPP ambiguity comprises fixing the L1/L5 wide-lane ambiguities in a geometry-based function.

5. The method of claim 1, further comprising determining the L2/L5 wide-lane fractional bias product using Melbourne Wubenna combination.

6. The method of claim 1, wherein computing the L1/L2 or L1/L5 wide-lane fractional bias model comprises determining a L1/L2 or L1/L5 wide-lane fractional bias product, in which the L1/L2 or L1/L5 wide-lane fractional bias is split into one direction-independent and three directional-dependent components for each satellite.

7. The method of claim 1, wherein the carrier smooth carrier function comprises smoothing the triple-frequency ionosphere-free carrier phase measurement noise using L1/L2 or L1/L5 or L2/L5 dual-frequency ionosphere-free carrier phase measurement.

8. A system for performing Precise Point Positioning (PPP) ambiguity resolution using Global Navigation Satellite System (GNSS) triple frequency signals, comprising:
    a processing device; and
    a memory coupled to the processing device, the memory comprising executable instructions for causing the processing device to perform operations comprising:
        computing an L1/L2 or L1/L5 wide-lane fractional bias model, in which the fractional bias model includes a mathematical representation of a bias having one direction-independent and three direction-dependent bias components for each satellite;
        resolving PPP ambiguity using triple-frequency signals; and
        applying a carrier smooth carrier function to resolve measurement noise.

9. The system of claim 8, wherein resolving the PPP ambiguity comprises fixing the L2/L5 wide-lane ambiguities in a geometry-free function.

10. The system of claim 8, wherein resolving the PPP ambiguity comprises fixing the L1/L2 wide-lane ambiguities in a geometry-based function.

11. The system of claim 8, wherein resolving the PPP ambiguity comprises fixing the L1/L5 wide-lane ambiguities in a geometry-based function.

12. The system of claim 8, the operations further comprising determining the L2/L5 wide-lane fractional bias product using Melbourne Wubenna combination.

13. The system of claim 8, wherein computing the L1/L2 or L1/L5 wide-lane fractional bias model comprises determining a L1/L2 or L1/L5 wide-lane fractional bias product, in which the L1/L2 or L1/L5 wide-lane fractional bias is split into one direction-independent and three directional-dependent components for each satellite.

14. The system of claim 8, wherein the carrier smooth carrier function comprises smoothing the triple-frequency ionosphere-free carrier phase measurement noise using L1/L2 or L1/L5 or L2/L5 dual-frequency ionosphere-free carrier phase measurement.

15. A non-transitory computer-readable medium comprising instructions that, when executed by a processing device, cause the processing device to perform operations for performing Precise Point Positioning (PPP) ambiguity resolution using Global Navigation Satellite System (GNSS) triple frequency signals, the operations comprising:
    computing an L1/L2 or L1/L5 wide-lane fractional bias model, in which the fractional bias model includes a mathematical representation of a bias having one direction-independent and three direction-dependent bias components for each satellite;
    resolving PPP ambiguity using triple-frequency signals; and
    applying a carrier smooth carrier function to resolve measurement noise.

16. The non-transitory computer-readable medium of claim 15, wherein resolving the PPP ambiguity comprises fixing the L2/L5 wide-lane ambiguities in a geometry-free function.

17. The non-transitory computer-readable medium of claim 15, wherein resolving the PPP ambiguity comprises fixing the L1/L2 wide-lane ambiguities in a geometry-based function.

18. The non-transitory computer-readable medium of claim 15, wherein resolving the PPP ambiguity comprises fixing the L1/L5 wide-lane ambiguities in a geometry-based function.

19. The non-transitory computer-readable medium of claim 15, the operations further comprising determining the L2/L5 wide-lane fractional bias product using Melbourne Wubenna combination.

20. The non-transitory computer-readable medium of claim 15, wherein computing the L1/L2 or L1/L5 wide-lane fractional bias model comprises determining a L1/L2 or L1/L5 wide-lane fractional bias product, in which the L1/L2 or L1/L5 wide-lane fractional bias is split into one direction-independent and three directional-dependent components for each satellite.

21. The non-transitory computer-readable medium of claim 15, wherein the carrier smooth carrier function comprises smoothing the triple-frequency ionosphere-free carrier phase measurement noise using L1/L2 or L1/L5 or L2/L5 dual-frequency ionosphere-free carrier phase measurement.

\* \* \* \* \*